US011080289B2

(12) United States Patent
Park et al.

(10) Patent No.: US 11,080,289 B2
(45) Date of Patent: *Aug. 3, 2021

(54) BUILDING MANAGEMENT SYSTEM WITH TIMESERIES PROCESSING

(71) Applicant: Johnson Controls Technology Company, Auburn Hills, MI (US)

(72) Inventors: Youngchoon Park, Brookfield, WI (US); Sudhi R. Sinha, Milwaukee, WI (US); Vijaya S. Chennupati, Brookfield, WI (US); Vaidhyanathan Venkiteswaran, Brookfield, WI (US); Sajjad Pourmohammad, Milwaukee, WI (US); Erik S. Paulson, Madison, WI (US); Ada L. Ma, Kenmore, WA (US); Gerald A. Asp, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 169 days.

This patent is subject to a terminal disclaimer.

(21) Appl. No.: 16/153,370

(22) Filed: Oct. 5, 2018

(65) Prior Publication Data

US 2019/0042629 A1 Feb. 7, 2019

Related U.S. Application Data

(63) Continuation of application No. 15/644,581, filed on Jul. 7, 2017, now Pat. No. 10,169,486.
(Continued)

(51) Int. Cl.
*G06F 16/20* (2019.01)
*G06F 16/2458* (2019.01)
(Continued)

(52) U.S. Cl.
CPC ......... *G06F 16/2477* (2019.01); *G05B 15/02* (2013.01); *G05D 23/1931* (2013.01);
(Continued)

(58) Field of Classification Search
None
See application file for complete search history.

(56) References Cited

U.S. PATENT DOCUMENTS 6,487,457 B1 11/2002 Hull et al.
6,493,755 B1 12/2002 Hansen et al.
(Continued)

FOREIGN PATENT DOCUMENTS

| WO | WO-2011/100255 A2 | 8/2011 |
| WO | WO-2015/106702 A1 | 7/2015 |
| WO | WO-2017/035536 A1 | 3/2017 |

OTHER PUBLICATIONS

Li et al., Event Stream Processing with Out-of-Order Data Arrival, International Conferences on Distributed Computing Systems, 2007, 8 pages.
(Continued)

*Primary Examiner* — Jau Shya Meng
(74) *Attorney, Agent, or Firm* — Foley & Lardner LLP

(57) ABSTRACT

A building management system (BMS) includes building equipment configured to provide raw data samples of data points in the BMS, a data collector configured to generate raw data timeseries including raw data samples from the building equipment, and a timeseries processing engine. The timeseries processing engine is configured to identify an initial timeseries processing workflow that applies to the raw data timeseries, identify other data timeseries required as inputs to the initial timeseries processing workflow, and generate an enriched timeseries processing workflow that includes the initial timeseries processing workflow, the raw
(Continued)

data timeseries, and the other data timeseries. The timeseries processing engine is configured to execute the enriched timeseries processing workflow to generate a derived data timeseries. The BMS further includes a timeseries storage interface configured to store the raw data timeseries and the derived data timeseries in a timeseries database.

20 Claims, 29 Drawing Sheets

Related U.S. Application Data

(60) Provisional application No. 62/457,654, filed on Feb. 10, 2017.

(51) Int. Cl.
*G06F 16/22* (2019.01)
*G06F 16/901* (2019.01)
*G05D 23/19* (2006.01)
*G05B 15/02* (2006.01)
*G06F 16/23* (2019.01)

(52) U.S. Cl.
CPC .......... *G06F 16/22* (2019.01); *G06F 16/9024* (2019.01); *G05B 2219/2614* (2013.01); *G05B 2219/2642* (2013.01); *G05D 23/1917* (2013.01); *G06F 16/2322* (2019.01)

(56) References Cited

U.S. PATENT DOCUMENTS

| | | | |
|---|---|---|---|
| 7,627,544 | B2 | 12/2009 | Chkodrov et al. |
| 8,229,470 | B1* | 7/2012 | Ranjan .................. H04W 4/029 455/456.3 |
| 8,516,016 | B2 | 8/2013 | Park et al. |
| 8,532,808 | B2 | 9/2013 | Drees et al. |
| 8,532,839 | B2 | 9/2013 | Drees et al. |
| 8,600,556 | B2 | 12/2013 | Nesler et al. |
| 8,635,182 | B2 | 1/2014 | Mackay |
| 8,682,921 | B2 | 3/2014 | Park et al. |
| 8,731,724 | B2 | 5/2014 | Drees et al. |
| 8,788,097 | B2 | 7/2014 | Drees et al. |
| 8,843,238 | B2 | 9/2014 | Wenzel et al. |
| 9,070,113 | B2* | 6/2015 | Shafiee ................ G06Q 10/103 |
| 9,196,009 | B2 | 11/2015 | Drees et al. |
| 9,286,582 | B2 | 3/2016 | Drees et al. |
| 9,344,751 | B1* | 5/2016 | Ream .................. H04N 21/242 |
| 9,354,968 | B2 | 5/2016 | Wenzel et al. |
| 9,507,686 | B2 | 11/2016 | Horn et al. |
| 9,558,196 | B2 | 1/2017 | Johnston et al. |
| 9,753,455 | B2 | 9/2017 | Drees |
| 10,055,206 | B2 | 8/2018 | Park et al. |
| 2005/0278703 | A1* | 12/2005 | Lo ........................ G06F 11/0751 717/126 |
| 2005/0283337 | A1 | 12/2005 | Sayal |
| 2007/0261062 | A1 | 11/2007 | Bansal et al. |
| 2008/0097816 | A1 | 4/2008 | Freire et al. |
| 2010/0131533 | A1* | 5/2010 | Ortiz ...................... G06F 16/58 707/758 |
| 2010/0281387 | A1 | 11/2010 | Holland et al. |
| 2011/0047418 | A1 | 2/2011 | Drees et al. |
| 2012/0259583 | A1 | 10/2012 | Noboa et al. |
| 2012/0278051 | A1 | 11/2012 | Jiang et al. |
| 2014/0278461 | A1 | 9/2014 | Artz |
| 2015/0105917 | A1 | 4/2015 | Sasaki et al. |
| 2015/0156031 | A1 | 6/2015 | Fadell et al. |
| 2015/0263900 | A1* | 9/2015 | Polyakov .............. G06Q 50/06 709/203 |
| 2016/0033946 | A1 | 2/2016 | Zhu et al. |
| 2016/0070736 | A1 | 3/2016 | Swan et al. |
| 2016/0239660 | A1 | 8/2016 | Azvine et al. |
| 2016/0239756 | A1 | 8/2016 | Aggour et al. |
| 2016/0313751 | A1* | 10/2016 | Risbeck ................ G05B 15/02 |
| 2016/0313752 | A1 | 10/2016 | Przybylski |
| 2016/0357828 | A1 | 12/2016 | Tobin et al. |
| 2016/0370258 | A1 | 12/2016 | Perez |
| 2017/0052536 | A1 | 2/2017 | Warner et al. |
| 2017/0090437 | A1 | 3/2017 | Veeramani et al. |
| 2017/0103327 | A1 | 4/2017 | Penilla et al. |
| 2017/0123389 | A1 | 5/2017 | Baez et al. |
| 2017/0134415 | A1 | 5/2017 | Muddu et al. |
| 2017/0277769 | A1 | 9/2017 | Pasupathy et al. |
| 2017/0315697 | A1 | 11/2017 | Jacobson et al. |
| 2018/0176241 | A1 | 6/2018 | Manadhata et al. |

OTHER PUBLICATIONS

Search Report for International Application No. PCT/US2017/052060, dated Oct. 5, 2017, 11 pages.
Search Report for International Application No. PCT/US2017/052633, dated Oct. 23, 2017, 9 pages.
Search Report for International Application No. PCT/US2017/052829, dated Nov. 27, 2017, 24 pages.
Office Action for U.S. Appl. No. 15/644,560, dated Nov. 3, 2017, 24 pages.
Office Action for U.S. Appl. No. 15/644,581, dated Sep. 26, 2017, 13 pages.
Final Office Action for U.S. Appl. No. 15/644,560, dated May 21, 2018, 31 pages.
Office Action for U.S. Appl. No. 15/644,519, dated Sep. 12, 2017, 9 pages.
Office Action for U.S. Appl. No. 15/644,519, dated Mar. 31, 2018, 8 pages.
Office Action for U.S. Appl. No. 15/644,560, dated May 21, 2018, 31 pages.
Notice of Allowance for U.S. Appl. No. 15/644,519, dated Jul. 26, 2018, 12 pages.
Notice of Allowance for U.S. Appl. No. 15/644,581, dated Aug. 8, 2018, 9 pages.
Balaji et al, "Brick: Towards a Unified Metadata Schema for Buildings," dated Nov. 16-17, 2016, 10 pages.
Balaji et al, Brick: Metadata schema for portable smart building applications, dated Sep. 25, 2017, 20 pages.
Balaji et al, Demo Abstract: Portable Queries Using the Brick Schema for Building Applications, dated Nov. 16-17, 2016, 2 pages.
Bhattacharya et al., Short Paper: Analyzing Metadata Schemas for Buildings—The Good, The Bad and The Ugly, ACM, Nov. 4-5, 2015, 4 pages.
Brick: Towards a Unified Metadata Schema for Buildings, dated Nov. 16, 2016, 46 pages.
Building Blocks for Smart Buildings, BrickSchema.org, Mar. 2019, 17 pages.
Fierro et al., Beyond a House of Sticks: Formalizing Metadata Tags with Brick, dated Nov. 13-14, 2019, 10 pages.
Fierro et al., Dataset: An Open Dataset and Collection Tool for BMS Point Labels, dated Nov. 10, 2019, 3 pages.
Fierro et al., Design and Analysis of a Query Processor for Brick, dated Jan. 2018, 25 pages.
Fierro et al., Design and Analysis of a Query Processor for Brick, dated Nov. 8-9, 2017, 10 pages.
Fierro et al., Mortar: An Open Testbed for Portable Building Analytics, dated Nov. 7-8, 2018, 10 pages.
Fierro et al., Why Brick is a Game Changer for Smart Buildings, Memoori Webinar, 2019, 67 pages.
Fierro, Writing Portable Building Analytics with the Brick Metadata Schema, UC Berkeley ACM E-Energy, 2019, 39 pages.
Gao et al., A large-scale evaluation of automated metadata inference approaches on sensors from air handling units, dated May 1, 2018, pp. 14-30.
Koh et al., "Scrabble: Transferrable Semi-Automated Semantic Metadata Normalization using Intermediate Representation," Nov. 7-8, 2018, 10 pages.
Koh et al., Plaster: An Integration, Benchmark, and Development Framework for Metadata Normalization Methods, dated Nov. 7-8, 2018, 10 pages.

(56) References Cited

OTHER PUBLICATIONS

Koh et al., Who can Access What, and When?, dated Nov. 13-14, 2019, 4 pages.
Metadata Schema for Buildings, 3 pages, Brickschema.org (Cannot confirm date.).
International Search Report and Written Opinion on PCT/US2018/052974, dated Dec. 19, 2018, 13 pages.
International Search Report and Written Opinion on PCT/US2018/052975, dated Jan. 2, 2019, 13 pages.

\* cited by examiner

| Raw Data Timeseries | |
|---|---|
| Timestamp | Value |
| 2015-12-31T23:10:00 | 10 |
| 2015-12-31T23:20:01 | 20 |
| 2015-12-31T23:30:02 | 30 |
| 2015-12-31T23:40:03 | 40 |
| 2015-12-31T23:50:04 | 50 |
| 2016-01-01T00:00:05 | 60 |
| 2016-01-01T00:10:06 | 70 |
| 2016-01-01T00:20:07 | 80 |
| 2016-01-01T00:30:08 | 90 |
| 2016-01-01T00:40:09 | 100 |
| 2016-01-01T00:50:10 | 110 |

| Average Quarter-Hour Timeseries | |
|---|---|
| Timestamp | Value |
| 2015-12-31T23:00:00 | 10 |
| 2015-12-31T23:15:00 | 20 |
| 2015-12-31T23:30:00 | 35 |
| 2015-12-31T23:45:00 | 50 |
| 2016-01-01T00:00:00 | 65 |
| 2016-01-01T00:15:00 | 80 |
| 2016-01-01T00:30:00 | 95 |
| 2016-01-01T00:45:00 | 110 |

| Average Hourly Timeseries | | Average Daily Timeseries | |
|---|---|---|---|
| Timestamp | Value | Timestamp | Value |
| 2015-12-31T23:00:00 | 28.8 | 2015-12-31T23:00:00 | 28.8 |
| | | | |
| 2016-01-01T00:00:00 | 87.5 | 2016-01-01T00:00:00 | 87.5 |

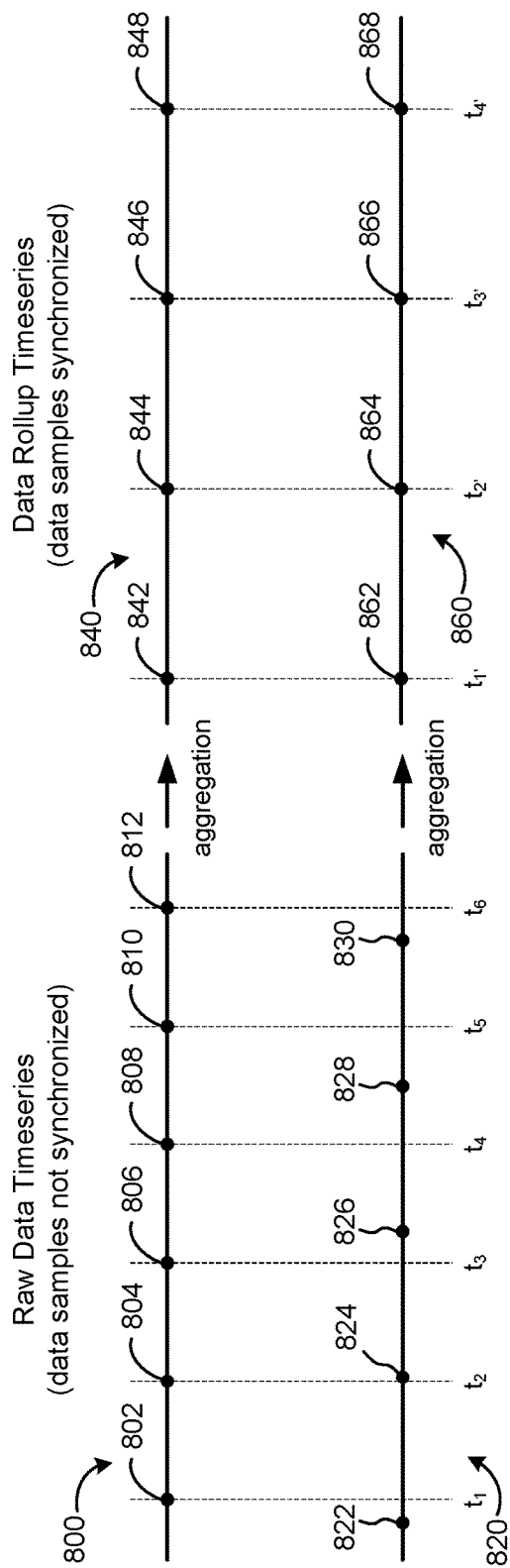
FIG. 8
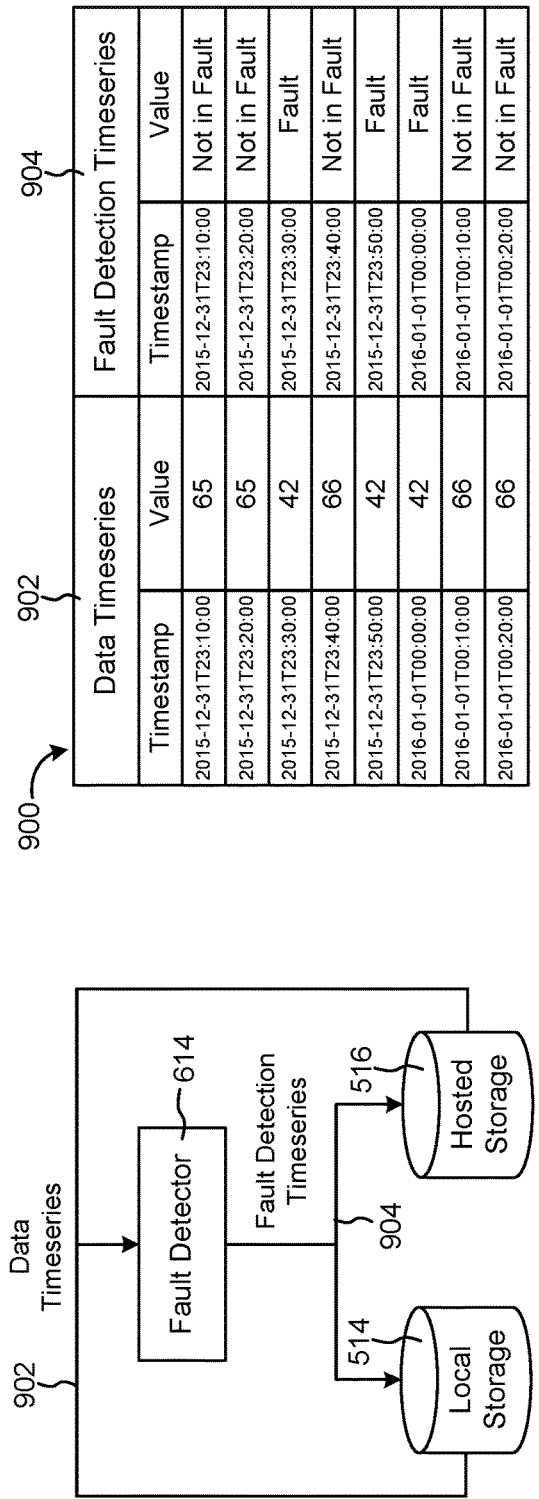
FIG. 9A
FIG. 9B

920 ⟶

| Event ID | Start Time | End Time | State |
|---|---|---|---|
| 1 | 00:00 | 01:59 | Cold |
| 2 | 02:00 | 08:59 | Cool |
| 3 | 09:00 | 11:59 | Warm |
| 4 | 12:00 | 15:59 | Hot |
| 5 | 16:00 | 18:59 | Warm |
| 6 | 19:00 | 21:59 | Cool |
| 7 | 22:00 | 23:59 | Cold |

| Timestamp | OAT | State |
|---|---|---|
| 00:00 | 43 | Cold |
| 01:00 | 48 | Cold |
| 02:00 | 51 | Cool |
| 03:00 | 54 | Cool |
| 04:00 | 57 | Cool |
| 05:00 | 60 | Cool |
| 06:00 | 65 | Cool |
| 07:00 | 69 | Cool |
| 08:00 | 76 | Warm |
| 09:00 | 83 | Warm |
| 10:00 | 94 | Warm |
| 11:00 | 99 | Hot |
| 12:00 | 108 | Hot |
| 13:00 | 110 | Hot |
| 14:00 | 110 | Hot |
| 15:00 | 106 | Warm |
| 16:00 | 98 | Warm |
| 17:00 | 91 | Warm |
| 18:00 | 81 | Warm |
| 19:00 | 74 | Cool |
| 20:00 | 65 | Cool |
| 21:00 | 54 | Cool |
| 22:00 | 48 | Cold |
| 23:00 | 44 | Cold |

| Timestamp | OAT | State |
|---|---|---|
| 00:00 | 43 | Cold |
| 01:00 | 48 | Cold |
| 02:00 | 51 | Cool |
| 03:00 | 54 | Cool |
| 04:00 | 57 | Cool |
| 05:00 | 60 | Cool |
| 06:00 | 65 | Cool |
| 07:00 | 69 | Cool |
| 08:00 | 76 | Cool |
| 09:00 | 83 | Warm |
| 10:00 | 94 | Warm |
| 11:00 | 99 | Warm |
| 12:00 | 108 | Hot |
| 13:00 | 110 | Hot |
| 14:00 | 110 | Hot |
| 15:00 | 106 | Hot |
| 16:00 | 98 | Warm |
| 17:00 | 91 | Warm |
| 18:00 | 81 | Warm |
| 19:00 | 74 | Cool |

FIG. 9E $t_1$ → 921 ↘

| Event ID | Start Time | End Time | State |
|---|---|---|---|
| 1 | 00:00 | 01:59 | Cold |
| 2 | 02:00 | 08:59 | Cool |
| 3 | 09:00 | 11:59 | Warm |
| 4 | 12:00 | Null | Hot |

FIG. 9F $t_2$ → 922 ↘

| Event ID | Start Time | End Time | State |
|---|---|---|---|
| 1 | 00:00 | 01:59 | Cold |
| 2 | 02:00 | 08:59 | Cool |
| 3 | 09:00 | 11:59 | Warm |
| 4 | 12:00 | ~~Null~~ 15:59 | Hot |
| 5 | 16:00 | Null | Warm |

FIG. 9G no update at $t_3$ or $t_4$ $t_5$ → 925 ↘

| Event ID | Start Time | End Time | State |
|---|---|---|---|
| 1 | 00:00 | 01:59 | Cold |
| 2 | 02:00 | 08:59 | Cool |
| 3 | 09:00 | 11:59 | Warm |
| 4 | 12:00 | 15:59 | Hot |
| 5 | 16:00 | ~~Null~~ 18:59 | Warm |
| 6 | 19:00 | Null | Cool |

FIG. 9H

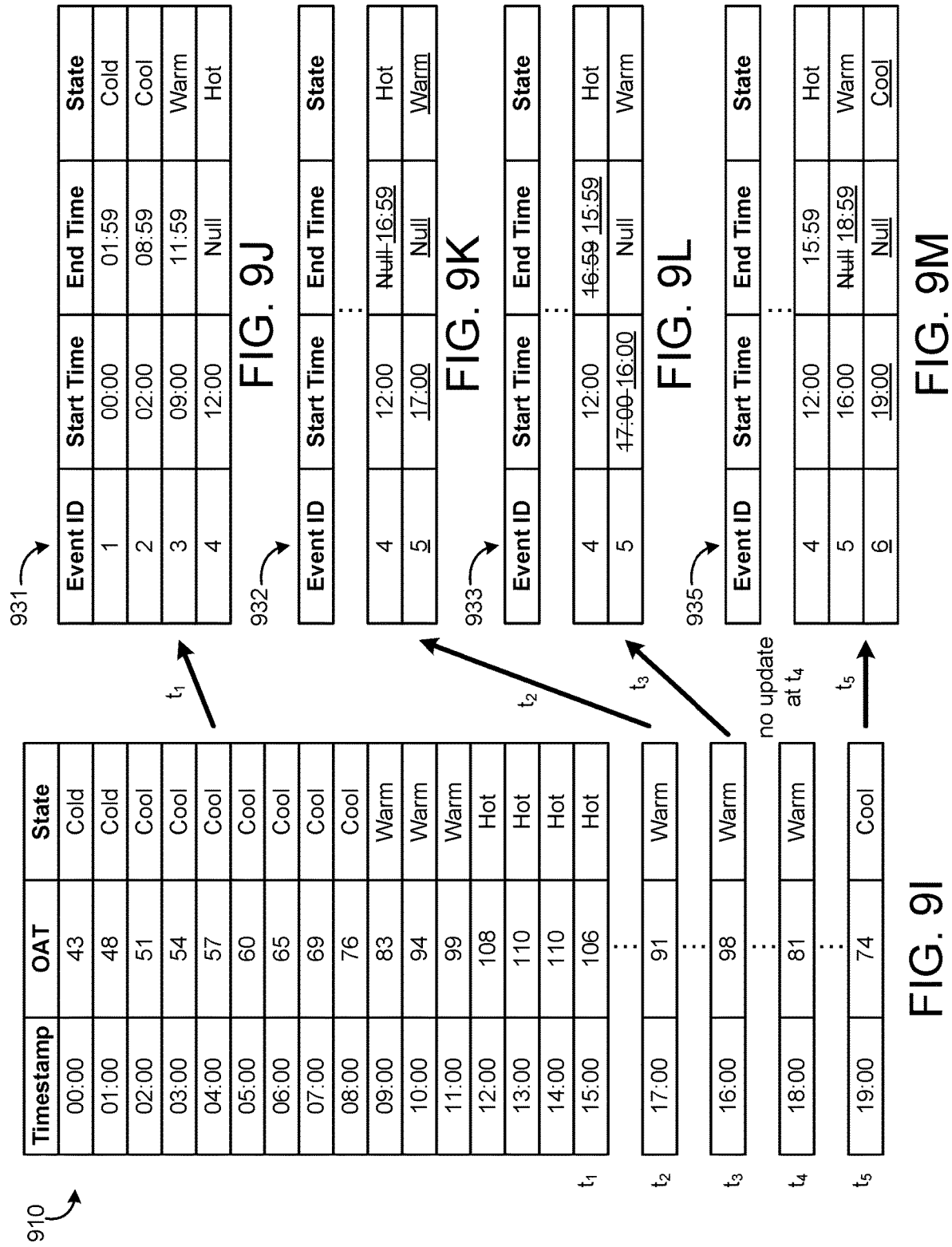

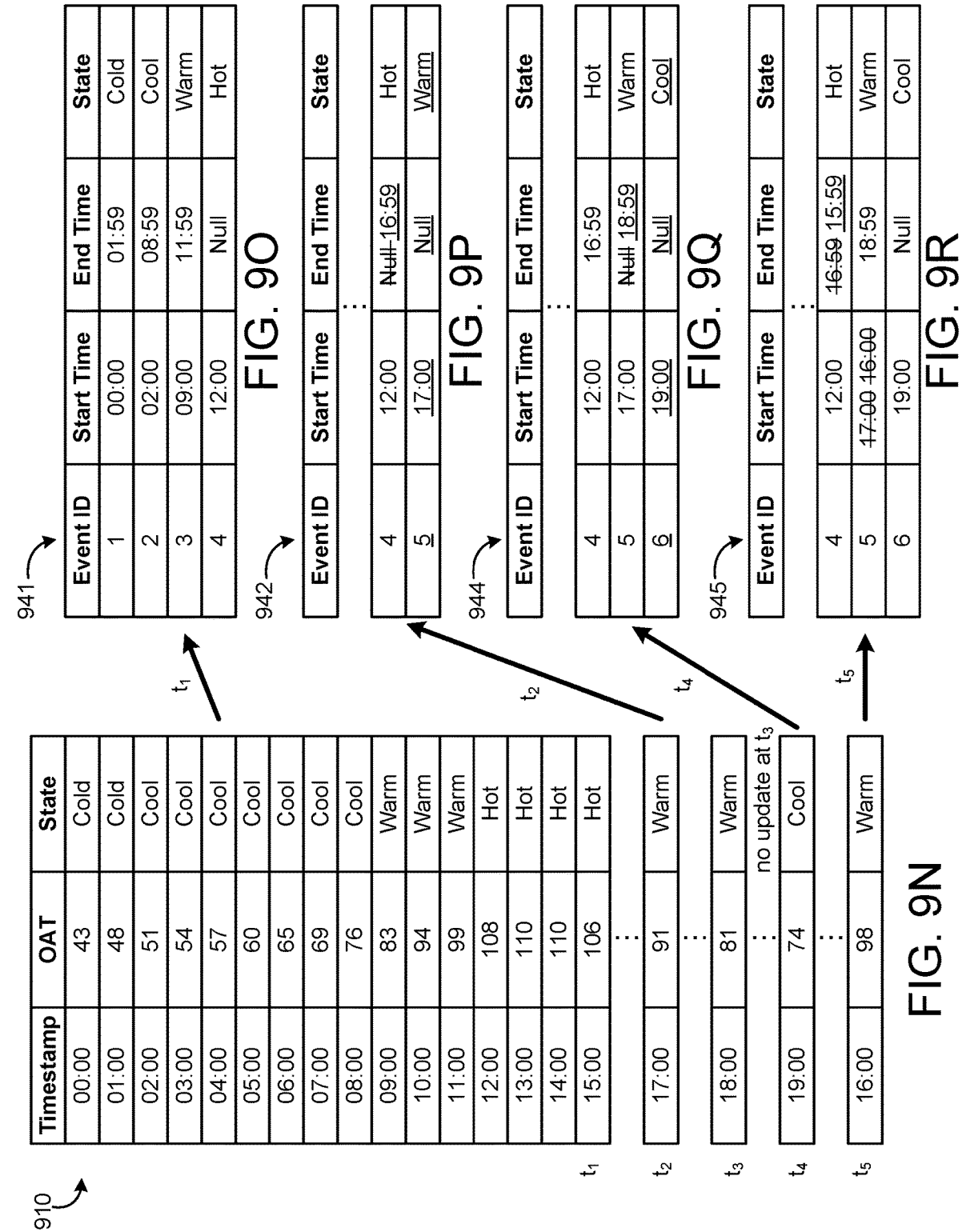

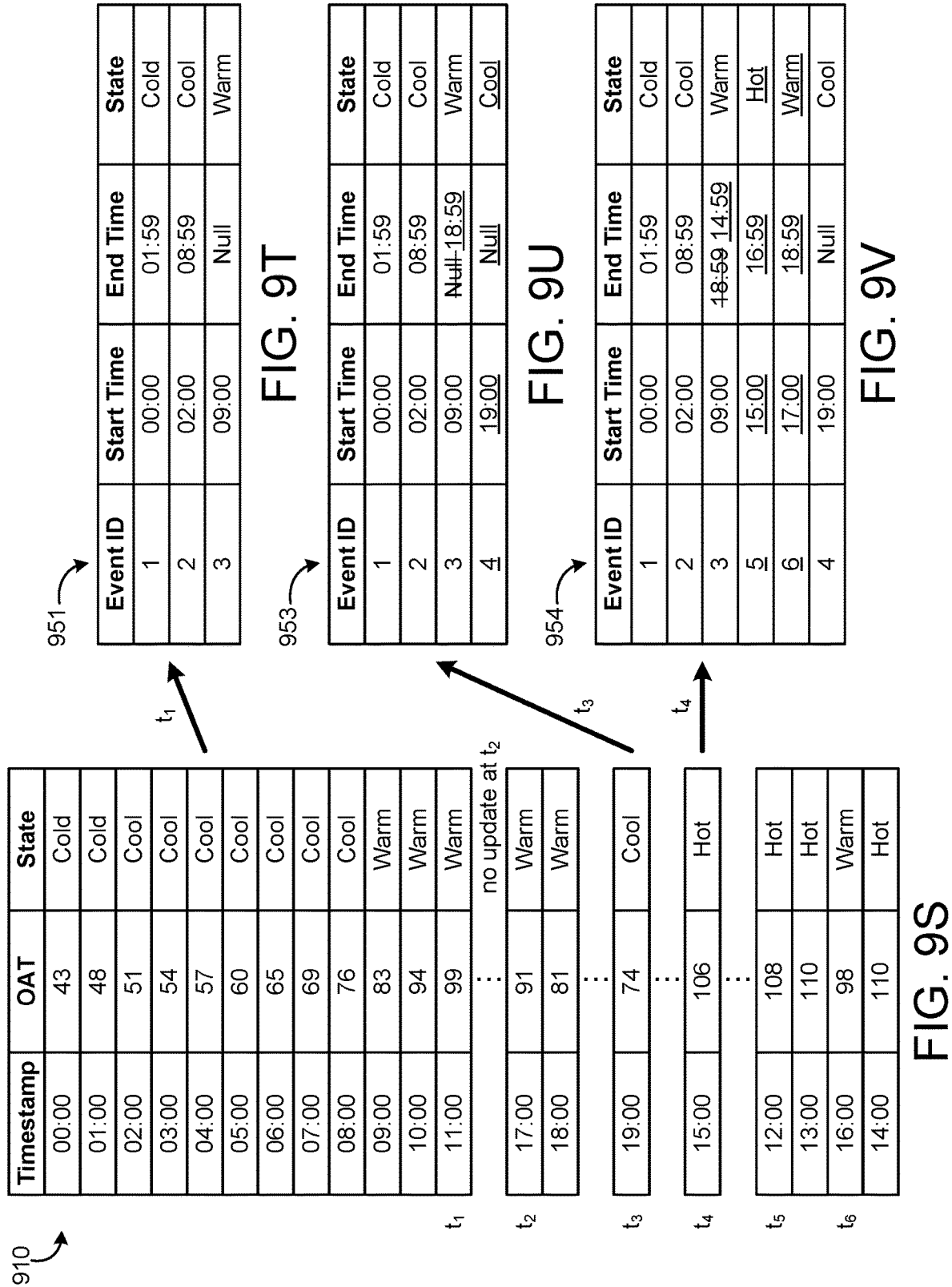

FIG. 9W (910)

| Timestamp | OAT | State |
|---|---|---|
| 00:00 | 43 | Cold |
| 01:00 | 48 | Cold |
| 02:00 | 51 | Cool |
| 03:00 | 54 | Cool |
| 04:00 | 57 | Cool |
| 05:00 | 60 | Cool |
| 06:00 | 65 | Cool |
| 07:00 | 69 | Cool |
| 08:00 | 76 | Cool |
| 09:00 | 83 | Warm |
| 10:00 | 94 | Warm |
| 11:00 | 99 | Warm |
| 17:00 | 91 | Warm |
| 18:00 | 81 | Warm |
| 19:00 | 74 | Cool |
| 15:00 | 106 | Hot |
| 12:00 | 108 | Hot |
| 13:00 | 110 | Hot |
| 16:00 | 98 | Warm |
| 14:00 | 110 | Hot |

| Event ID | Start Time | End Time | State |
|---|---|---|---|
| 1 | 00:00 | 01:59 | Cold |
| 2 | 02:00 | 08:59 | Cool |
| 3 | 09:00 | ~~14:59~~ 11:59 | Warm |
| 5 | ~~15:00~~ 12:00 | 16:59 | Hot |
| 6 | 17:00 | 18:59 | Warm |
| 4 | 19:00 | Null | Cool |

FIG. 9Y (956)

| Event ID | Start Time | End Time | State |
|---|---|---|---|
| 1 | 00:00 | 01:59 | Cold |
| 2 | 02:00 | 08:59 | Cool |
| 3 | 09:00 | 11:59 | Warm |
| 5 | 12:00 | ~~16:59~~ 15:59 | Hot |
| 6 | ~~17:00~~ 16:00 | 18:59 | Warm |
| 4 | 19:00 | Null | Cool |

BUILDING MANAGEMENT SYSTEM WITH TIMESERIES PROCESSING

CROSS-REFERENCE TO RELATED PATENT APPLICATIONS

This application is a continuation of U.S. patent application Ser. No. 15/644,581 filed Jul. 7, 2017, which claims the benefit of and priority to U.S. Provisional Patent Application No. 62/457,654 filed Feb. 10, 2017. The entire disclosure of each of these patent applications is incorporated by reference herein.

BACKGROUND

The present disclosure relates generally to the field of building management systems. A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

A BMS can collect data from sensors and other types of building equipment. Data can be collected over time and combined into streams of timeseries data. Each sample of the timeseries data can include a timestamp and a data value. Some BMSs store raw timeseries data in a relational database without significant organization or processing at the time of data collection. Applications that consume the timeseries data are typically responsible for retrieving the raw timeseries data from the database and generating views of the timeseries data that can be presented via a chart, graph, or other user interface. These processing steps are typically performed in response to a request for the timeseries data, which can significantly delay data presentation at query time.

SUMMARY

One implementation of the present disclosure is a building management system (BMS). The BMS includes building equipment configured to provide raw data samples of one or more data points in the BMS, a data collector configured to collect the raw data samples from the building equipment and generate one or more raw data timeseries including a plurality of the raw data samples, and a timeseries processing engine. The timeseries processing engine is configured to identify an initial timeseries processing workflow that applies to the raw data timeseries. The initial timeseries processing workflow includes a predefined sequence of timeseries processing operations. The timeseries processing engine is configured to identify one or more other data timeseries required as inputs to the initial timeseries processing workflow and generate an enriched timeseries processing workflow that includes the initial timeseries processing workflow, the raw data timeseries, and the other data timeseries. The timeseries processing engine is configured to execute the enriched timeseries processing workflow to generate one or more derived data timeseries from the raw data timeseries and the one or more other data timeseries. The BMS further includes a timeseries storage interface configured to store the raw data timeseries and the derived data timeseries in a timeseries database.

In some embodiments, the timeseries processing engine is configured to identify and obtain samples of the raw data timeseries and the other data timeseries required to perform the timeseries processing operations and generate the enriched timeseries processing workflow comprising the identified samples of the raw data timeseries and the other data timeseries.

In some embodiments, the timeseries processing engine is configured to determine a time window based on an aggregation period specified by the timeseries processing operations and obtain samples of the raw data timeseries and the other data timeseries that have timestamps within the time window. In some embodiments, the timeseries processing engine is configured to determine the time window based on a timestamp of the raw data samples and a duration of the aggregation period specified by the timeseries processing operations.

In some embodiments, the timeseries processing engine is configured to tag each of the timeseries processing operations in the enriched timeseries processing workflow with an indication of an execution engine and execute each timeseries processing operation using the indicated execution engine.

In some embodiments, the timeseries processing engine is configured to accept a post-sample request associated with the raw data timeseries and execute the post-sample request in response to obtaining one or more new samples of the raw data timeseries.

In some embodiments, the initial timeseries processing workflow includes an indication of one or more input timeseries to which the initial timeseries processing workflow applies, the predefined sequence of timeseries processing operations, and an indication of one or more derived data timeseries generated by applying the predefined sequence of timeseries processing operations to the input timeseries.

In some embodiments, the input timeseries include at least one of the one or more raw data timeseries generated by the data collector, or the one or more derived data timeseries generated by the timeseries processing engine.

In some embodiments, the initial timeseries processing workflow includes a directed acyclic graph visually representing the predefined sequence of timeseries operations in the initial timeseries processing workflow. In some embodiments, the directed acyclic graph includes one or more input blocks representing one or more input timeseries to which the initial timeseries processing workflow applies, one or more functional blocks representing the predefined sequence of timeseries processing operations in the initial timeseries processing workflow, and one or more output blocks representing one or more derived data timeseries generated by applying the predefined sequence of timeseries processing operations to the input timeseries.

Another implementation of the present disclosure is a method for processing timeseries data in a building management system. The method includes operating building equipment to generate raw data samples of one or more data points in the building management system, collecting the raw data samples from the building equipment, generating one or more raw data timeseries that include a plurality of the raw data samples, and identifying an initial timeseries processing workflow that applies to the raw data timeseries. The initial timeseries processing workflow includes a predefined sequence of timeseries processing operations. The method further includes identifying one or more other data timeseries required as inputs to the initial timeseries processing workflow and generating an enriched timeseries processing workflow comprising the initial timeseries processing workflow, the raw data timeseries, and the other data timeseries. The method includes executing the enriched timeseries processing workflow to generate one or more derived data timeseries from the raw data timeseries and the one or more other data timeseries and storing the raw data timeseries and the derived data timeseries in a timeseries database.

In some embodiments, the method includes identifying and obtaining samples of the raw data timeseries and the other data timeseries required to perform the timeseries processing operations and generating the enriched timeseries processing workflow comprising the identified samples of the raw data timeseries and the other data timeseries.

In some embodiments, the method includes determining a time window based on an aggregation period specified by the timeseries processing operations and obtaining samples of the raw data timeseries and the other data timeseries that have timestamps within the time window.

In some embodiments, the method includes determining the time window based on a timestamp of the raw data samples and a duration of the aggregation period specified by the timeseries processing operations.

In some embodiments, the method includes tagging each of the timeseries processing operations in the enriched timeseries processing workflow with an indication of an execution engine and executing each timeseries processing operation using the indicated execution engine.

In some embodiments, the method includes accepting a post-sample request associated with the raw data timeseries and executing the post-sample request in response to obtaining one or more new samples of the raw data timeseries.

In some embodiments, the initial timeseries processing workflow includes an indication of one or more input timeseries to which the initial timeseries processing workflow applies, the predefined sequence of timeseries processing operations, and an indication of one or more derived data timeseries generated by applying the predefined sequence of timeseries processing operations to the input timeseries. In some embodiments, the input timeseries include at least one of the one or more raw data timeseries or the one or more derived data timeseries.

In some embodiments, the initial timeseries processing workflow includes a directed acyclic graph visually representing the predefined sequence of timeseries operations in the initial timeseries processing workflow. In some embodiments, the directed acyclic graph includes one or more input blocks representing one or more input timeseries to which the initial timeseries processing workflow applies, one or more functional blocks representing the predefined sequence of timeseries processing operations in the initial timeseries processing workflow, and one or more output blocks representing one or more derived data timeseries generated by applying the predefined sequence of timeseries processing operations to the input timeseries.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 8 is a drawing of several timeseries illustrating the synchronization of data samples which can be performed by the data aggregator shown in FIG. 6, according to some embodiments.

FIG. 9A is a flow diagram illustrating the creation and storage of a fault detection timeseries which can be performed by the fault detector shown in FIG. 6, according to some embodiments.

FIG. 9B is a data table which can be used to store the raw data timeseries and the fault detection timeseries, according to some embodiments.

FIG. 9C is a data table which can be used to store states assigned to samples of a data timeseries, according to some embodiments.

FIG. 9D is a data table including various events generated based on the assigned states shown in the table of FIG. 9C, according to some embodiments.

FIG. 9E is a data table including a timeseries of data values and assigned states, according to some embodiments.

FIG. 9F is a data table including events which can be generated based on a first portion of the data table of FIG. 9E, according to some embodiments.

FIG. 9G is a data table illustrating updates to the events shown in the data table of FIG. 9F which can be made upon receiving a new sample of the timeseries shown in FIG. 9E, according to some embodiments.

FIG. 9H is another data table illustrating updates to the events shown in the data table of FIG. 9G which can be made upon receiving a new sample of the timeseries shown in FIG. 9E, according to some embodiments.

FIG. 9I is a data table including a timeseries of data values and assigned states in which one of the data samples is received out of order, according to some embodiments.

FIG. 9J is a data table including events which can be generated based on a first portion of the data table of FIG. 9I, according to some embodiments.

FIG. 9K is a data table illustrating updates to the events shown in the data table of FIG. 9J which can be made upon receiving a new sample of the timeseries shown in FIG. 9I, according to some embodiments.

FIG. 9L is another data table illustrating updates to the events shown in the data table of FIG. 9K which can be made upon receiving a new sample of the timeseries shown in FIG. 9I, according to some embodiments.

FIG. 9M is another data table illustrating updates to the events shown in the data table of FIG. 9L which can be made upon receiving a new sample of the timeseries shown in FIG. 9I, according to some embodiments.

FIG. 9N is another data table including a timeseries of data values and assigned states in which one of the data samples is received out of order, according to some embodiments.

FIG. 9O is a data table including events which can be generated based on a first portion of the data table of FIG. 9N, according to some embodiments.

FIG. 9P is a data table illustrating updates to the events shown in the data table of FIG. 9O which can be made upon receiving a new sample of the timeseries shown in FIG. 9N, according to some embodiments.

FIG. 9Q is another data table illustrating updates to the events shown in the data table of FIG. 9P which can be made upon receiving a new sample of the timeseries shown in FIG. 9N, according to some embodiments.

FIG. 9R is another data table illustrating updates to the events shown in the data table of FIG. 9P which can be made upon receiving a new sample of the timeseries shown in FIG. 9N, according to some embodiments.

FIG. 9S is a data table including a timeseries of data values and assigned states in which several of the data samples are received out of order, according to some embodiments.

FIG. 9T is a data table including events which can be generated based on a first portion of the data table of FIG. 9S, according to some embodiments.

FIG. 9U is a data table illustrating updates to the events shown in the data table of FIG. 9T which can be made upon receiving a new sample of the timeseries shown in FIG. 9S, according to some embodiments.

FIG. 9V is another data table illustrating updates to the events shown in the data table of FIG. 9U which can be made upon receiving a new sample of the timeseries shown in FIG. 9S, according to some embodiments.

FIG. 9W is another data table including a timeseries of data values and assigned states in which several of the data samples are received out of order, according to some embodiments.

FIG. 9X is a data table illustrating updates to the events shown in the data table of FIG. 9V which can be made upon receiving a new sample of the timeseries shown in FIG. 9W, according to some embodiments.

FIG. 9Y is another data table illustrating updates to the events shown in the data table of FIG. 9X which can be made upon receiving a new sample of the timeseries shown in FIG. 9W, according to some embodiments.

DETAILED DESCRIPTION

Overview

Figure 1:
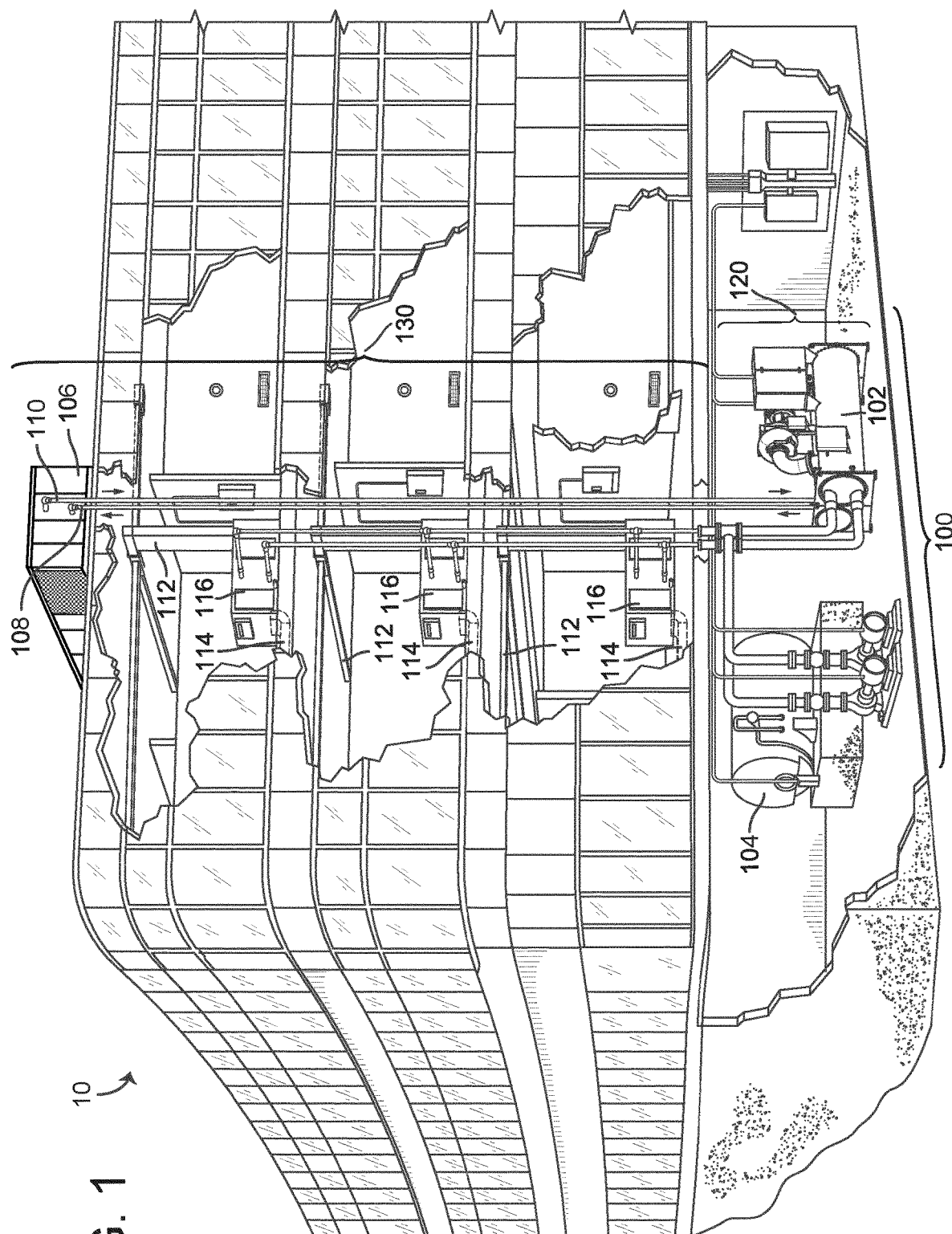
FIG. 1 is a drawing of a building equipped with a building management system (BMS) and a HVAC system, according to some embodiments.

Referring generally to the FIGURES, a building management system (BMS) with declarative views of timeseries data is shown, according to various embodiments. The BMS is configured to collect data samples from building equipment (e.g., sensors, controllable devices, building subsystems, etc.) and generate raw timeseries data from the data samples. The BMS can process the raw timeseries data using a variety of data platform services to generate derived timeseries data (e.g., data rollup timeseries, virtual point timeseries, fault detection timeseries, etc.). The derived timeseries data can be provided to various applications and/or stored in local or hosted storage. In some embodiments, the BMS includes three different layers that separate (1) data collection, (2) data storage, retrieval, and analysis, and (3) data visualization. This allows the BMS to support a variety of applications that use the derived timeseries data and allows new applications to reuse the infrastructure provided by the data platform services.

In some embodiments, the BMS includes a data collector configured to collect raw data samples from the building equipment. The data collector can generate a raw data timeseries including a plurality of the raw data samples and store the raw data timeseries in the timeseries database. In some embodiments, the data collector stores each of the raw data samples with a timestamp. The timestamp can include a local time indicating the time at which the raw data sample was collected in whichever time zone the raw data sample was collected. The timestamp can also include a time offset indicating a difference between the local time and universal time. The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs.

In some embodiments, the data platform services include a sample aggregator. The sample aggregator can aggregate predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by the data aggregator provide an efficient mechanism for various applications to query the timeseries data. For example, the applications can construct visualizations of the timeseries data (e.g., charts, graphs, etc.) using the pre-aggregated data rollups instead of the raw timeseries data. This allows the applications to simply retrieve and present the pre-aggregated data rollups without requiring applications to perform an aggregation in response to the query. Since the data rollups are pre-aggregated, the applications can present the data rollups quickly and efficiently without requiring additional processing at query time to generate aggregated timeseries values.

In some embodiments, the data platform services include a virtual point calculator. The virtual point calculator can calculate virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, the virtual point calculator can calculate a virtual data point (pointID$_3$) by adding two or more actual data points (pointID$_1$ and pointID$_2$) (e.g., pointID$_3$=pointID$_1$+pointID$_2$). As another example, the virtual point calculator can calculate an enthalpy data point (pointID$_4$) based on a measured temperature data point (pointID$_5$) and a measured pressure data point (pointID$_6$) (e.g., pointID$_4$=enthalpy(pointID$_5$, pointID$_6$)). The virtual data points can be stored as derived timeseries data.

Applications can access and use the virtual data points in the same manner as the actual data points. The applications do not need to know whether a data point is an actual data point or a virtual data point since both types of data points can be stored as derived timeseries data and can be handled in the same manner by the applications. In some embodiments, the derived timeseries data are stored with attributes designating each data point as either a virtual data point or an actual data point. Such attributes allow the applications to identify whether a given timeseries represents a virtual data point or an actual data point, even though both types of data points can be handled in the same manner by the applications.

In some embodiments, the data platform services include a fault detector configured to analyze the timeseries data to detect faults. Fault detection can be performed by applying a set of fault detection rules to the timeseries data to determine whether a fault is detected at each interval of the timeseries. Fault detections can be stored as derived timeseries data. For example, new timeseries can be generated with data values that indicate whether a fault was detected at each interval of the timeseries. The time series of fault detections can be stored along with the raw timeseries data and/or derived timeseries data in local or hosted data storage. These and other features of the building management system are described in greater detail below.

Building Management System and HVAC System

Referring now to FIGS. 1-4, an exemplary building management system (BMS) and HVAC system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
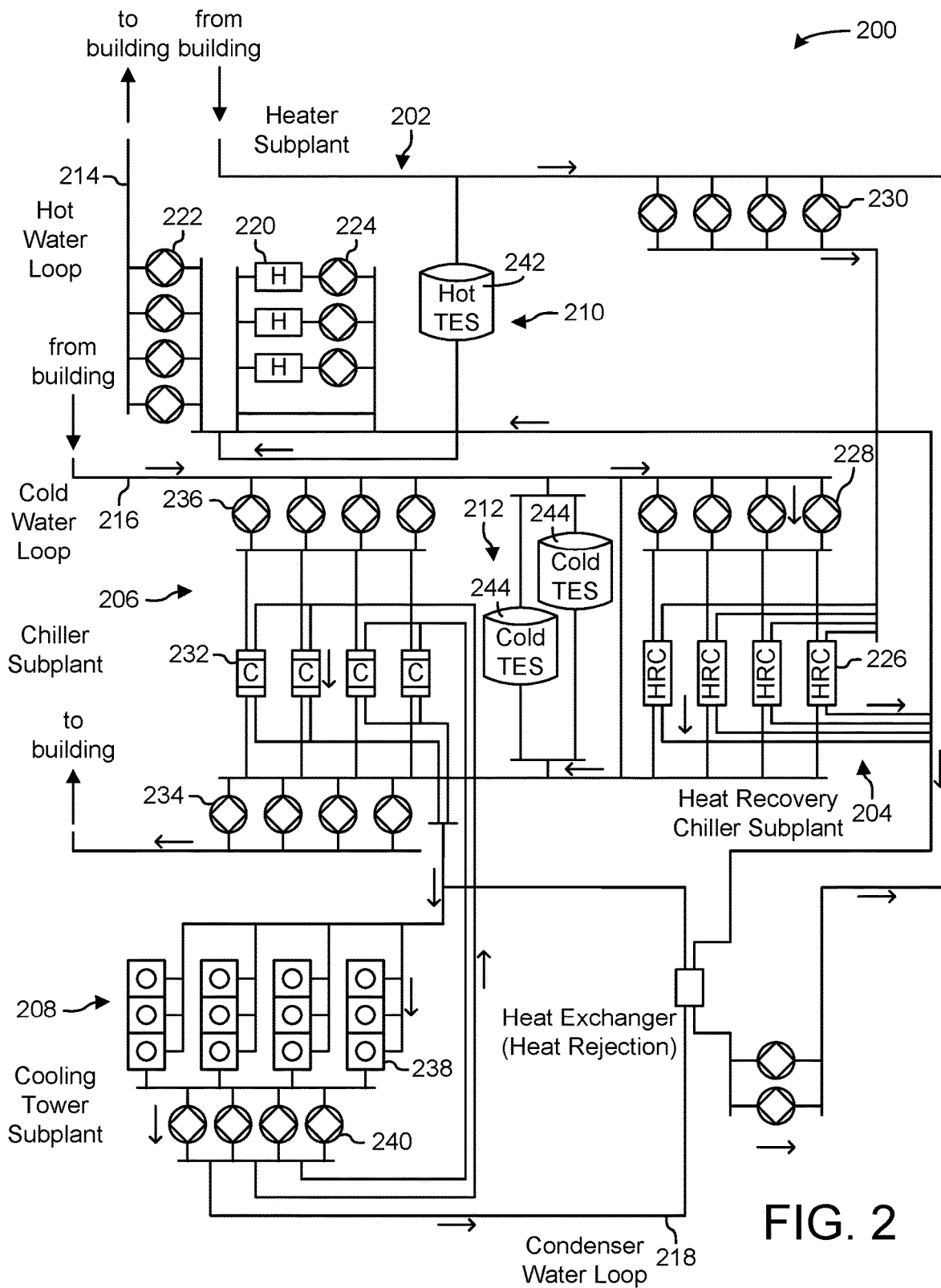
FIG. 2 is a schematic of a waterside system which can be used as part of the HVAC system of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
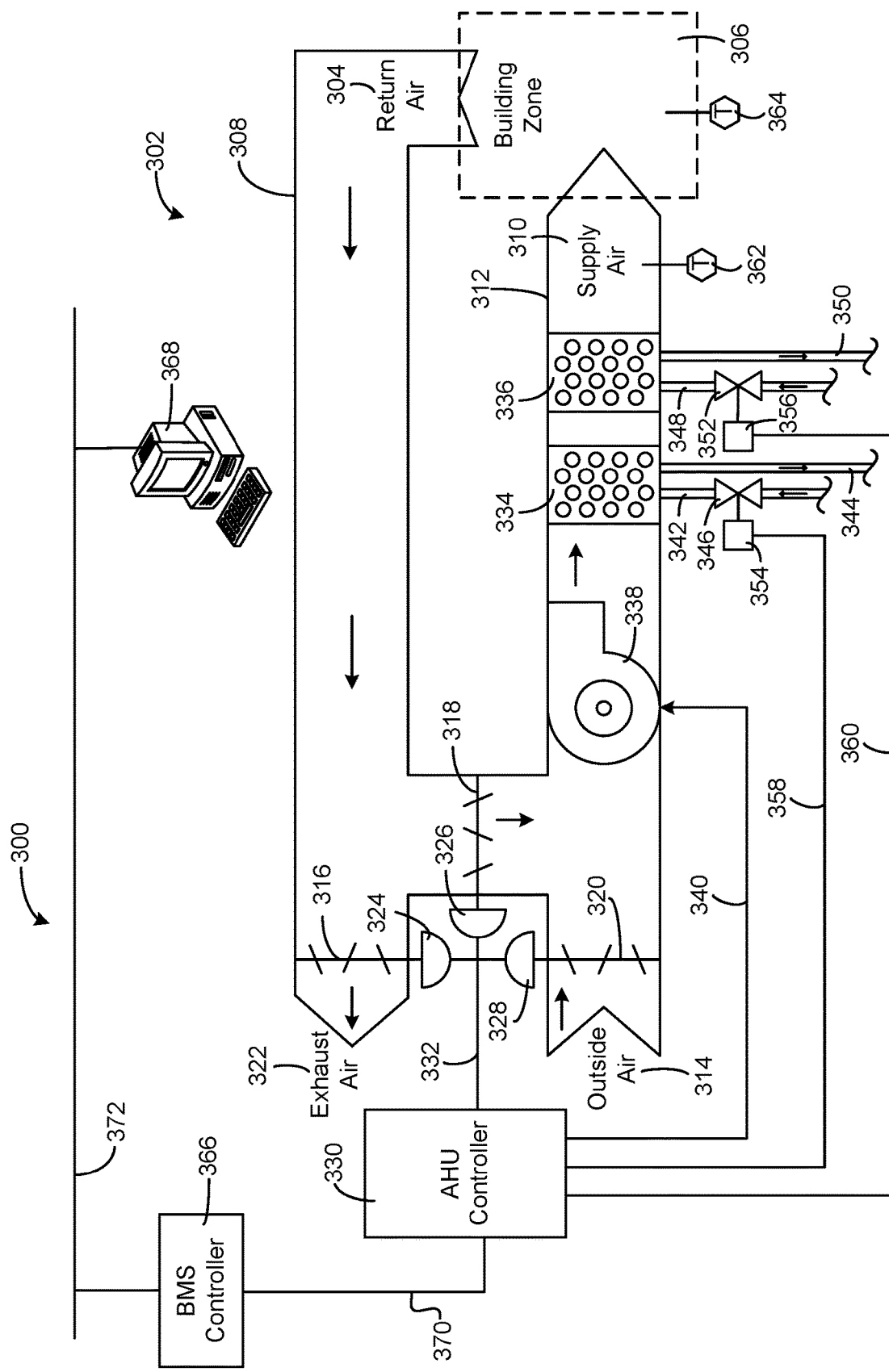
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, a client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
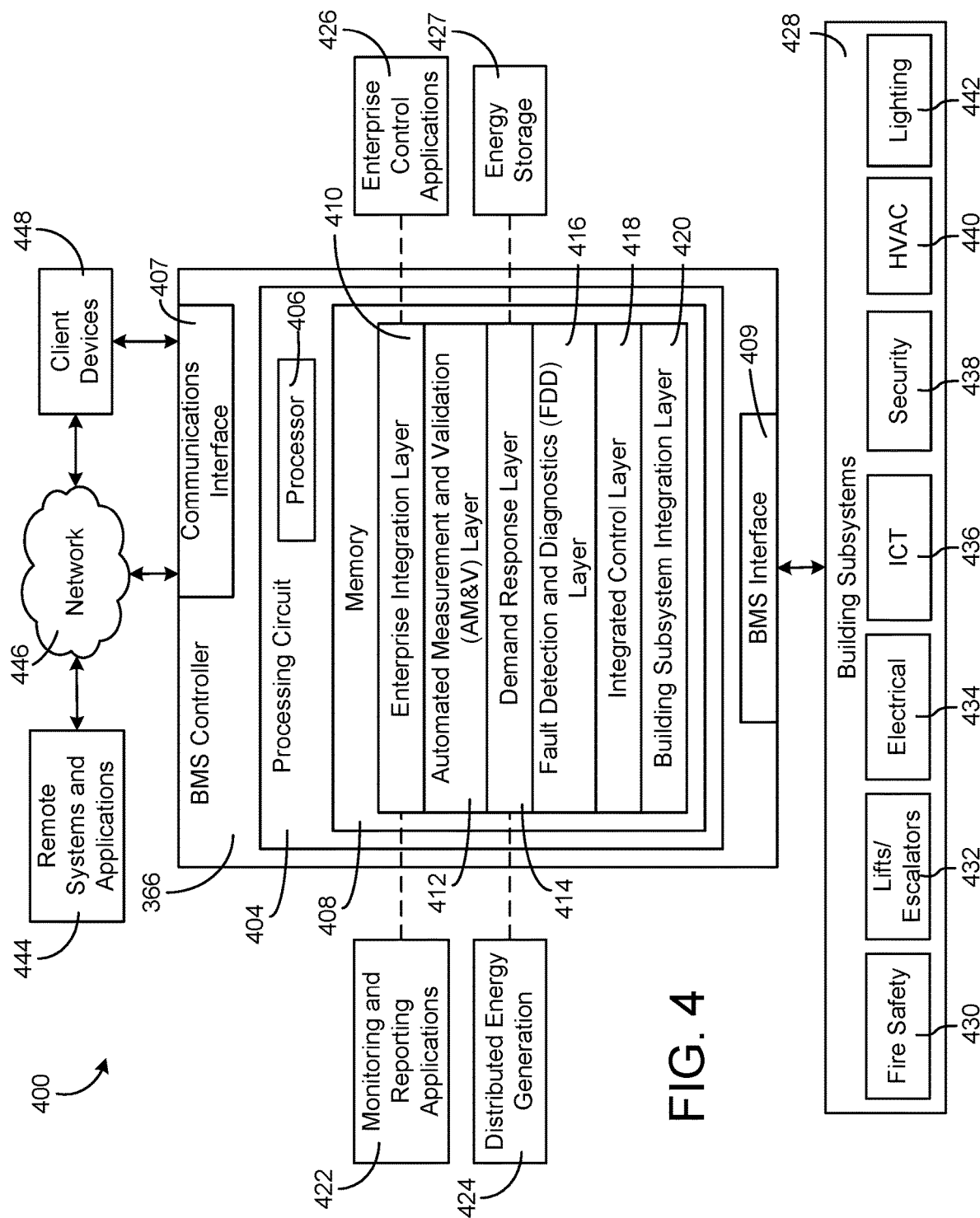
FIG. 4 is a block diagram of a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Building Management System with Data Platform Services

Figure 5:
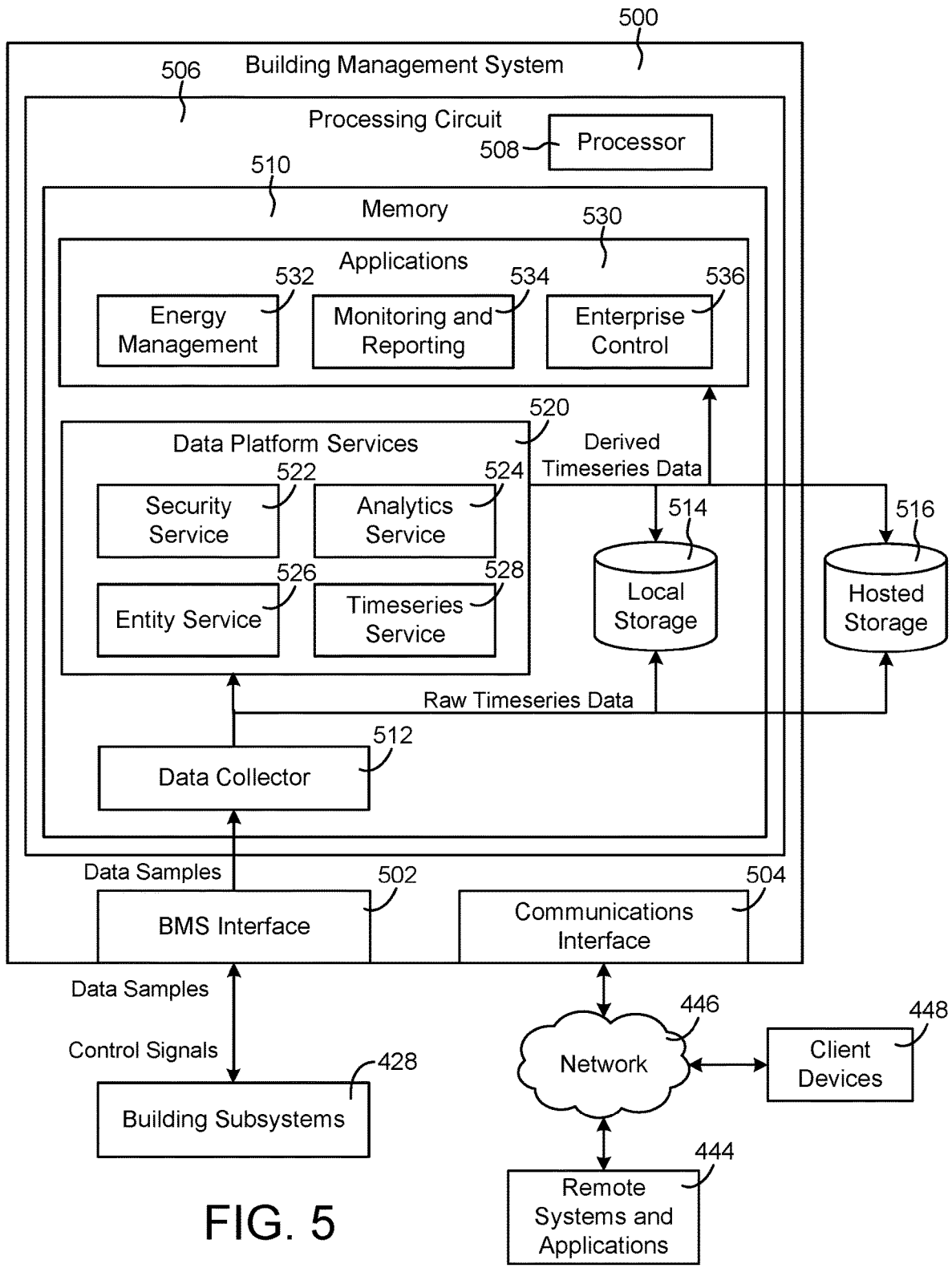
FIG. 5 is a block diagram of another BMS which can be used in the building of FIG. 1, including a data collector, data platform services, applications, and a dashboard layout generator, according to some embodiments.

Referring now to FIG. 5, a block diagram of another building management system (BMS) 500 is shown, according to some embodiments. BMS 500 can be configured to collect data samples from building subsystems 428 and generate raw timeseries data from the data samples. BMS 500 can process and transform the raw timeseries data using data platform services 520 to generate derived timeseries data. Throughout this disclosure, the term "derived timeseries data" is used to describe the result or output of a transformation or other timeseries processing operation performed by data platform services 520 (e.g., data aggregation, data cleansing, virtual point calculation, etc.). The derived timeseries data can be provided to various applications 530 and/or stored in local storage 514 or hosted storage 516 (e.g., as materialized views of the raw timeseries data). In some embodiments, BMS 500 separates data collection; data storage, retrieval, and analysis; and data visualization into three different layers. This allows BMS 500 to support a variety of applications 530 that use the derived timeseries data and allows new applications 530 to reuse the existing infrastructure provided by data platform services 520.

Before discussing BMS 500 in greater detail, it should be noted that the components of BMS 500 can be integrated within a single device (e.g., a supervisory controller, a BMS controller, etc.) or distributed across multiple separate systems or devices. For example, the components of BMS 500 can be implemented as part of a METASYS® brand building automation system, as sold by Johnson Controls Inc. In other embodiments, some or all of the components of BMS 500 can be implemented as part of a cloud-based computing system configured to receive and process data from one or more building management systems. In other embodiments, some or all of the components of BMS 500 can be components of a subsystem level controller (e.g., a HVAC controller), a subplant controller, a device controller (e.g., AHU controller 330, a chiller controller, etc.), a field controller, a computer workstation, a client device, or any other system or device that receives and processes data from building equipment.

BMS 500 can include many of the same components as BMS 400, as described with reference to FIG. 4. For example, BMS 500 is shown to include a BMS interface 502 and a communications interface 504. Interfaces 502-504 can include wired or wireless communications interfaces (e.g., jacks, antennas, transmitters, receivers, transceivers, wire terminals, etc.) for conducting data communications with building subsystems 428 or other external systems or devices. Communications conducted via interfaces 502-504 can be direct (e.g., local wired or wireless communications) or via a communications network 446 (e.g., a WAN, the Internet, a cellular network, etc.).

Communications interface 504 can facilitate communications between BMS 500 and external applications (e.g., remote systems and applications 444) for allowing user control, monitoring, and adjustment to BMS 500. Communications interface 504 can also facilitate communications between BMS 500 and client devices 448. BMS interface 502 can facilitate communications between BMS 500 and building subsystems 428. BMS 500 can be configured to communicate with building subsystems 428 using any of a variety of building automation systems protocols (e.g., BACnet, Modbus, ADX, etc.). In some embodiments, BMS 500 receives data samples from building subsystems 428 and provides control signals to building subsystems 428 via BMS interface 502.

Building subsystems 428 can include building electrical subsystem 434, information communication technology (ICT) subsystem 436, security subsystem 438, HVAC subsystem 440, lighting subsystem 442, lift/escalators subsystem 432, and/or fire safety subsystem 430, as described with reference to FIG. 4. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3. Each of building subsystems 428 can include any number of devices, controllers, and connections for completing its individual functions and control activities. Building subsystems 428 can include building equipment (e.g., sensors, air handling units, chillers, pumps, valves, etc.) configured to monitor and control a building condition such as temperature, humidity, airflow, etc.

Still referring to FIG. 5, BMS 500 is shown to include a processing circuit 506 including a processor 508 and memory 510. Processor 508 can be a general purpose or specific purpose processor, an application specific integrated circuit (ASIC), one or more field programmable gate arrays (FPGAs), a group of processing components, or other suitable processing components. Processor 508 is configured to execute computer code or instructions stored in memory 510 or received from other computer readable media (e.g., CDROM, network storage, a remote server, etc.).

Memory 510 can include one or more devices (e.g., memory units, memory devices, storage devices, etc.) for storing data and/or computer code for completing and/or facilitating the various processes described in the present disclosure. Memory 510 can include random access memory (RAM), read-only memory (ROM), hard drive storage, temporary storage, non-volatile memory, flash memory, optical memory, or any other suitable memory for storing software objects and/or computer instructions. Memory 510 can include database components, object code components, script components, or any other type of information structure for supporting the various activities and information structures described in the present disclosure. Memory 510 can be communicably connected to processor 508 via processing circuit 506 and can include computer code for executing (e.g., by processor 508) one or more processes described herein. When processor 508 executes instructions stored in memory 510, processor 508 generally configures processing circuit 506 to complete such activities.

Still referring to FIG. 5, BMS 500 is shown to include a data collector 512. Data collector 512 is shown receiving data samples from building subsystems 428 via BMS interface 502. In some embodiments, the data samples include data values for various data points. The data values can be measured or calculated values, depending on the type of data point. For example, a data point received from a temperature sensor can include a measured data value indicating a temperature measured by the temperature sensor. A data point received from a chiller controller can include a calculated data value indicating a calculated efficiency of the chiller. Data collector 512 can receive data samples from multiple different devices within building subsystems 428.

The data samples can include one or more attributes that describe or characterize the corresponding data points. For example, the data samples can include a name attribute defining a point name or ID (e.g., "B1F4R2.T-Z"), a device attribute indicating a type of device from which the data samples is received (e.g., temperature sensor, humidity sensor, chiller, etc.), a unit attribute defining a unit of measure associated with the data value (e.g., ° F., ° C., kPA, etc.), and/or any other attribute that describes the corresponding data point or provides contextual information regarding the data point. The types of attributes included in each data point can depend on the communications protocol used to send the data samples to BMS 500. For example, data samples received via the ADX protocol or BACnet protocol can include a variety of descriptive attributes along with the data value, whereas data samples received via the Modbus protocol may include a lesser number of attributes (e.g., only the data value without any corresponding attributes).

In some embodiments, each data sample is received with a timestamp indicating a time at which the corresponding data value was measured or calculated. In other embodiments, data collector 512 adds timestamps to the data samples based on the times at which the data samples are received. Data collector 512 can generate raw timeseries data for each of the data points for which data samples are received. Each timeseries can include a series of data values for the same data point and a timestamp for each of the data values. For example, a timeseries for a data point provided by a temperature sensor can include a series of temperature values measured by the temperature sensor and the corresponding times at which the temperature values were measured. An example of a timeseries which can be generated by data collector 512 is as follows:

[<key, timestamp$_1$, value$_1$>, <key, timestamp$_2$, value$_2$>, <key, timestamp$_3$, value$_3$>]

where key is an identifier of the source of the raw data samples (e.g., timeseries ID, sensor ID, etc.), timestamp$_i$ identifies the time at which the ith sample was collected, and value$_i$ indicates the value of the ith sample.

Data collector 512 can add timestamps to the data samples or modify existing timestamps such that each data sample includes a local timestamp. Each local timestamp indicates the local time at which the corresponding data sample was measured or collected and can include an offset relative to universal time. The local timestamp indicates the local time at the location the data point was measured at the time of measurement. The offset indicates the difference between the local time and a universal time (e.g., the time at the international date line). For example, a data sample collected in a time zone that is six hours behind universal time can include a local timestamp (e.g., Timestamp=2016-03-18T14:10:02) and an offset indicating that the local timestamp is six hours behind universal time (e.g., Offset=−6:00). The offset can be adjusted (e.g., +1:00 or −1:00) depending on whether the time zone is in daylight savings time when the data sample is measured or collected.

The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs. For example, the offset can be subtracted from the local timestamp to generate a universal time value that corresponds to the local timestamp without referencing an external database and without requiring any other information.

In some embodiments, data collector 512 organizes the raw timeseries data. Data collector 512 can identify a system or device associated with each of the data points. For example, data collector 512 can associate a data point with a temperature sensor, an air handler, a chiller, or any other type of system or device. In various embodiments, data collector uses the name of the data point, a range of values of the data point, statistical characteristics of the data point, or other attributes of the data point to identify a particular system or device associated with the data point. Data collector 512 can then determine how that system or device relates to the other systems or devices in the building site. For example, data collector 512 can determine that the identified system or device is part of a larger system (e.g., a HVAC system) or serves a particular space (e.g., a particular building, a room or zone of the building, etc.). In some embodiments, data collector 512 uses or creates an entity graph when organizing the timeseries data. An example of such an entity graph is described in greater detail with reference to FIG. 10A.

Data collector 512 can provide the raw timeseries data to data platform services 520 and/or store the raw timeseries data in local storage 514 or hosted storage 516. As shown in FIG. 5, local storage 514 can be data storage internal to BMS 500 (e.g., within memory 510) or other on-site data storage local to the building site at which the data samples are collected. Hosted storage 516 can include a remote database, cloud-based data hosting, or other remote data storage. For example, hosted storage 516 can include remote data storage located off-site relative to the building site at which the data samples are collected. Local storage 514 and hosted storage 516 can be configured to store the raw timeseries data obtained by data collector 512, the derived timeseries data generated by data platform services 520, and/or directed acyclic graphs (DAGs) used by data platform services 520 to process the timeseries data.

Still referring to FIG. 5, BMS 500 is shown to include data platform services 520. Data platform services 520 can receive the raw timeseries data from data collector 512 and/or retrieve the raw timeseries data from local storage 514 or hosted storage 516. Data platform services 520 can include a variety of services configured to analyze, process, and transform the raw timeseries data. For example, data platform services 520 are shown to include a security service 522, an analytics service 524, an entity service 526, and a timeseries service 528. Security service 522 can assign security attributes to the raw timeseries data to ensure that the timeseries data are only accessible to authorized individuals, systems, or applications. Entity service 524 can assign entity information to the timeseries data to associate data points with a particular system, device, or space. Timeseries service 528 and analytics service 524 can apply various transformations, operations, or other functions to the raw timeseries data to generate derived timeseries data.

In some embodiments, timeseries service 528 aggregates predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by timeseries service 528 provide an efficient mechanism for applications 530 to query the timeseries data. For example, applications 530 can construct visualizations of the timeseries data (e.g., charts, graphs, etc.) using the pre-aggregated data rollups instead of the raw timeseries data. This allows applications 530 to simply retrieve and present the pre-aggregated data rollups without requiring applications 530 to perform an aggregation in response to the query. Since the data rollups are pre-aggregated, applications 530 can present the data rollups quickly and efficiently without requiring additional processing at query time to generate aggregated timeseries values.

In some embodiments, timeseries service 528 calculates virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, timeseries service 528 can calculate a virtual data point (pointID$_3$) by adding two or more actual data points (pointID$_1$ and pointID$_2$) (e.g., pointID$_3$=pointID$_1$+pointID$_2$). As another example, timeseries service 528 can calculate an enthalpy data point (pointID$_4$) based on a measured temperature data point (pointID$_5$) and a measured pressure data point (pointID$_6$) (e.g., pointID$_4$=enthalpy(pointID$_5$, pointID$_6$)). The virtual data points can be stored as derived timeseries data.

Applications 530 can access and use the virtual data points in the same manner as the actual data points. Applications 530 do not need to know whether a data point is an actual data point or a virtual data point since both types of data points can be stored as derived timeseries data and can be handled in the same manner by applications 530. In some embodiments, the derived timeseries are stored with attributes designating each data point as either a virtual data point or an actual data point. Such attributes allow applications 530 to identify whether a given timeseries represents a virtual data point or an actual data point, even though both types of data points can be handled in the same manner by applications 530. These and other features of timeseries service 528 are described in greater detail with reference to FIG. 6.

In some embodiments, analytics service 524 analyzes the raw timeseries data and/or the derived timeseries data to detect faults. Analytics service 524 can apply a set of fault detection rules to the timeseries data to determine whether a fault is detected at each interval of the timeseries. Fault detections can be stored as derived timeseries data. For example, analytics service 524 can generate a new fault detection timeseries with data values that indicate whether a fault was detected at each interval of the timeseries. An example of such a fault detection timeseries is described in greater detail with reference to FIG. 9B. The fault detection timeseries can be stored as derived timeseries data along with the raw timeseries data in local storage 514 or hosted storage 516.

Still referring to FIG. 5, BMS 500 is shown to include several applications 530 including an energy management application 532, monitoring and reporting applications 534, and enterprise control applications 536. Although only a few applications 530 are shown, it is contemplated that applications 530 can include any of a variety of applications configured to use the derived timeseries generated by data platform services 520. In some embodiments, applications 530 exist as a separate layer of BMS 500 (i.e., separate from data platform services 520 and data collector 512). This allows applications 530 to be isolated from the details of how the derived timeseries are generated. In other embodiments, applications 530 can exist as remote applications that run on remote systems or devices (e.g., remote systems and applications 444, client devices 448).

Applications 530 can use the derived timeseries data to perform a variety data visualization, monitoring, and/or control activities. For example, energy management application 532 and monitoring and reporting application 534 can use the derived timeseries data to generate user interfaces (e.g., charts, graphs, etc.) that present the derived timeseries data to a user. In some embodiments, the user interfaces present the raw timeseries data and the derived data rollups in a single chart or graph. For example, a dropdown selector can be provided to allow a user to select the raw timeseries data or any of the data rollups for a given data point. Several examples of user interfaces that can be generated based on the derived timeseries data are described in U.S. patent application Ser. No. 15/182,579 filed Jun. 14, 2016, and U.S. Provisional Patent Application No. 62/446,284 filed Jan. 13, 2017. The entire disclosures of both these patent applications are incorporated by reference herein.

Enterprise control application 536 can use the derived timeseries data to perform various control activities. For example, enterprise control application 536 can use the derived timeseries data as input to a control algorithm (e.g., a state-based algorithm, an extremum seeking control (ESC) algorithm, a proportional-integral (PI) control algorithm, a proportional-integral-derivative (PID) control algorithm, a model predictive control (MPC) algorithm, a feedback control algorithm, etc.) to generate control signals for building subsystems 428. In some embodiments, building subsystems 428 use the control signals to operate building equipment. Operating the building equipment can affect the measured or calculated values of the data samples provided to BMS 500. Accordingly, enterprise control application 536 can use the derived timeseries data as feedback to control the systems and devices of building subsystems 428.

Timeseries Data Platform Service

Figure 6:
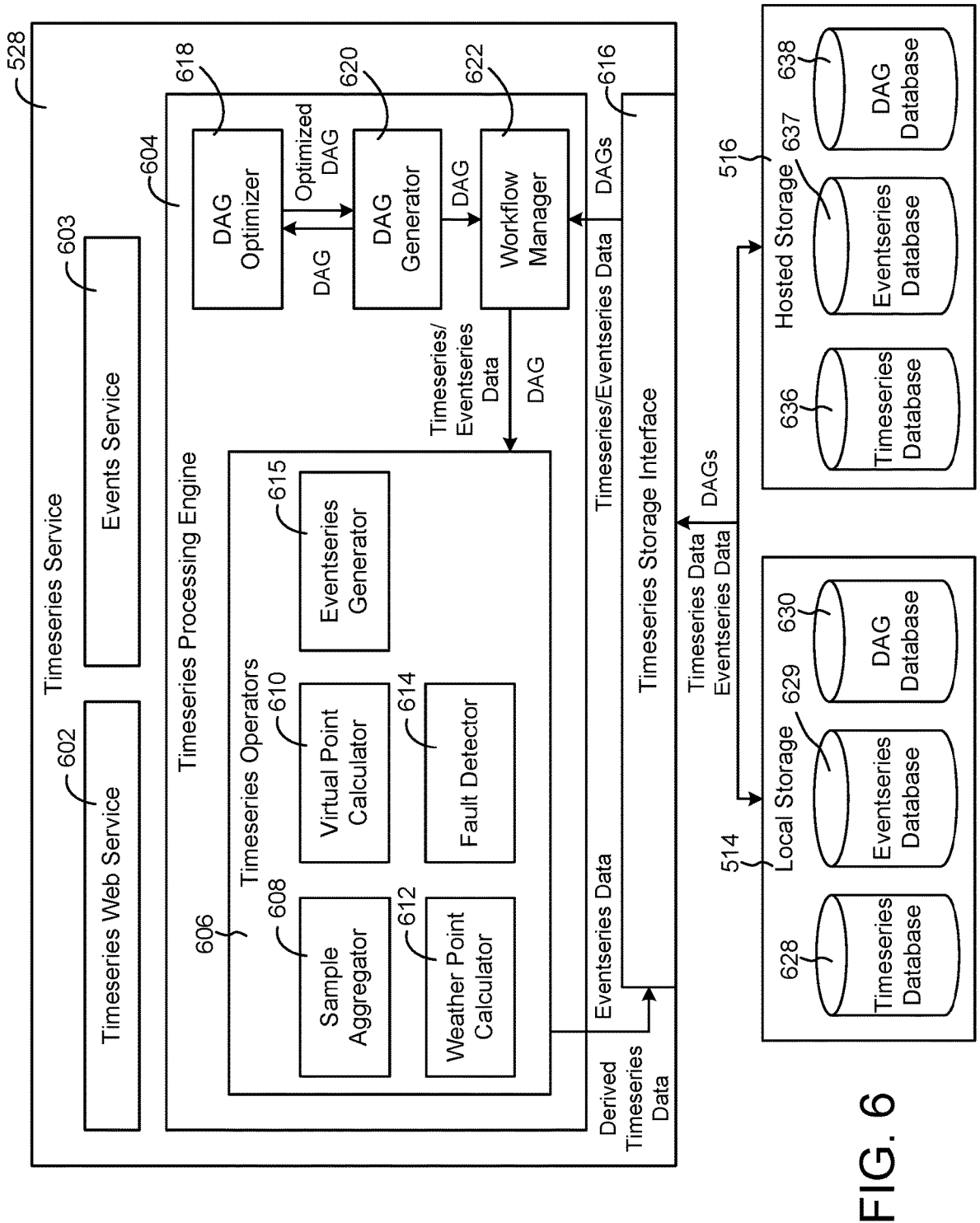
FIG. 6 is a block diagram of a timeseries service which can be implemented as some of the data platform services shown in FIG. 5, according to some embodiments.

Referring now to FIG. 6, a block diagram illustrating timeseries service 528 in greater detail is shown, according to some embodiments. Timeseries service 528 is shown to include a timeseries web service 602, an events service 603, a timeseries processing engine 604, and a timeseries storage interface 616. Timeseries web service 602 can be configured to interact with web-based applications to send and/or receive timeseries data. In some embodiments, timeseries web service 602 provides timeseries data to web-based applications. For example, if one or more of applications 530 are web-based applications, timeseries web service 602 can provide derived timeseries data and raw timeseries data to the web-based applications. In some embodiments, timeseries web service 602 receives raw timeseries data from a web-based data collector. For example, if data collector 512 is a web-based application, timeseries web service 602 can receive data samples or raw timeseries data from data collector 512.

Timeseries storage interface 616 can be configured to store and read samples of various timeseries (e.g., raw timeseries data and derived timeseries data) and eventseries (described in greater detail below). Timeseries storage interface 616 can interact with local storage 514 and/or hosted storage 516. For example, timeseries storage interface 616 can retrieve timeseries data from a local timeseries database 628 within local storage 514 or from a hosted timeseries database 636 within hosted storage 516. In some embodiments, timeseries storage interface 616 reads samples from a specified start time or start position in the timeseries to a specified stop time or a stop position in the timeseries. Similarly, timeseries storage interface 616 can retrieve eventseries data from a local eventseries database 629 within local storage 514 or from a hosted eventseries database 637 within hosted storage 516. Timeseries storage interface 616 can also store timeseries data in local timeseries database 628 or hosted timeseries database 636 and can store eventseries data in local eventseries database 629 or hosted eventseries database 637. Advantageously, timeseries storage interface 616 provides a consistent interface which enables logical data independence.

In some embodiments, timeseries storage interface 616 stores timeseries as lists of data samples, organized by time. For example, timeseries storage interface 616 can store timeseries in the following format:

[<key, timestamp$_1$, value$_1$>, <key, timestamp$_2$, value$_2$>, <key, timestamp$_3$, value$_3$>]

where key is an identifier of the source of the data samples (e.g., timeseries ID, sensor ID, etc.), timestamp$_i$ identifies a time associated with the ith sample, and value$_i$ indicates the value of the ith sample.

In some embodiments, timeseries storage interface 616 stores eventseries as lists of events having a start time, an end time, and a state. For example, timeseries storage interface 616 can store eventseries in the following format:

[<eventID$_1$, start_timestamp$_1$, end_timestamp$_1$, state$_1$>, . . . , <eventID$_N$, start_timestamp$_N$, end_timestamp$_N$, state$_N$>]

where eventID$_i$ is an identifier of the ith event, start_timestamp$_i$ is the time at which the ith event started, end_timestamp$_i$ is the time at which the ith event ended, state$_i$ describes a state or condition associated with the ith event (e.g., cold, hot, warm, etc.), and N is the total number of events in the eventseries.

In some embodiments, timeseries storage interface 616 stores timeseries and eventseries in a tabular format. Timeseries storage interface 616 can store timeseries and eventseries in various tables having a column for each attribute of the timeseries/eventseries samples (e.g., key, timestamp, value). The timeseries tables can be stored in local timeseries database 628 and/or hosted timeseries database 636, whereas the eventseries tables can be stored in local eventseries database 629 and/or hosted eventseries database 637. In some embodiments, timeseries storage interface 616 caches older data to local storage 514 or hosted storage 516 but stores newer data in RAM. This may improve read performance when the newer data are requested for processing.

In some embodiments, timeseries storage interface 616 omits one or more of the attributes when storing the timeseries samples. For example, timeseries storage interface 616 may not need to repeatedly store the key or timeseries ID for each sample in the timeseries. In some embodiments, timeseries storage interface 616 omits timestamps from one or more of the samples. If samples of a particular timeseries have timestamps at regular intervals (e.g., one sample each minute), timeseries storage interface 616 can organize the samples by timestamps and store the values of the samples in a row. The timestamp of the first sample can be stored along with the interval between the timestamps. Timeseries storage interface 616 can determine the timestamp of any sample in the row based on the timestamp of the first sample and the position of the sample in the row.

In some embodiments, timeseries storage interface 616 stores one or more samples with an attribute indicating a change in value relative to the previous sample value. The change in value can replace the actual value of the sample when the sample is stored in local timeseries database 628 or hosted timeseries database 636. This allows timeseries storage interface 616 to use fewer bits when storing samples and their corresponding values. Timeseries storage interface 616 can determine the value of any sample based on the value of the first sample and the change in value of each successive sample.

In some embodiments, timeseries storage interface 616 creates containers or data objects in which samples of timeseries data can be stored. The containers can be JSON objects or other types of containers configured to store one or more timeseries samples and/or eventseries samples. Timeseries storage interface 616 can be configured to add samples to the containers and read samples from the containers. For example, timeseries storage interface 616 can receive a set of samples from data collector 512, timeseries web service 602, events service 603, and/or timeseries processing engine 604. Timeseries storage interface 616 can add the set of samples to a container and send the container to local storage 514 or hosted storage 516.

Timeseries storage interface 616 can use containers when reading samples from local storage 514 or hosted storage 516. For example, timeseries storage interface 616 can retrieve a set of samples from local storage 514 or hosted storage 516 and add the samples to a container. In some embodiments, the set of samples include all samples within a specified time period (e.g., samples with timestamps in the specified time period) or eventseries samples having a specified state. Timeseries storage interface 616 can provide the container of samples to timeseries web service 602, events service 603, timeseries processing engine 604, applications 530, and/or other components configured to use the timeseries/eventseries samples.

Still referring to FIG. 6, timeseries processing engine 604 is shown to include several timeseries operators 606. Timeseries operators 606 can be configured to apply various operations, transformations, or functions to one or more input timeseries to generate output timeseries and/or eventseries. The input timeseries can include raw timeseries data and/or derived timeseries data. Timeseries operators 606 can be configured to calculate aggregate values, averages, or apply other mathematical operations to the input timeseries. In some embodiments, timeseries operators 606 generate virtual point timeseries by combining two or more input timeseries (e.g., adding the timeseries together), creating multiple output timeseries from a single input timeseries, or applying mathematical operations to the input timeseries. In some embodiments, timeseries operators 606 perform data cleansing operations or deduplication operations on an input timeseries. In some embodiments, timeseries operators 606 use the input timeseries to generate eventseries based on the values of the timeseries samples (described in greater detail below). The output timeseries can be stored as derived timeseries data in local storage 514 and/or hosted storage 516. Similarly, the eventseries can be stored as eventseries data in local storage 514 and/or hosted storage 516.

In some embodiments, timeseries operators 606 do not change or replace the raw timeseries data, but rather generate various "views" of the raw timeseries data. The views can be queried in the same manner as the raw timeseries data. For example, samples can be read from the raw timeseries data, transformed to create the view, and then provided as an output. Because the transformations used to create the views can be computationally expensive, the views can be stored as "materialized views" in local timeseries database 628 or hosted timeseries database 636. These materialized views are referred to as derived timeseries data throughout the present disclosure.

Timeseries operators 606 can be configured to run at query time (e.g., when a request for derived timeseries data is received) or prior to query time (e.g., when new raw data samples are received, in response to a defined event or trigger, etc.). This flexibility allows timeseries operators 606 to perform some or all of their operations ahead of time and/or in response to a request for specific derived data timeseries. For example, timeseries operators 606 can be configured to pre-process one or more timeseries that are read frequently to ensure that the timeseries are updated whenever new data samples are received. However, timeseries operators 606 can be configured to wait until query time to process one or more timeseries that are read infrequently to avoid performing unnecessary processing operations.

In some embodiments, timeseries operators 606 are triggered in a particular sequence defined by a directed acyclic graph (DAG). The DAG may define a workflow or sequence of operations or transformations to apply to one or more input timeseries. For example, the DAG for a raw data timeseries may include a data cleansing operation, an aggregation operation, and a summation operation (e.g., adding two raw data timeseries to create a virtual point timeseries). The DAGs can be stored in a local DAG database 630 within local storage 514, in a hosted DAG database 638 within hosted storage 516, or internally within timeseries processing engine 604. DAGs can be retrieved by workflow manager 622 and used to determine how and when to process incoming data samples. Exemplary systems and methods for creating and using DAGs are described in greater detail below.

Timeseries operators 606 can perform aggregations for dashboards, cleansing operations, logical operations for rules and fault detection, machine learning predictions or classifications, call out to external services, or any of a variety of other operations which can be applied to timeseries data. The operations performed by timeseries operators 606 are not limited to sensor data. Timeseries operators 606 can also operate on event data or function as a billing engine for a consumption or tariff-based billing system.

Sample Aggregation

Still referring to FIG. 6, timeseries operators 606 are shown to include a sample aggregator 608. Sample aggregator 608 can be configured to generate derived data rollups from the raw timeseries data. For each data point, sample aggregator 608 can aggregate a set of data values having timestamps within a predetermined time interval (e.g., a quarter-hour, an hour, a day, etc.) to generate an aggregate data value for the predetermined time interval. For example, the raw timeseries data for a particular data point may have a relatively short interval (e.g., one minute) between consecutive samples of the data point. Sample aggregator 608 can generate a data rollup from the raw timeseries data by aggregating all of the samples of the data point having timestamps within a relatively longer interval (e.g., a quarter-hour) into a single aggregated value that represents the longer interval.

For some types of timeseries, sample aggregator 608 performs the aggregation by averaging all of the samples of the data point having timestamps within the longer interval. Aggregation by averaging can be used to calculate aggregate values for timeseries of non-cumulative variables such as measured value. For other types of timeseries, sample aggregator 608 performs the aggregation by summing all of the samples of the data point having timestamps within the longer interval. Aggregation by summation can be used to calculate aggregate values for timeseries of cumulative variables such as the number of faults detected since the previous sample.

Figures 7A, 7B:
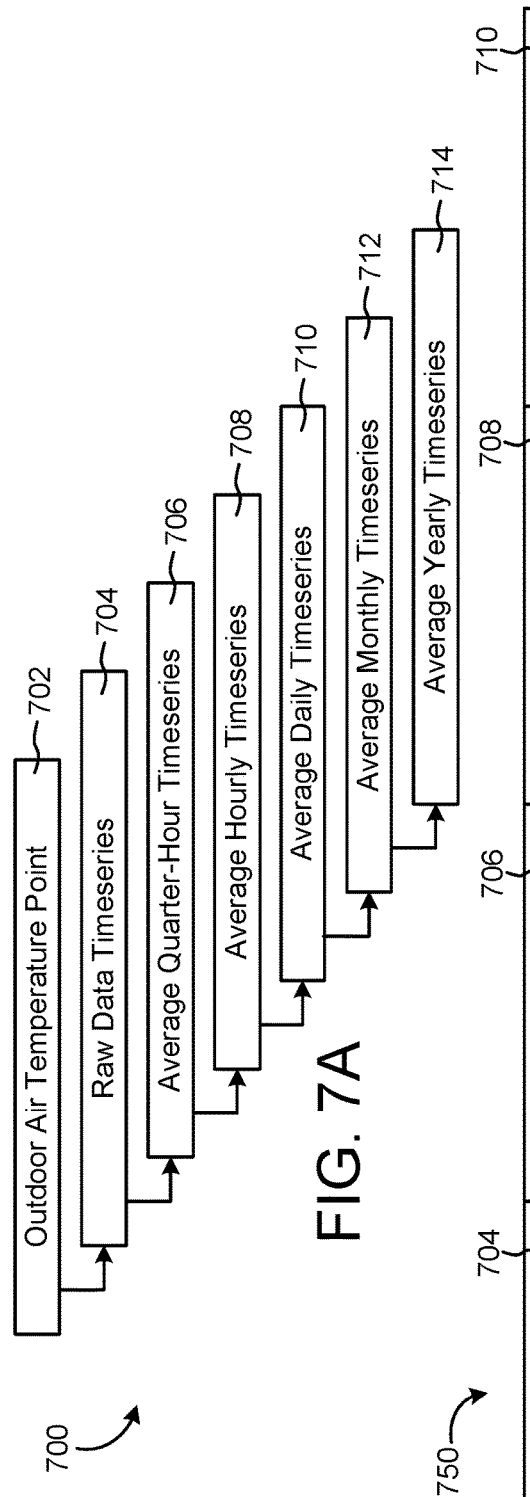
FIG. 7A is a block diagram illustrating an aggregation technique which can be used by the sample aggregator shown in FIG. 6 to aggregate raw data samples, according to some embodiments.
FIG. 7B is a data table which can be used to store raw data timeseries and a variety of derived data timeseries which can be generated by the timeseries service of FIG. 6, according to some embodiments.

Referring now to FIGS. 7A-7B, a block diagram 700 and a data table 750 illustrating an aggregation technique which can be used by sample aggregator 608 is shown, according to some embodiments. In FIG. 7A, a data point 702 is shown. Data point 702 is an example of a measured data point for which timeseries values can be obtained. For example, data point 702 is shown as an outdoor air temperature point and has values which can be measured by a temperature sensor. Although a specific type of data point 702 is shown in FIG. 7A, it should be understood that data point 702 can be any type of measured or calculated data point. Timeseries values of data point 702 can be collected by data collector 512 and assembled into a raw data timeseries 704.

As shown in FIG. 7B, the raw data timeseries 704 includes a timeseries of data samples, each of which is shown as a separate row in data table 750. Each sample of raw data timeseries 704 is shown to include a timestamp and a data value. The timestamps of raw data timeseries 704 are ten minutes and one second apart, indicating that the sampling interval of raw data timeseries 704 is ten minutes and one second. For example, the timestamp of the first data sample is shown as 2015-12-31T23: 10: 00 indicating that the first data sample of raw data timeseries 704 was collected at 11:10:00 PM on Dec. 31, 2015. The timestamp of the second data sample is shown as 2015-12-31T23: 20: 01 indicating that the second data sample of raw data timeseries 704 was collected at 11:20:01 PM on Dec. 31, 2015. In some embodiments, the timestamps of raw data timeseries 704 are stored along with an offset relative to universal time, as previously described. The values of raw data timeseries 704 start at a value of 10 and increase by 10 with each sample. For example, the value of the second sample of raw data timeseries 704 is 20, the value of the third sample of raw data timeseries 704 is 30, etc.

In FIG. 7A, several data rollup timeseries 706-714 are shown. Data rollup timeseries 706-714 can be generated by sample aggregator 608 and stored as derived timeseries data. The data rollup timeseries 706-714 include an average quarter-hour timeseries 706, an average hourly timeseries 708, an average daily timeseries 710, an average monthly timeseries 712, and an average yearly timeseries 714. Each of the data rollup timeseries 706-714 is dependent upon a parent timeseries. In some embodiments, the parent timeseries for each of the data rollup timeseries 706-714 is the timeseries with the next shortest duration between consecutive timeseries values. For example, the parent timeseries for average quarter-hour timeseries 706 is raw data timeseries 704. Similarly, the parent timeseries for average hourly timeseries 708 is average quarter-hour timeseries 706; the parent timeseries for average daily timeseries 710 is average hourly timeseries 708; the parent timeseries for average monthly timeseries 712 is average daily timeseries 710; and the parent timeseries for average yearly timeseries 714 is average monthly timeseries 712.

Sample aggregator 608 can generate each of the data rollup timeseries 706-714 from the timeseries values of the corresponding parent timeseries. For example, sample aggregator 608 can generate average quarter-hour timeseries 706 by aggregating all of the samples of data point 702 in raw data timeseries 704 that have timestamps within each quarter-hour. Similarly, sample aggregator 608 can generate average hourly timeseries 708 by aggregating all of the timeseries values of average quarter-hour timeseries 706 that have timestamps within each hour. Sample aggregator 608 can generate average daily timeseries 710 by aggregating all of the time series values of average hourly timeseries 708 that have timestamps within each day. Sample aggregator 608 can generate average monthly timeseries 712 by aggregating all of the time series values of average daily timeseries 710 that have timestamps within each month. Sample aggregator 608 can generate average yearly timeseries 714 by aggregating all of the time series values of average monthly timeseries 712 that have timestamps within each year.

In some embodiments, the timestamps for each sample in the data rollup timeseries 706-714 are the beginnings of the aggregation interval used to calculate the value of the sample. For example, the first data sample of average quarter-hour timeseries 706 is shown to include the timestamp 2015-12-31T23: 00: 00. This timestamp indicates that the first data sample of average quarter-hour timeseries 706 corresponds to an aggregation interval that begins at 11:00:00 PM on Dec. 31, 2015. Since only one data sample of raw data timeseries 704 occurs during this interval, the value of the first data sample of average quarter-hour timeseries 706 is the average of a single data value (i.e., average(10)=10). The same is true for the second data sample of average quarter-hour timeseries 706 (i.e., average (20)=20).

The third data sample of average quarter-hour timeseries 706 is shown to include the timestamp 2015-12-31T23: 30: 00. This timestamp indicates that the third data sample of average quarter-hour timeseries 706 corresponds to an aggregation interval that begins at 11:30:00 PM on Dec. 31, 2015. Since each aggregation interval of average quarter-hour timeseries 706 is a quarter-hour in duration, the end of the aggregation interval is 11:45:00 PM on Dec. 31, 2015. This aggregation interval includes two data samples of raw data timeseries 704 (i.e., the third raw data sample having a value of 30 and the fourth raw data sample having a value of 40). Sample aggregator 608 can calculate the value of the third sample of average quarter-hour timeseries 706 by averaging the values of the third raw data sample and the fourth raw data sample (i.e., average(30, 40)=35). Accordingly, the third sample of average quarter-hour timeseries 706 has a value of 35. Sample aggregator 608 can calculate the remaining values of average quarter-hour timeseries 706 in a similar manner.

Still referring to FIG. 7B, the first data sample of average hourly timeseries 708 is shown to include the timestamp 2015-12-31T23: 00: 00. This timestamp indicates that the first data sample of average hourly timeseries 708 corresponds to an aggregation interval that begins at 11:00:00 PM on Dec. 31, 2015. Since each aggregation interval of average hourly timeseries 708 is an hour in duration, the end of the aggregation interval is 12:00:00 AM on Jan. 1, 2016. This aggregation interval includes the first four samples of average quarter-hour timeseries 706. Sample aggregator 608 can calculate the value of the first sample of average hourly timeseries 708 by averaging the values of the first four values of average quarter-hour timeseries 706 (i.e., average (10, 20, 35, 50)=28.8). Accordingly, the first sample of average hourly timeseries 708 has a value of 28.8. Sample aggregator 608 can calculate the remaining values of average hourly timeseries 708 in a similar manner.

The first data sample of average daily timeseries 710 is shown to include the timestamp 2015-12-31T00: 00: 00. This timestamp indicates that the first data sample of average daily timeseries 710 corresponds to an aggregation interval that begins at 12:00:00 AM on Dec. 31, 2015. Since each aggregation interval of the average daily timeseries 710 is a day in duration, the end of the aggregation interval is 12:00:00 AM on Jan. 1, 2016. Only one data sample of average hourly timeseries 708 occurs during this interval. Accordingly, the value of the first data sample of average daily timeseries 710 is the average of a single data value (i.e., average (28.8)=28.8). The same is true for the second data sample of average daily timeseries 710 (i.e., average (87.5)=87.5).

In some embodiments, sample aggregator 608 stores each of the data rollup timeseries 706-714 in a single data table (e.g., data table 750) along with raw data timeseries 704. This allows applications 530 to retrieve all of the timeseries 704-714 quickly and efficiently by accessing a single data table. In other embodiments, sample aggregator 608 can store the various timeseries 704-714 in separate data tables which can be stored in the same data storage device (e.g., the same database) or distributed across multiple data storage devices. In some embodiments, sample aggregator 608 stores data timeseries 704-714 in a format other than a data table. For example, sample aggregator 608 can store timeseries 704-714 as vectors, as a matrix, as a list, or using any of a variety of other data storage formats.

In some embodiments, sample aggregator 608 automatically updates the data rollup timeseries 706-714 each time a new raw data sample is received. Updating the data rollup timeseries 706-714 can include recalculating the aggregated values based on the value and timestamp of the new raw data sample. When a new raw data sample is received, sample aggregator 608 can determine whether the timestamp of the new raw data sample is within any of the aggregation intervals for the samples of the data rollup timeseries 706-714. For example, if a new raw data sample is received with a timestamp of 2016-01-01T00: 52: 00, sample aggregator 608 can determine that the new raw data sample occurs within the aggregation interval beginning at timestamp 2016-01-01T00: 45: 00 for average quarter-hour timeseries 706. Sample aggregator 608 can use the value of the new raw data point (e.g., value=120) to update the aggregated value of the final data sample of average quarter-hour timeseries 706 (i.e., average(110, 120)=115).

If the new raw data sample has a timestamp that does not occur within any of the previous aggregation intervals, sample aggregator 608 can create a new data sample in average quarter-hour timeseries 706. The new data sample in average quarter-hour timeseries 706 can have a new data timestamp defining the beginning of an aggregation interval that includes the timestamp of the new raw data sample. For example, if the new raw data sample has a timestamp of 2016-01-01T01: 00: 11, sample aggregator 608 can determine that the new raw data sample does not occur within any of the aggregation intervals previously established for average quarter-hour timeseries 706. Sample aggregator 608 can generate a new data sample in average quarter-hour timeseries 706 with the timestamp 2016-01-01T01: 00: 00 and can calculate the value of the new data sample in average quarter-hour timeseries 706 based on the value of the new raw data sample, as previously described.

Sample aggregator 608 can update the values of the remaining data rollup timeseries 708-714 in a similar manner. For example, sample aggregator 608 determine whether the timestamp of the updated data sample in average quarter-hour timeseries is within any of the aggregation intervals for the samples of average hourly timeseries 708. Sample aggregator 608 can determine that the timestamp 2016-01-01T00: 45: 00 occurs within the aggregation interval beginning at timestamp 2016-01-01T00: 00: 00 for average hourly timeseries 708. Sample aggregator 608 can use the updated value of the final data sample of average quarter-hour timeseries 706 (e.g., value=115) to update the value of the second sample of average hourly timeseries 708 (i.e., average (65, 80, 95, 115)=88.75). Sample aggregator 608 can use the updated value of the final data sample of average hourly timeseries 708 to update the final sample of average daily timeseries 710 using the same technique.

In some embodiments, sample aggregator 608 updates the aggregated data values of data rollup timeseries 706-714 each time a new raw data sample is received. Updating each time a new raw data sample is received ensures that the data rollup timeseries 706-714 always reflect the most recent data samples. In other embodiments, sample aggregator 608 updates the aggregated data values of data rollup timeseries 706-714 periodically at predetermined update intervals (e.g., hourly, daily, etc.) using a batch update technique. Updating periodically can be more efficient and require less data processing than updating each time a new data sample is received, but can result in aggregated data values that are not always updated to reflect the most recent data samples.

In some embodiments, sample aggregator 608 is configured to cleanse raw data timeseries 704. Cleansing raw data timeseries 704 can include discarding exceptionally high or low data. For example, sample aggregator 608 can identify a minimum expected data value and a maximum expected data value for raw data timeseries 704. Sample aggregator 608 can discard data values outside this range as bad data. In some embodiments, the minimum and maximum expected values are based on attributes of the data point represented by the timeseries. For example, data point 702 represents a measured outdoor air temperature and therefore has an expected value within a range of reasonable outdoor air temperature values for a given geographic location (e.g., between −20° F. and 110° F.). Sample aggregator 608 can discard a data value of 330 for data point 702 since a temperature value of 330° F. is not reasonable for a measured outdoor air temperature.

In some embodiments, sample aggregator 608 identifies a maximum rate at which a data point can change between consecutive data samples. The maximum rate of change can be based on physical principles (e.g., heat transfer principles), weather patterns, or other parameters that limit the maximum rate of change of a particular data point. For example, data point 702 represents a measured outdoor air temperature and therefore can be constrained to have a rate of change less than a maximum reasonable rate of change for outdoor temperature (e.g., five degrees per minute). If two consecutive data samples of the raw data timeseries 704 have values that would require the outdoor air temperature to change at a rate in excess of the maximum expected rate of change, sample aggregator 608 can discard one or both of the data samples as bad data.

Sample aggregator 608 can perform any of a variety of data cleansing operations to identify and discard bad data samples. Several examples of data cleansing operations which can be performed by sample aggregator 608 are described in U.S. patent application Ser. No. 13/631,301 filed Sep. 28, 2012, the entire disclosure of which is incorporated by reference herein. In some embodiments, sample aggregator 608 performs the data cleansing operations for raw data timeseries 704 before generating the data rollup timeseries 706-714. This ensures that raw data timeseries 704 used to generate data rollup timeseries 706-714 does not include any bad data samples. Accordingly, the data rollup timeseries 706-714 do not need to be re-cleansed after the aggregation is performed.

Virtual Points

Referring again to FIG. 6, timeseries operators 606 are shown to include a virtual point calculator 610. Virtual point calculator 610 is configured to create virtual data points and calculate timeseries values for the virtual data points. A virtual data point is a type of calculated data point derived from one or more actual data points. In some embodiments, actual data points are measured data points, whereas virtual data points are calculated data points. Virtual data points can be used as substitutes for actual sensor data when the sensor data desired for a particular application does not exist, but can be calculated from one or more actual data points. For example, a virtual data point representing the enthalpy of a refrigerant can be calculated using actual data points measuring the temperature and pressure of the refrigerant. Virtual data points can also be used to provide timeseries values for calculated quantities such as efficiency, coefficient of performance, and other variables that cannot be directly measured.

Virtual point calculator 610 can calculate virtual data points by applying any of a variety of mathematical operations or functions to actual data points or other virtual data points. For example, virtual point calculator 610 can calculate a virtual data point (pointID$_3$) by adding two or more actual data points (pointID$_1$ and pointID$_2$) (e.g., pointID$_3$=pointID$_1$+pointID$_2$). As another example, virtual point calculator 610 can calculate an enthalpy data point (pointID$_4$) based on a measured temperature data point (pointID$_5$) and a measured pressure data point (pointID$_6$) (e.g., pointID$_4$=enthalpy(pointID$_5$, pointID$_6$)). In some instances, a virtual data point can be derived from a single actual data point. For example, virtual point calculator 610 can calculate a saturation temperature (pointID$_7$) of a known refrigerant based on a measured refrigerant pressure (pointID$_8$) (e.g., pointID$_7$=T$_{sat}$(pointID$_8$)). In general, virtual point calculator 610 can calculate the timeseries values of a virtual data point using the timeseries values of one or more actual data points and/or the timeseries values of one or more other virtual data points.

In some embodiments, virtual point calculator 610 uses a set of virtual point rules to calculate the virtual data points. The virtual point rules can define one or more input data points (e.g., actual or virtual data points) and the mathematical operations that should be applied to the input data point(s) to calculate each virtual data point. The virtual point rules can be provided by a user, received from an external system or device, and/or stored in memory 510. Virtual point calculator 610 can apply the set of virtual point rules to the timeseries values of the input data points to calculate timeseries values for the virtual data points. The timeseries values for the virtual data points can be stored as derived timeseries data in local timeseries database 628 and/or hosted timeseries database 636.

Virtual point calculator 610 can calculate virtual data points using the values of raw data timeseries 704 and/or the aggregated values of the data rollup timeseries 706-714. In some embodiments, the input data points used to calculate a virtual data point are collected at different sampling times and/or sampling rates. Accordingly, the samples of the input data points may not be synchronized with each other, which can lead to ambiguity in which samples of the input data points should be used to calculate the virtual data point. Using the data rollup timeseries 706-714 to calculate the virtual data points ensures that the timestamps of the input data points are synchronized and eliminates any ambiguity in which data samples should be used.

Referring now to FIG. 8, several timeseries 800, 820, 840, and 860 illustrating the synchronization of data samples resulting from aggregating the raw timeseries data are shown, according to some embodiments. Timeseries 800 and 820 are raw data timeseries. Raw data timeseries 800 has several raw data samples 802-810. Raw data sample 802 is collected at time $t_1$; raw data sample 804 is collected at time $t_2$; raw data sample 806 is collected at time $t_3$; raw data sample 808 is collected at time $t_4$; raw data sample 810 is collected at time $t_5$; and raw data sample 812 is collected at time $t_6$.

Raw data timeseries 820 also has several raw data samples 822, 824, 826, 828, and 830. However, raw data samples 822-830 are not synchronized with raw data samples 802-812. For example, raw data sample 822 is collected before time $t_1$; raw data sample 824 is collected between times $t_2$ and $t_3$; raw data sample 826 is collected between times $t_3$ and $t_4$; raw data sample 828 is collected between times $t_4$ and $t_5$; and raw data sample 830 is collected between times $t_5$ and $t_6$. The lack of synchronization between data samples 802-812 and raw data samples 822-830 can lead to ambiguity in which of the data samples should be used together to calculate a virtual data point.

Timeseries 840 and 860 are data rollup timeseries. Data rollup timeseries 840 can be generated by sample aggregator 608 by aggregating raw data timeseries 800. Similarly, data rollup timeseries 860 can be generated by sample aggregator 608 by aggregating raw data timeseries 820. Both raw data timeseries 800 and 820 can be aggregated using the same aggregation interval. Accordingly, the resulting data rollup timeseries 840 and 860 have synchronized data samples. For example, aggregated data sample 842 is synchronized with aggregated data sample 862 at time $t_1$'. Similarly, aggregated data sample 844 is synchronized with aggregated data sample 864 at time $t_2$'; aggregated data sample 846 is synchronized with aggregated data sample 866 at time $t_3$'; and aggregated data sample 848 is synchronized with aggregated data sample 868 at time $t_4$'.

The synchronization of data samples in data rollup timeseries 840 and 860 allows virtual point calculator 610 to readily identify which of the data samples should be used together to calculate a virtual point. For example, virtual point calculator 610 can identify which of the samples of data rollup timeseries 840 and 860 have the same timestamp (e.g., data samples 842 and 862, data samples 844 and 864, etc.). Virtual point calculator 610 can use two or more aggregated data samples with the same timestamp to calculate a timeseries value of the virtual data point. In some embodiments, virtual point calculator 610 assigns the shared timestamp of the input data samples to the timeseries value of the virtual data point calculated from the input data samples.

Weather Points

Referring again to FIG. 6, timeseries operators 606 are shown to include a weather point calculator 612. Weather point calculator 612 is configured to perform weather-based calculations using the timeseries data. In some embodiments, weather point calculator 612 creates virtual data points for weather-related variables such as cooling degree days (CDD), heating degree days (HDD), cooling energy days (CED), heating energy days (HED), and normalized energy consumption. The timeseries values of the virtual data points calculated by weather point calculator 612 can be stored as derived timeseries data in local timeseries database 628 and/or hosted timeseries database 636.

Weather point calculator 612 can calculate CDD by integrating the positive temperature difference between the time-varying outdoor air temperature $T_{OA}$ and the cooling balance point $T_{bC}$ for the building as shown in the following equation:

$$CDD = \int^{period} \max\{0, (T_{OA} - T_{bC})\} dt$$

where period is the integration period. In some embodiments, the outdoor air temperature $T_{OA}$ is a measured data point, whereas the cooling balance point $T_{bC}$ is a stored parameter. To calculate CDD for each sample of the outdoor air temperature $T_{OA}$, weather point calculator 612 can multiply the quantity max$\{0, (T_{OA}-T_{bC})\}$ by the sampling period $\Delta t$ of the outdoor air temperature $T_{OA}$. Weather point calculator 612 can calculate CED in a similar manner using outdoor air enthalpy $E_{OA}$ instead of outdoor air temperature $T_{OA}$. Outdoor air enthalpy $E_{OA}$ can be a measured or virtual data point.

Weather point calculator 612 can calculate HDD by integrating the positive temperature difference between a heating balance point $T_{bH}$ for the building and the time-varying outdoor air temperature $T_{OA}$ as shown in the following equation:

$$HDD = \int^{period} \max\{0, (T_{bH}-T_{OA})\} dt$$

where period is the integration period. In some embodiments, the outdoor air temperature $T_{OA}$ is a measured data point, whereas the heating balance point $T_{bH}$ is a stored parameter. To calculate HDD for each sample of the outdoor air temperature $T_{OA}$, weather point calculator 612 can multiply the quantity max$\{0, (T_{bH}-T_{OA})\}$ by the sampling period $\Delta t$ of the outdoor air temperature $T_{OA}$. Weather point calculator 612 can calculate HED in a similar manner using outdoor air enthalpy $E_{OA}$ instead of outdoor air temperature $T_{OA}$.

In some embodiments, both virtual point calculator 610 and weather point calculator 612 calculate timeseries values of virtual data points. Weather point calculator 612 can calculate timeseries values of virtual data points that depend on weather-related variables (e.g., outdoor air temperature, outdoor air enthalpy, outdoor air humidity, outdoor light intensity, precipitation, wind speed, etc.). Virtual point calculator 610 can calculate timeseries values of virtual data points that depend on other types of variables (e.g., non-weather-related variables). Although only a few weather-related variables are described in detail here, it is contemplated that weather point calculator 612 can calculate virtual data points for any weather-related variable. The weather-related data points used by weather point calculator 612 can be received as timeseries data from various weather sensors and/or from a weather service.

Fault Detection

Still referring to FIG. 6, timeseries operators 606 are shown to include a fault detector 614. Fault detector 614 can be configured to detect faults in timeseries data. In some embodiments, fault detector 614 performs fault detection for timeseries data representing meter data (e.g., measurements from a sensor) and/or for other types of timeseries data. Fault detector 614 can detect faults in the raw timeseries data and/or the derived timeseries data. In some embodiments, fault detector 614 receives fault detection rules from analytics service 524. Fault detection rules can be defined by a user (e.g., via a rules editor) or received from an external system or device. In various embodiments, the fault detection rules can be stored within local storage 514 and/or hosted storage 516. Fault detector 614 can retrieve the fault detection rules from local storage 514 or hosted storage 516 and can use the fault detection rules to analyze the timeseries data.

In some embodiments, the fault detection rules provide criteria that can be evaluated by fault detector 614 to detect faults in the timeseries data. For example, the fault detection rules can define a fault as a data value above or below a threshold value. As another example, the fault detection rules can define a fault as a data value outside a predetermined range of values. The threshold value and predetermined range of values can be based on the type of timeseries data (e.g., meter data, calculated data, etc.), the type of variable represented by the timeseries data (e.g., temperature, humidity, energy consumption, etc.), the system or device that measures or provides the timeseries data (e.g., a temperature sensor, a humidity sensor, a chiller, etc.), and/or other attributes of the timeseries data.

Fault detector 614 can apply the fault detection rules to the timeseries data to determine whether each sample of the timeseries data qualifies as a fault. In some embodiments, fault detector 614 generates a fault detection timeseries containing the results of the fault detection. The fault detection timeseries can include a set of timeseries values, each of which corresponds to a data sample of the timeseries data evaluated by fault detector 614. In some embodiments, each timeseries value in the fault detection timeseries includes a timestamp and a fault detection value. The timestamp can be the same as the timestamp of the corresponding data sample of the data timeseries. The fault detection value can indicate whether the corresponding data sample of the data timeseries qualifies as a fault. For example, the fault detection value can have a value of "Fault" if a fault is detected and a value of "Not in Fault" if a fault is not detected in the corresponding data sample of the data timeseries. The fault detection timeseries can be stored in local timeseries database 628 and/or hosted timeseries database 636 along with the raw timeseries data and the derived timeseries data.

Referring now to FIGS. 9A-9B, a block diagram and data table 900 illustrating the fault detection timeseries is shown, according to some embodiments. In FIG. 9A, fault detector 614 is shown receiving a data timeseries 902 from local storage 514 or hosted storage 516. Data timeseries 902 can be a raw data timeseries or an derived data timeseries. In some embodiments, data timeseries 902 is a timeseries of values of an actual data point (e.g., a measured temperature). In other embodiments, data timeseries 902 is a timeseries of values of a virtual data point (e.g., a calculated efficiency). As shown in table 900, data timeseries 902 includes a set of data samples. Each data sample includes a timestamp and a value. Most of the data samples have values within the range of 65-66. However, three of the data samples have values of 42.

Fault detector 614 can evaluate data timeseries 902 using a set of fault detection rules to detect faults in data timeseries 902. In some embodiments, fault detector 614 determines that the data samples having values of 42 qualify as faults according to the fault detection rules. Fault detector 614 can generate a fault detection timeseries 904 containing the results of the fault detection. As shown in table 900, fault detection timeseries 904 includes a set of data samples. Like data timeseries 902, each data sample of fault detection timeseries 904 includes a timestamp and a value. Most of the values of fault detection timeseries 904 are shown as "Not in Fault," indicating that no fault was detected for the corresponding sample of data timeseries 902 (i.e., the data sample with the same timestamp). However, three of the data samples in fault detection timeseries 904 have a value of "Fault," indicating that the corresponding sample of data timeseries 902 qualifies as a fault. As shown in FIG. 9A, fault detector 614 can store fault detection timeseries 904 in local storage 514 (e.g., in local timeseries database 628) and/or hosted storage 516 (e.g., in hosted timeseries database 636) along with the raw timeseries data and the derived timeseries data.

Fault detection timeseries 904 can be used by BMS 500 to perform various fault detection, diagnostic, and/or control processes. In some embodiments, fault detection timeseries 904 is further processed by timeseries processing engine 604 to generate new timeseries derived from fault detection timeseries 904. For example, sample aggregator 608 can use fault detection timeseries 904 to generate a fault duration timeseries. Sample aggregator 608 can aggregate multiple consecutive data samples of fault detection timeseries 904 having the same data value into a single data sample. For example, sample aggregator 608 can aggregate the first two "Not in Fault" data samples of fault detection timeseries 904 into a single data sample representing a time period during which no fault was detected. Similarly, sample aggregator 608 can aggregate the final two "Fault" data samples of fault detection timeseries 904 into a single data sample representing a time period during which a fault was detected.

In some embodiments, each data sample in the fault duration timeseries has a fault occurrence time and a fault duration. The fault occurrence time can be indicated by the timestamp of the data sample in the fault duration timeseries. Sample aggregator 608 can set the timestamp of each data sample in the fault duration timeseries equal to the timestamp of the first data sample in the series of data samples in fault detection timeseries 904 which were aggregated to form the aggregated data sample. For example, if sample aggregator 608 aggregates the first two "Not in Fault" data samples of fault detection timeseries 904, sample aggregator 608 can set the timestamp of the aggregated data sample to 2015-12-31T23: 10: 00. Similarly, if sample aggregator 608 aggregates the final two "Fault" data samples of fault detection timeseries 904, sample aggregator 608 can set the timestamp of the aggregated data sample to 2015-12-31T23: 50: 00.

The fault duration can be indicated by the value of the data sample in the fault duration timeseries. Sample aggregator 608 can set the value of each data sample in the fault duration timeseries equal to the duration spanned by the consecutive data samples in fault detection timeseries 904 which were aggregated to form the aggregated data sample. Sample aggregator 608 can calculate the duration spanned by multiple consecutive data samples by subtracting the timestamp of the first data sample of fault detection timeseries 904 included in the aggregation from the timestamp of the next data sample of fault detection timeseries 904 after the data samples included in the aggregation.

For example, if sample aggregator 608 aggregates the first two "Not in Fault" data samples of fault detection timeseries 904, sample aggregator 608 can calculate the duration of the aggregated data sample by subtracting the timestamp 2015-12-31T23: 10: 00 (i.e., the timestamp of the first "Not in Fault" sample) from the timestamp 2015-12-31T23: 30: 00 (i.e., the timestamp of the first "Fault" sample after the consecutive "Not in Fault" samples) for an aggregated duration of twenty minutes. Similarly, if sample aggregator 608 aggregates the final two "Fault" data samples of fault detection timeseries 904, sample aggregator 608 can calculate the duration of the aggregated data sample by subtracting the timestamp 2015-12-31T23: 50: 00 (i.e., the timestamp of the first "Fault" sample included in the aggregation) from the timestamp 2016-01-01T00: 10: 00 (i.e., the timestamp of the first "Not in Fault" sample after the consecutive "Fault" samples) for an aggregated duration of twenty minutes.

Eventseries

Referring again to FIG. 6, timeseries operators 606 are shown to include an eventseries generator 615. Eventseries generator 615 can be configured to generate eventseries based on the raw data timeseries and/or the derived data timeseries. Each eventseries may include a plurality of event samples that characterize various events and define the start times and end times of the events. In the context of eventseries, an "event" can be defined as a state or condition that occurs over a period of time. In other words, an event is not an instantaneous occurrence, but rather is a non-instantaneous state or condition observed over a time period having a non-zero duration (i.e., having both a start time and a subsequent stop time). The state or condition of the event can be based on the values of the timeseries samples used to generate the eventseries. In some embodiments, eventseries generator 615 assigns a state to each timeseries sample based on the value of the timeseries sample and then aggregates multiple consecutive samples having the same state to define the time period over which that state is observed.

Eventseries generator 615 can be configured to assign a state to each sample of an input timeseries (e.g., a raw data timeseries or a derived timeseries) by applying a set of rules to each sample. The process of assigning a state to each sample of the input timeseries can be described as an event-condition-action (ECA) process. ECA refers to the structure of active rules in event driven architecture and active database systems. For example, each rule in the set of rules may include an event, a condition, and an action. The event part of the rule may specify a signal that triggers invocation of the rule. The condition part of the rule may be a logical test (or series of logical tests) that, if satisfied or evaluates to true, causes the action to be carried out. The action part of the rule may specify one or more actions to be performed when the corresponding logical test is satisfied (e.g., assigning a particular state to a sample of the input timeseries).

In some embodiments, the event part is the arrival of a new sample of an input timeseries. Different rules may apply to different input timeseries. For example, the arrival of a new sample of a first input timeseries may qualify as a first event, whereas the arrival of a new sample of a second input timeseries may qualify as a second event. Eventseries generator 615 can use the identity of the input timeseries to determine which event has occurred when a new sample of a particular input timeseries is received. In other words, eventseries generator 615 can select a particular rule to evaluate based on the identity of the input timeseries.

In some embodiments, the condition includes one or more mathematical checks or logic statements that are evaluated by eventseries generator 615. For example, evaluating the condition of a particular rule may include comparing the value of the sample of the input timeseries to a threshold value. The condition may be satisfied if the value of the sample is less than the threshold value, equal to the threshold value, or greater than the threshold value, depending on the particular logic statement specified by the condition. In some embodiments, the condition includes a series of mathematical checks that are performed by eventseries generator 615 in a predetermined order. Each mathematical check may correspond to a different action to be performed if that mathematical check is satisfied. For example, the conditions and corresponding actions may be specified as follows:

$$\text{If Value} > \theta_1, \text{Action} = \text{Action}_1$$
$$\text{Else If } \theta_1 \geq \text{Value} > \theta_2, \text{Action} = \text{Action}_2$$
$$\text{Else If } \theta_2 \geq \text{Value} > \theta_3, \text{Action} = \text{Action}_3$$
$$\text{Else If } \theta_3 \geq \text{Value}, \text{Action} = \text{Action}_4$$

where Value is the value of the sample of the input timeseries, $\theta_1$-$\theta_4$ are thresholds for the value, and $\text{Action}_1$-

Action$_4$ are specific actions that are performed if the corresponding logic statement is satisfied. For example, Action$_1$ may be performed if the value of the sample is greater than $\theta_1$.

In some embodiments, the actions include assigning various states to the sample of the input timeseries. For example, Action$_1$ may include assigning a first state to the sample of the input timeseries, whereas Action$_2$ may include assigning a second state to the sample of the input timeseries. Accordingly, different states can be assigned to the sample based on the value of the sample relative to the threshold values. Each time a new sample of an input timeseries is received, eventseries generator 615 can run through the set of rules, select the rules that apply to that specific input timeseries, apply them in a predetermined order, determine which condition is satisfied, and assign a particular state to the sample based on which condition is satisfied.

One example of an eventseries which can be generated by eventseries generator 615 is an outdoor air temperature (OAT) eventseries. The OAT eventseries may define one or more temperature states and may indicate the time periods during which each of the temperature states is observed. In some embodiments, the OAT eventseries is based on a timeseries of measurements of the OAT received as a raw data timeseries. Eventseries generator 615 can use a set of rules to assign a particular temperature state (e.g., hot, warm, cool, cold) to each of the timeseries OAT samples. For example, eventseries generator 615 can apply the following set of rules to the samples of an OAT timeseries:

---
If OAT > 100,State = Hot
Else If 100 ≥ OAT > 80,State = Warm
Else If 80 ≥ OAT > 50,State = Cool
Else If 50 ≥ OAT,State = Cold
--- where OAT is the value of a particular timeseries data sample. If the OAT is above 100, eventseries generator 615 can assign the timeseries sample to the "Hot" temperature state. If the OAT is less than or equal to 100 and greater than 80, eventseries generator 615 can assign the timeseries sample to the "Warm" temperature state. If the OAT is less than or equal to 80 and greater than 50, eventseries generator 615 can assign the timeseries sample to the "Cool" temperature state. If the OAT is less than or equal to 50, eventseries generator 615 can assign the timeseries sample to the "Cold" temperature state.

In some embodiments, eventseries generator 615 creates a new timeseries that includes the assigned states for each sample of the original input timeseries. The new timeseries may be referred to as a "state timeseries" because it indicates the state assigned to each timeseries sample. The state timeseries can be created by applying the set of rules to an input timeseries as previously described. In some embodiments, the state timeseries includes a state value and a timestamp for each sample of the state timeseries. An example of a state timeseries is as follows:

[⟨state$_1$, timestamp$_1$⟩, ⟨state$_2$, timestamp$_2$⟩, . . . ⟨state$_N$, timestamp$_N$⟩]

where state$_i$ is the state assigned to the ith sample of the input timeseries, timestamp$_i$ is the timestamp of the ith sample of the input timeseries, and N is the total number of samples in the input timeseries. In some instances, two or more of the state values may be the same if the same state is assigned to multiple samples of the input timeseries.

In some embodiments, the state timeseries also includes the original value of each sample of the input timeseries. For example, each sample of the state timeseries may include a state value, a timestamp, and an input data value, as shown in the following equation:

[⟨state$_1$, timestamp$_1$, value$_1$⟩, . . . ⟨state$_N$, timestamp$_N$, value$_N$⟩]

where value$_i$ is the original value of the ith sample of the input timeseries. The state timeseries is a type of derived timeseries which can be stored and processed by timeseries service 528.

Referring now to FIG. 9C, a table 910 illustrating the result of assigning a temperature state to each timeseries sample is shown, according to some embodiments. Each timeseries sample is shown as a separate row of table 910. The "Time" column of table 910 indicates the timestamp associated with each sample, whereas the "OAT" column of table 910 indicates the value of each timeseries sample. The "State" column of table 910 indicates the state assigned to each timeseries sample by eventseries generator 615.

Referring now to FIG. 9D, a table 920 illustrating a set of events generated by eventseries generator 615 is shown, according to some embodiments. Each event is shown as a separate row of table 920. The "Event ID" column of table 920 indicates the unique identifier for each event (e.g., Event 1, Event 2, etc.). The "Start Time" column of table 920 indicates the time at which each event begins and the "End Time" column of table 920 indicates the time at which event ends. The "State" column of table 920 indicates the state associated with each event.

Eventseries generator 615 can generate each event shown in table 920 by identifying consecutive timeseries samples with the same assigned state and determining a time period that includes the identified samples. In some embodiments, the time period starts at the timestamp of the first sample having a given state and ends immediately before the timestamp of the next sample having a different state. For example, the first two timeseries samples shown in table 910 both have the state "Cold," whereas the third sample in table 910 has the state "Cool." Eventseries generator 615 can identify the first two samples as having the same state and can generate the time period 00:00-01:59 which includes both of the identified samples. This time period begins at the timestamp of the first sample (i.e., 00:00) and ends immediately before the timestamp of the third sample (i.e., 02:00). Eventseries generator 615 can create an event for each group of consecutive samples having the same state.

Eventseries generator 615 can perform a similar analysis for the remaining timeseries samples in table 910 to generate each of the events shown in table 920. In some instances, multiple events can have the same state associated therewith. For example, both Event 1 and Event 7 shown in table 920 have the "Cold" state. Similarly, both Event 2 and Event 6 have the "Cool" state and both Event 3 and Event 5 have the "Warm" state. It should be noted that an event defines not only a particular state, but also a time period (i.e., a series of consecutive time samples) during which that state is observed. If the same state is observed during multiple non-consecutive time periods, multiple events having the same state can be generated to represent each of the non-consecutive time periods.

In some embodiments, eventseries generator 615 creates an eventseries for a set of events. An eventseries is conceptually similar to a timeseries in that both represent a series of occurrences. However, the samples of a timeseries correspond to instantaneous occurrences having a single timestamp, whereas the samples of an eventseries correspond to non-instantaneous events having both a start time and a stop time. For example, eventseries generator 615 may create the following eventseries for the set of events shown in table 920:

[⟨ ID=1, State=Cold, StartTime=00:00, EndTime= 01; 59⟩,
⟨ ID=2, State=Cool, StartTime=02: 00, EndTime=08; 59⟩,
⟨ ID=3, State=Warm, StartTime=09: 00, EndTime=11; 59⟩,
⟨ ID=4, State=Hot, StartTime=12: 00, EndTime=15; 59⟩,
⟨ ID=5, State=Warm, StartTime=16: 00, EndTime=18; 59⟩,
⟨ ID=6, State=Cool, StartTime=19: 00, EndTime=21; 59⟩,
⟨ ID=7, State=Cold, StartTime=22: 00, EndTime=23; 59⟩,]

where each item within the bent brackets ⟨ ⟩ is an event having the attributes ID, State, StartTime, and EndTime. Events can be stored in a tabular format (as shown in FIG. 9D), as a text string (as shown above), as a data object (e.g., a JSON object), in a container format, or any of a variety of formats.

Eventseries Updates—Streaming Data

Table 920 shown in FIG. 9D represents the final set of events for the time period ranging from 00:00-23:59. In some embodiments, the events in table 920 are generated after all of the timeseries samples within the time period have been collected. However, eventseries generator 615 can also generate and update events in real time as the data samples are collected. This functionality allows eventseries generator 615 to update events and/or eventseries in real time upon receiving individual samples of incoming streaming data.

Referring now to FIGS. 9E-9H, several tables illustrating how eventseries generator 615 can update an eventseries in real time upon receiving new samples of streaming data are shown, according to some embodiments. FIG. 9E shows table 910 broken into five segments. The top segment includes all of the data samples received up to time $t_1$ and identifies the state associated with each data sample. At time $t_1$, eventseries generator 615 can translate the information in table 910 into table 921 shown in FIG. 9F. At time $t_1$, the most recent data sample (i.e., the sample with timestamp 15:00) was associated with the "Hot" temperature state, which indicates that the "Hot" temperature state is still active. The end time of the "Hot" temperature state cannot be determined based on the information known at time $t_1$. Accordingly, table 921 is shown to include a value of "Null" as the end time of Event 4.

At time $t_2$, eventseries generator 615 receives the next sample of the OAT timeseries. This sample has a timestamp of 16:00 and is associated with the "Warm" state. At time $t_2$, eventseries generator 615 can determine that the "Hot" state is no longer active and the system has transitioned into the "Warm" state. Accordingly, eventseries generator 615 can update table 921 to create table 922 shown in FIG. 9G. In table 922, the "Null" value at the end time of Event 4 is updated with the actual end time of Event 4 (i.e., 15:59). Eventseries generator 615 can also add a new event (i.e., Event 5) to table 922 to represent the new event associated with the current "Warm" state. Event 5 has a start time of 16:00 and an end time of "Null" since the actual end time of Event 5 is unknown given the information known at time $t_2$.

At times $t_3$ and $t_4$, eventseries generator 615 receives the next two samples of the OAT timeseries. These samples have timestamps of 17:00 and 18:00 and both are associated with the "Warm" state. Eventseries generator 615 does not need to update table 922 at times $t_3$ and $t_4$ since the new samples indicate that Event 5 is still active and has not yet ended. Accordingly, the end time of Event 5 remains "Null" and the "Warm" state is still the most recent state.

At time $t_5$, eventseries generator 615 receives the next sample of the OAT timeseries. This sample has a timestamp of 19:00 and is associated with the "Cool" state. At time $t_5$, eventseries generator 615 can determine that the "Warm" state is no longer active and the system has transitioned into the "Cool" state. Accordingly, eventseries generator 615 can update table 922 to create table 923 shown in FIG. 9H. In table 923, the "Null" value at the end time of Event 5 is updated with the actual end time of Event 5 (i.e., 18:59). Eventseries generator 615 can also add a new event (i.e., Event 6) to table 925 to represent the new event associated with the current "Cool" state. Event 6 has a start time of 19:00 and an end time of "Null" since the actual end time of Event 6 is unknown given the information known at time $t_5$.

Eventseries Updates—Out of Order Data

The above scenario assumes that each incoming sample of the timeseries data is received in the correct order (i.e., with monotonically increasing timestamps). However, eventseries generator 615 can also be configured to update events and eventseries if the incoming samples are received out of order. The following scenarios illustrate how eventseries generator 615 can handle out of order data.

Scenario A

Referring now to FIGS. 9I-9M, several tables illustrating how eventseries generator 615 can update an eventseries in real time when incoming data samples are received out of order are shown, according to some embodiments. In this scenario, the data sample having timestamp 16:00 is received after the data sample having timestamp 17:00. FIG. 9I shows table 910 broken into five segments. The top segment includes all of the data samples received up to time $t_1$ and identifies the state associated with each data sample. At time $t_1$, eventseries generator 615 can translate the information in table 910 into table 931 shown in FIG. 9J. At time $t_1$, the most recent data sample (i.e., the sample with timestamp 15:00) was associated with the "Hot" temperature state, which indicates that the "Hot" temperature state is still active. The end time of the "Hot" temperature state cannot be determined based on the information known at time $t_1$. Accordingly, table 931 is shown to include a value of "Null" as the end time of Event 4.

At time $t_2$, eventseries generator 615 receives another sample of the OAT timeseries. This sample has a timestamp of 17:00 and is associated with the "Warm" state. At time $t_2$, eventseries generator 615 can determine that the "Hot" state is no longer active and the system has transitioned into the "Warm" state. Accordingly, eventseries generator 615 can update table 931 to create table 932 shown in FIG. 9K. In table 932, the "Null" value at the end time of Event 4 is updated with the estimated end time of Event 4 (i.e., 16:59). It should be noted that this end time is not the actual end time, but rather the best estimate given the information known up to time $t_2$. The actual end time of Event 4 may have occurred anytime between timestamp 15:00 and timestamp 17:00. Eventseries generator 615 can also add a new event (i.e., Event 5) to table 932 to represent the new event associated with the current "Warm" state. Event 5 has a start time of 17:00 and an end time of "Null" since the actual end time of Event 5 is unknown given the information known at time $t_2$.

At time $t_3$, eventseries generator 615 receives another sample of the OAT timeseries. This sample has a timestamp of 16:00 and is associated with the "Warm" state. At time $t_3$, eventseries generator 615 can determine that the estimated end time of Event 4 (i.e., 16:59) and the start time of Event 5 need to be updated based on the information provided by the sample received at time $t_3$. Specifically, eventseries generator 615 can update the end time of Event 4 to 15:59 and can update the start time of Event 5 to 16:00, as shown in table 933 in FIG. 9L. Since the end time of Event 5 cannot be determined based on the information known at time $t_3$, the end time of Event 5 may remain "Null."

At time $t_4$, eventseries generator 615 receives the next sample of the OAT timeseries. This sample has a timestamp of 18:00 and is associated with the "Warm" state. Eventseries generator 615 does not need to update table 933 at time $t_4$ since the new samples indicate that Event 5 is still active and has not yet ended. Accordingly, the end time of Event 5 remains "Null" and the "Warm" state is still the most recent state.

At time $t_5$, eventseries generator 615 receives the next sample of the OAT timeseries. This sample has a timestamp of 19:00 and is associated with the "Cool" state. At time $t_5$, eventseries generator 615 can determine that the "Warm" state is no longer active and the system has transitioned into the "Cool" state. Accordingly, eventseries generator 615 can update table 933 to create table 935 shown in FIG. 9H. In table 923, the "Null" value at the end time of Event 5 is updated with the actual end time of Event 5 (i.e., 18:59). Eventseries generator 615 can also add a new event (i.e., Event 6) to table 935 to represent the new event associated with the current "Cool" state. Event 6 has a start time of 19:00 and an end time of "Null" since the actual end time of Event 6 is unknown given the information known at time $t_5$.

Scenario B

Referring now to FIGS. 9N-9R, several tables illustrating another example of how eventseries generator 615 can update an eventseries in real time when incoming data samples are received out of order are shown, according to some embodiments. In this scenario, the data sample having timestamp 16:00 is received after the data sample having timestamp 19:00. FIG. 9N shows table 910 broken into five segments. The top segment includes all of the data samples received up to time $t_1$ and identifies the state associated with each data sample. At time $t_1$, eventseries generator 615 can translate the information in table 910 into table 941 shown in FIG. 9O. At time $t_1$, the most recent data sample (i.e., the sample with timestamp 15:00) was associated with the "Hot" temperature state, which indicates that the "Hot" temperature state is still active. The end time of the "Hot" temperature state cannot be determined based on the information known at time $t_1$. Accordingly, table 941 is shown to include a value of "Null" as the end time of Event 4.

At time $t_2$, eventseries generator 615 receives another sample of the OAT timeseries. This sample has a timestamp of 17:00 and is associated with the "Warm" state. At time $t_2$, eventseries generator 615 can determine that the "Hot" state is no longer active and the system has transitioned into the "Warm" state. Accordingly, eventseries generator 615 can update table 941 to create table 942 shown in FIG. 9P. In table 942, the "Null" value at the end time of Event 4 is updated with the estimated end time of Event 4 (i.e., 16:59). It should be noted that this end time is not the actual end time, but rather the best estimate given the information known up to time $t_2$. The actual end time of Event 4 may have occurred anytime between timestamp 15:00 and timestamp 17:00. Eventseries generator 615 can also add a new event (i.e., Event 5) to table 942 to represent the new event associated with the current "Warm" state. Event 5 has a start time of 17:00 and an end time of "Null" since the actual end time of Event 5 is unknown given the information known at time $t_2$.

At time $t_3$, eventseries generator 615 receives the next sample of the OAT timeseries. This sample has a timestamp of 18:00 and is associated with the "Warm" state. Eventseries generator 615 does not need to update table 942 at time $t_3$ since the new samples indicate that Event 5 is still active and has not yet ended. Accordingly, the end time of Event 5 remains "Null" and the "Warm" state is still the most recent state.

At time $t_4$, eventseries generator 615 receives the next sample of the OAT timeseries. This sample has a timestamp of 19:00 and is associated with the "Cool" state. At time $t_4$, eventseries generator 615 can determine that the "Warm" state is no longer active and the system has transitioned into the "Cool" state. Accordingly, eventseries generator 615 can update table 942 to create table 944 shown in FIG. 9Q. In table 944, the "Null" value at the end time of Event 5 is updated with the actual end time of Event 5 (i.e., 18:59). Eventseries generator 615 can also add a new event (i.e., Event 6) to table 944 to represent the new event associated with the current "Cool" state. Event 6 has a start time of 19:00 and an end time of "Null" since the actual end time of Event 6 is unknown given the information known at time $t_4$.

At time $t_5$, eventseries generator 615 receives another sample of the OAT timeseries. This sample has a timestamp of 16:00 and is associated with the "Warm" state. At time $t_4$, eventseries generator 615 can determine that the estimated end time of Event 4 (i.e., 16:59) and the start time of Event 5 need to be updated based on the information provided by the sample received at time $t_3$. Specifically, eventseries generator 615 can update the end time of Event 4 to 15:59 and can update the start time of Event 5 to 16:00, as shown in table 945 in FIG. 9R. Since the end time of Event 6 cannot be determined based on the information known at time $t_5$, the end time of Event 6 may remain "Null."

Scenario C

Referring now to FIGS. 9S-9Y, several tables illustrating another example of how eventseries generator 615 can update an eventseries in real time when incoming data samples are received out of order are shown, according to some embodiments. In this scenario, the data samples are received in the order shown in FIGS. 9S and 9W. The data samples with timestamps 00:00-11:00 are received in the correct order. However, the next three samples received have timestamps 17:00, 18:00, and 19:00. The next sample received has timestamp 15:00, followed by the samples with timestamps 12:00 and 13:00. The final two samples received have timestamps 16:00 and 14:00.

FIG. 9S shows table 910 broken into five segments. The top segment includes all of the data samples received up to time $t_1$ and identifies the state associated with each data sample. At time $t_1$, eventseries generator 615 can translate the information in table 910 into table 951 shown in FIG. 9T. At time $t_1$, the most recent data sample (i.e., the sample with timestamp 11:00) was associated with the "Warm" temperature state, which indicates that the "Warm" temperature state is still active. The end time of the "Warm" temperature state cannot be determined based on the information known at time $t_1$. Accordingly, table 951 is shown to include a value of "Null" as the end time of Event 3.

At time $t_2$, eventseries generator 615 receives another sample of the OAT timeseries. This sample has a timestamp of 17:00 and is associated with the "Warm" state. Although a complete picture of the timeseries data would show that the system has transitioned into the "Hot" state and then back into the "Warm" state, the information received up to time $t_2$ indicates (incorrectly) that the system has remained in the "Warm" state from 11:00 to 17:00. Accordingly, eventseries generator 615 determines that the system is still in the "Warm" state at time $t_2$ and does not update table 951. The sample received with timestamp 18:00 also indicates that the system is still in the "Warm" state and does not trigger an update.

At time $t_3$, eventseries generator 615 receives another sample of the OAT timeseries. This sample has a timestamp of 19:00 and is associated with the "Cool" state. At time $t_3$, eventseries generator 615 can determine that the "Warm" state is no longer active and the system has transitioned into the "Cool" state. Accordingly, eventseries generator 615 can update table 951 to create table 953 shown in FIG. 9U. In table 953, the "Null" value at the end time of Event 3 is updated with the estimated end time of Event 3 (i.e., 18:59). This end time is not the actual end time, but rather the best estimate given the information known up to time $t_3$. The actual end time of Event 3 may have occurred anytime between timestamp 09:00 and timestamp 19:00. Eventseries generator 615 can also add a new event (i.e., Event 4) to table 953 to represent the new event associated with the current "Cool" state. Event 4 has a start time of 19:00 and an end time of "Null" since the actual end time of Event 4 is unknown given the information known at time $t_3$.

At time $t_4$, eventseries generator 615 receives the next sample of the OAT timeseries. This sample has a timestamp of 15:00 and is associated with the "Hot" state. At time $t_4$, eventseries generator 615 can determine that the time period associated with Event 3 is actually three separate events (i.e., two "Warm" events with a "Hot" event in between). Accordingly, eventseries generator 615 can update table 953 to create table 954 shown in FIG. 9V. In table 954, the end time of Event 3 is updated to 14:59 and a new event (i.e., Event 5) is added to represent the time period during which the "Hot" state was active. Event 5 has a start time of 15:00 and an end time of 16:59. Another new event (i.e., Event 6) is added to represent the second "Warm" time period which was previously part of Event 3. Event 6 has a start time of 17:00 and an end time of 18:59. The events shown in table 954 are arranged in temporal order rather than in the order of the event ID.

At time $t_5$, eventseries generator 615 receives another sample of the OAT timeseries. This sample has a timestamp of 12:00 and is associated with the "Hot" state. At time $t_5$, eventseries generator 615 can determine that the estimated end time of Event 3 (i.e., 14:59) and the estimated start time of Event 5 (i.e., 15:00) need to be updated based on the information provided by the sample received at time $t_5$. Specifically, eventseries generator 615 can update the end time of Event 3 to 11:59 and can update the start time of Event 5 to 12:00, as shown in table 955 in FIG. 9X. Since the end time of Event 4 cannot be determined based on the information known at time $t_5$, the end time of Event 6 may remain "Null."

At time $t_6$, eventseries generator 615 receives another sample of the OAT timeseries. This sample has a timestamp of 16:00 and is associated with the "Warm" state. At time $t_6$, eventseries generator 615 can determine that the estimated end time of Event 5 (i.e., 16:59) and the estimated start time of Event 6 (i.e., 16:00) need to be updated based on the information provided by the sample received at time $t_6$. Specifically, eventseries generator 615 can update the end time of Event 5 to 15:59 and can update the start time of Event 6 to 16:00, as shown in table 956 in FIG. 9Y. Since the end time of Event 4 still cannot be determined based on the information known at time $t_6$, the end time of Event 6 may remain "Null."

Eventseries Process

Figure 9Z:
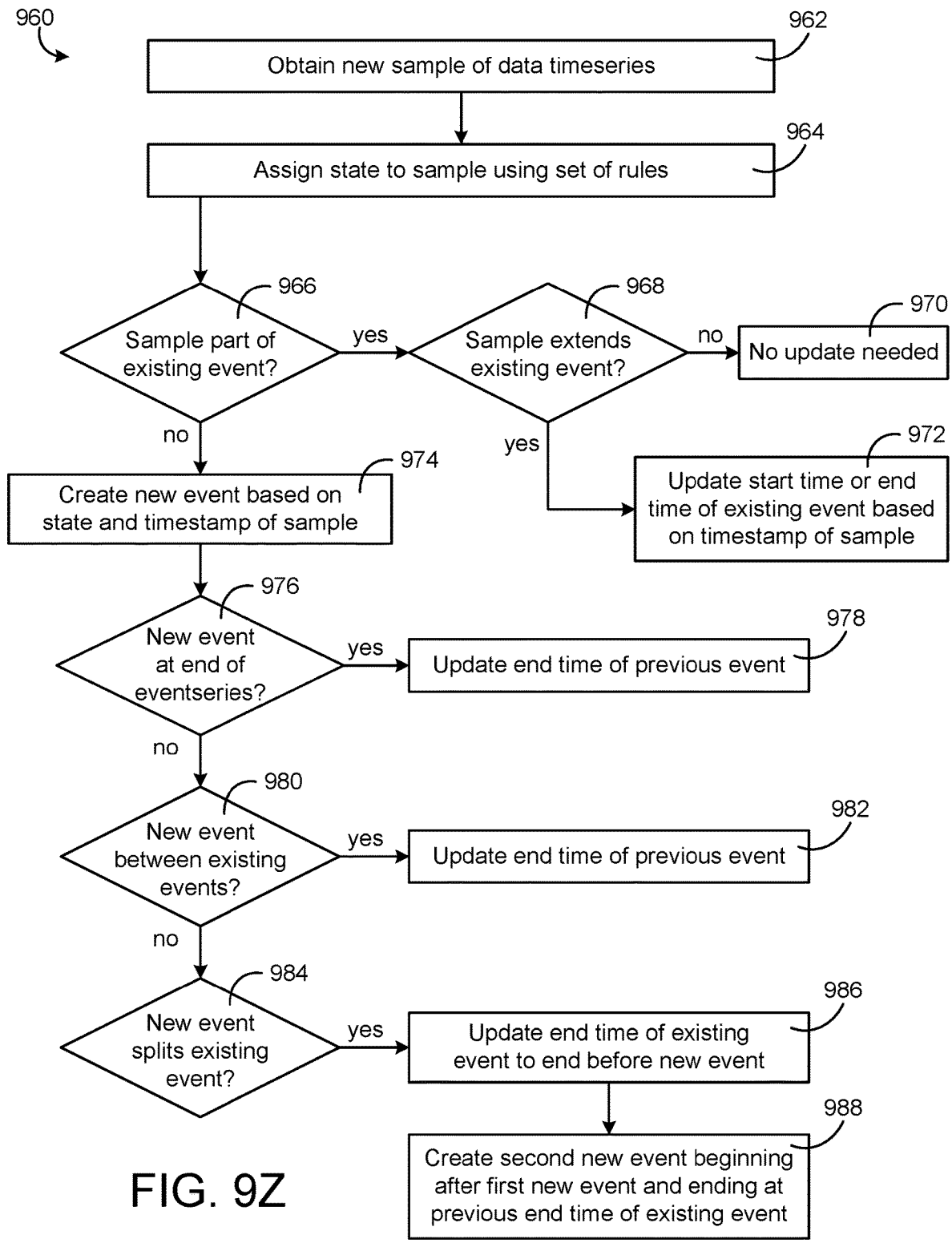
FIG. 9Z is a flowchart of a process for generating and updating events and eventseries, according to some embodiments.

Referring now to FIG. 9Z, a flowchart of a process 960 for creating and updating eventseries is shown, according to some embodiments. Process 960 can be performed by eventseries generator 615, as described with reference to FIGS. 6 and 9C-9Y. In some embodiments, process 960 is performed to create an eventseries based on the samples of a data timeseries. Process 960 can be performed after all of the samples of the data timeseries have been collected or can be performed each time a new sample of the data timeseries is collected.

Process 960 is shown to include obtaining a new sample of a data timeseries (step 962) and assigning a state to the sample using a set of rules (step 964). In some embodiments, the sample is obtained from a sensor configured to measure a variable of interest in or around a building. For example, the sample can be a sample of a raw data timeseries. In other embodiments, the sample is a sample of a derived data timeseries generated by sample aggregator 608, virtual point calculator 610, weather point calculator 612, or other timeseries operators 606. The sample can be obtained from a set of samples of a complete timeseries or can be received as the latest sample of an incoming data stream.

In some embodiments, step 964 includes applying a set of rules to the sample of the data timeseries to determine which state to assign. The set of rules may define various ranges of values and a corresponding state for each range of values. Step 964 can include assigning the sample to a particular state if the value of the value of the sample is within the corresponding range of values. For example, if the sample is a sample of outdoor air temperature (OAT), the set of rules may define various temperature ranges and a temperature state for each of the temperature ranges. One example of such a set of rules is as follows:

---
If OAT > 100, State = Hot
Else If 100 ≥ OAT > 80, State = Warm
Else If 80 ≥ OAT > 50, State = Cool
Else If 50 ≥ OAT, State = Cold
--- where OAT is the value of a particular timeseries data sample. If the OAT is above 100, the sample can be assigned to the "Hot" temperature state. If the OAT is less than or equal to 100 and greater than 80, the sample can be assigned to the "Warm" temperature state. If the OAT is less than or equal to 80 and greater than 50, the sample can be assigned to the "Cool" temperature state. If the OAT is less than or equal to 50, the sample can be assigned to the "Cold" temperature state.

Still referring to FIG. 9Z, process 960 is shown to include determining whether the sample is part of an existing event (step 966). Step 966 may include identifying all of the events in an existing eventseries and determining whether the sample belongs to any of the identified events. Each event may be defined by the combination of a particular state and a time period having both a start time and an end time. Step 966 may include determining that the sample is part of an existing event if the sample is both (1) assigned to the same state as the existing event and (2) has a timestamp that is either (a) within the time period associated with the existing event or (b) consecutive with the time period associated with the existing event. However, step 966 may include determining that the sample is not part of an existing event if the sample does not have the same state as the existing event or does not have a timestamp that that is either within the time period associated with the existing event or consecutive with the time period associated with the existing event.

In step 966, a timestamp may be considered within the time period associated with an existing event if the timestamp is between the start time of the event and the end time of the event. A timestamp may be considered consecutive with the time period associated with an existing event if the timestamp is immediately before the start time or immediately after the end time of the event. For example, if a new sample has a timestamp before the start time of an event and no other samples have intervening timestamps between the timestamp of the new sample and the start time of the event, the timestamp may be considered consecutive with the time period associated with the existing event. Similarly, if a new sample has a timestamp after the end time of an event and no other samples have intervening timestamps between the end time of the event and the timestamp of the new sample, the timestamp may be considered consecutive with the time period associated with the existing event.

If the new sample is part of an existing event (i.e., the result of step 966 is "yes"), process 960 may proceed to determining whether the new sample extends the existing event (step 968). Step 968 may include determining whether the timestamp of the new sample is consecutive with the time period associated with the existing event (i.e., immediately before the start time of the event or immediately after the end time of the event). If the timestamp of the new sample is consecutive with the time period associated with the existing event, step 968 may include determining that the sample extends the existing event. However, if the timestamp of the new sample is not consecutive with the time period associated with the existing event, step 968 may include determining that the sample does not extend the existing event.

If the sample does not extend the existing event (i.e., the result of step 968 is "no"), process 960 may include determining that no update to the existing event is needed. This situation may occur when the timestamp of the new sample is between the start time of the existing event and the end time of the existing event (i.e., within the time period associated with the existing event). Since the time period associated with the existing event already covers the timestamp of the new sample, it may be unnecessary to update the existing event to include the timestamp of the new sample.

However, if the sample extends the existing event (i.e., the result of step 968 is "yes"), process 960 may proceed to updating the start time or end time of the existing event based on the timestamp of the sample (step 972). Step 972 may include moving the start time of the event backward in time or moving the end time of the event forward in time such that the time period between the start time and the end time includes the timestamp of the new sample. For example, if the timestamp of the sample is before the start time of the event, step 972 may include replacing the start time of the existing event with the timestamp of the sample.

Similarly, if the timestamp of the sample is after the end time of the event, step 972 may include replacing the end time of the existing event with a new end time that occurs after the timestamp of the sample. For example, if the existing event has an original end time of 04:59 and the new sample has a timestamp of 05:00, step 972 may include updating the end time of the event to 05:59 (or any other time that occurs after 05:00) such that the adjusted time period associated with the event includes the timestamp of the new sample. If the original end time of the existing event is "Null" and the new sample extends the end time of the existing event, step 972 may maintain the original end time of "Null." This situation is described in greater detail with reference to FIGS. 9E-9H.

Returning to step 966, if the sample is not part of an existing event (i.e., the result of step 966 is "no"), process 960 may proceed to creating a new event based on the state and the timestamp of the new sample (step 974). The new event may have a state that matches the state assigned to the new sample in step 964. The new event may have a start time equal to the timestamp of the sample and an end time that occurs after the timestamp of the sample such that the time period associated with the new event includes the timestamp of the sample. The end time may have a value of "Null" if the new event is the last event in the eventseries or a non-null value of the new event is not the last event in the eventseries. For example, if the next event in the timeseries begins at timestamp 06:00, step 974 may include setting the end time of the new event to 05:59.

After creating the new event in step 974, process 960 may perform steps 976-988 to update other events in the eventseries based on the new information provided by the new event. For example, if the new event is the last event in the eventseries (i.e., the result of step 976 is "yes"), process 960 may update the end time of the previous event (i.e., the event that occurs immediately before the new event) (step 978). The update performed in step 978 may include setting the end time of the previous event to a time immediately before the timestamp of the new sample. For example, if the new sample has a timestamp of 05:00, step 978 may include updating the end time of the previous event to 04:59. If the new event is not the last event in the eventseries (i.e., the result of step 976 is "no"), process 960 may proceed to step 980.

If the new event occurs between existing events in the eventseries (i.e., the result of step 980 is "yes"), process 960 may update the end time of the previous event (step 982). The update performed in step 982 may be the same as the update performed in step 978. For example, the update performed in step 982 may include setting the end time of the previous event to a time immediately before the timestamp of the new sample. If the new event does not occur between existing events in the eventseries (i.e., the result of step 980 is "no"), process 960 may proceed to step 984.

If the new event splits an existing event in the eventseries (i.e., the result of step 984 is "yes"), process 960 may split the existing event into two events with the new event in between. In some embodiments, splitting the existing event into two events includes updating the end time of the existing event to end before the new event (step 986) and creating a second new event beginning after the first new event and ending at the previous end time of the existing event (step 988). For example, consider a situation in which the existing event has a start time of 04:00, an end time of 11:59, and a state of "Warm." The new event added in step 974 may have a start time of 08:00, an end time of 08:59, and a state of "Hot." Accordingly, step 986 may include changing the end time of the existing event to 07:59 such that the existing event corresponds to a first "Warm" event and covers the time period from 04:00 to 07:59. The intervening "Hot" event may cover the time period from 08:00 to 08:59. The second new event created in step 988 (i.e., the second "Warm" event) may have a start time of 09:00 and an end time of 11:59. The state of the second new event may be the same as the state of the existing event.

Properties of Events and Eventseries

Similar to timeseries, an eventseries can be used in two ways. In some embodiments, an event series is used for storage only. For example, events can be created by an external application and stored in an eventseries. In this scenario, the eventseries is used only as a storage container. In other embodiments, eventseries can be used for both storage and processing. For example, events can be created by eventseries generator 615 based on raw or derived timeseries by applying a set of rules, as previously described. In this scenario, the eventseries is both the storage container and the mechanism for creating the events.

In some embodiments, each eventseries includes the following properties or attributes: EventseriesID, OrgID, InputTimeseriesID, StateTimeseriesID, Rules, and Status. The EventseriesID property may be a unique ID generated by eventseries generator 615 when a new eventseries is created. The EventseriesID property can be used to uniquely identify the eventseries and distinguish the eventseries from other eventseries. The OrgID property may identify the organization (e.g., "ABC Corporation") to which the eventseries belongs. Similar to timeseries, each eventseries may belong to a particular organization, building, facility, or other entity (described in greater detail with reference to FIGS. 11A-11B).

The InputTimeseriesID property may identify the timeseries used to create the eventseries. For example, if the eventseries is a series of outdoor air temperature (OAT) events, the InputTimeseriesID property may identify the OAT timeseries from which the OAT eventseries is generated. In some embodiments, the input timeseries has the following format:

[<key, timestamp$_1$, value$_1$>, <key, timestamp$_2$, value$_2$>, <key, timestamp$_3$, value$_3$>]

where key is an identifier of the source of the data samples (e.g., timeseries ID, sensor ID, etc.), timestamp$_i$ identifies a time associated with the ith sample, and value$_i$ indicates the value of the ith sample.

The Rules property may identify a list of rules that are applied to the input timeseries to assign a particular state to each sample of the input timeseries. In some embodiments, the list of rules includes a plurality of rules that are applied in a particular order. The order may be defined by the logical structure of the rules. For example, the rules may include a set of "If" and "ElseIf" statements that are evaluated in the order in which the statements appear in the set of rules. An example of a set of rules is as follows:

```
If OAT > 100,State = Hot
Else If 100 ≥ OAT > 80,State = Warm
Else If 80 ≥ OAT > 50,State = Cool
Else If 50 ≥ OAT,State = Cold
```

The StateTimeseriesID property may identify the state timeseries in which the assigned states are stored. The state timeseries can be created by applying the set of rules to an input timeseries as previously described. In some embodiments, the state timeseries includes a state value and a timestamp for each sample of the state timeseries. An example of a state timeseries is as follows:

[⟨state$_1$, timestamp$_1$⟩, ⟨state$_2$, timestamp$_2$⟩, . . . ⟨state$_N$, timestamp$_N$⟩]

where state$_i$ is the state assigned to the ith sample of the input timeseries, timestamp$_i$ is the timestamp of the ith sample of the input timeseries, and N is the total number of samples in the input timeseries.

The Status property may indicate whether the eventseries is active (i.e., Status=Active) or inactive (i.e., Status=Inactive). In some embodiments, an eventseries is active by default when the eventseries is created. An eventseries can be deactivated by events service 603. Events service 603 can change the Status property from active to inactive upon deactivating an eventseries.

Each eventseries may include a set of events. Each event may include the following properties: EventID, State, StartTimestamp, EndTimestamp, and EventseriesID. The EventID property may be a unique ID generated by eventseries generator 615 when a new event is created. The EventID property can be used to uniquely identify a particular event and distinguish the event from other events in the eventseries. The State property may be a text string that defines the state associated with the event. Each event may be uniquely associated with one state. The StartTimestamp property may indicate the start time of the event, whereas the EndTimestamp property may indicate the end time of the event. The StartTimestamp and EndTimestamp properties may be timestamps in any of a variety of formats (e.g., 2017-01-01T00:00:00). The EventseriesID property may identify the eventseries which includes the event. The EventseriesID property may be the same unique identifier used to identify and distinguish eventseries from each other.

Event Service

Referring again to FIG. 6, timeseries service 528 is shown to include an event service 603. In some embodiments, event service 603 is part of timeseries service 528. In other embodiments, event service 603 is a separate service (i.e., separate from timeseries service 528) within data platform services 520. Event service 603 can be configured to receive and process requests for information relating to various events and eventseries. Event service 603 can also create and update events and eventseries in response to a request from an application or a user. Several examples of how event service 603 can handle requests are described below. The following table identifies the types of actions event service 603 can perform with respect to events and eventseries:

| Resource | GET (read) | POST (create) | PUT (update) |
|---|---|---|---|
| /Eventseries | Retrieve list of Eventseries | Create one or more new Eventseries | N/A |
| /Eventseries/{eventseriesId} | Read a specific Eventseries | Create a specific Eventseries | Update the specific Eventseries |
| /Events | Retrieve a list of Events | Create one or more new Events | N/A |
| /Events/{evenId} | Read a specific Event | Create a specific Event | Update the specific Event |

Event service 603 can be configured to create a new eventseries in response to a request containing an OrgID attribute and a processing type attribute. For example, event service 603 can receive the following request:

```
Post {timeseriesV2}/eventseries/new
{
    "orgId": "Abc Inc",
    "ProcessingType" : "none"
}
``` where "Abc Inc" is the ID of the organization to which the new eventseries will belong and no processing type is specified.

In response to this request, event service 603 can create a new eventseries (i.e., an empty eventseries container) and assign an EventseriesID to the eventseries. For example, event service 603 can respond to the request as follows:

```
{
    "eventseriesId": "c7c157e4-603f-4b25-b182-ce7b0f8291d8",
    "orgId": "Abc Inc",
    "inputTimeseriesId": null,
    "stateTimeseriesId": null,
    "rules": null,
    "status": "active",
    "processingType": "stream"
}
```

In some embodiments, event service 603 is configured to create a new eventseries in response to a request containing an OrgID attribute, an InputTimeseriesID attribute, a StateTimeseriesID attribute, and a Rules attribute. For example, event service 603 can receive the following request:

```
{
    "orgId": "Abc Inc",
    "inputTimeseriesId": "793c156e4-603f-4b2e-bt82-ce7b0f829uj3",
    "stateTimeseriesId": "uic157e4-6r2f-4b25-b682-ct7b0f8917u",
    "rules": [
        {"compareOp": "Gt", "scalar": 100, "state": "Hot"},
        {"compareOp": "Gt", "scalar": 80, "state": "Warm"},
        {"compareOp": "Gt", "scalar": 50, "state": "Cool"},
        {"compareOp": "Lte", "scalar": 50, "state": "Cold"}
    ]
}
``` where "793c156e4-603f-4b2e-bt82-ce7b0f829uj3" is the ID of the input timeseries used to generate the eventseries, "uic157e4-6r2f-4b25-b682-ct7b0f82917u" is the ID of the state timeseries containing the states assigned to each sample of the input timeseries, and the "rules" attribute contains a set of rules used to assign a state to each sample of the input timeseries.

In response to this request, event service 603 can create a new eventseries (i.e., an empty eventseries container) and assign an EventseriesID to the eventseries. For example, event service 603 can respond to the request as follows:

```
{
    "eventseriesId": "c7c157e4-603f-4b25-b182-ce7b0f8291d8",
    "orgId": "Abc Inc",
    "inputTimeseriesId": "793c156e4-603f-4b2e-bt82-ce7b0f829uj3",
    "stateTimeseriesId": "uic157e4-6r2f-4b25-b682-ct7b0f8917u",
    "rules": [
        {"compareOp": "Gt", "scalar": 100, "state": "Hot"},
        {"compareOp": "Gt", "scalar": 80, "state": "Warm"},
        {"compareOp": "Gt", "scalar": 50, "state": "Cool"},
        {"compareOp": "Lte", "scalar": 50, "state": "Cold"}
    ],
    "status": "active",
    "processingType": "stream"
}
```

In some embodiments, event service 603 is configured to add new events to an existing eventseries. For example, event service 603 can receive a request to add a new event to an eventseries. The request may specify the EventseriesID, the start time of the event, the end time of the event, and the state associated with the event, as shown in the following request:

Post {timeseriesV2}/eventseries/c7c157e4-603f-4b25-b182-ce7b0f8291d8/events

```
[
    {
        "eventseriesId": "c7c157e4-603f-4b25-b182-ce7b0f8291d8",
        "startTimestamp": "2017-04-01 13:48:23-05:00",
        "endTimestamp": "2017-04-01 13:54:11-05:00",
        "state": "High Pressure Alarm"
    }
]
```

In response to this request, event service 603 can generate a new EventID for the new event and can add the new event to the eventseries designated by the EventseriesID "c7c157e4-603f-4b25-b182-ce7b0f8291d8." The new event may have the start time "2017-04-01 13:48:23-05:00," the end time "2017-04-01 13:54:11-05:00," and the state "High Pressure Alarm" as specified in the request. In some embodiments, event service 603 responds to the request by acknowledging that the new event has been added to the eventseries.

In some embodiments, event service 603 is configured to update existing events in an eventseries. For example, event service 603 can receive a request to add update one or more properties of an existing event in an eventseries. The request may specify the EventseriesID, the updated start time of the event, the updated end time of the event, and/or the updated state associated with the event, as shown in the following request:

Put {timeseriesV2}/eventseries/c7c157e4-603f-4b25-b182-ce7b0f8291d8/events/c7c157e4-603f-4b25-b182-ce7b0f8291d8

```
{
    "eventseriesId": "c7c157e4-603f-4b25-b182-ce7b0f8291d8",
    "startTimestamp": "2017-04-01 13:48:23-05:00",
    "endTimestamp": "2017-04-01 13:54:11-05:00",
    "state": "High Pressure Alarm"
}
```

In response to this request, event service 603 can update the specified properties of the event designated by EventseriesID "c7c157e4-603f-4b25-b182-ce7b0f8291d8." The updated event may have the start time "2017-04-01 13:48:23-05:00," the end time "2017-04-01 13:54:11-05:00," and the state "High Pressure Alarm" as specified in the request. In some embodiments, event service 603 responds to the request by acknowledging that the event has been updated.

In some embodiments, event service 603 is configured to read the events of an eventseries. For example, event service 603 can receive a request to identify all of the events associated with an eventseries. The request may be specified as a get request as follows:

Get {timeseriesV2}/eventseries/c7c157e4-603f-4b25-b182-ce7b0M91d8/events where "c7c157e4-603f-4b25-b182-ce7b0f8291d8" is the EventseriesID of a specific eventseries.

In response to this request, event service 603 can search for all events of the specified eventseries and can return a list of the identified events. An example response which can be provided by event service 603 is as follows:

```
[
    {
        "eventid": "g9c197e4-003f-4u25-b182-se7b0f81945y",
        "eventseriesId": "c7c157e4-603f-4b25-b182-ce7b0f8291d8",
        "startTimestamp": "2017-04-01 13:48:23-05:00",
            "endTimestamp": "2017-04-01 13:54:11-05:00",
            "state": "High Pressure Alarm"
    }
]
``` where "g9c197e4-003f-4u25-b182-se7b0f81945y" is the EventID of an identified event matching the search parameters. The response may specify the EventseriesID, StartTimestamp, EndTimestamp, and State properties of each identified event.

In some embodiments, event service 603 is configured to search for the events of an eventseries that have a specific state. For example, event service 603 can receive a request to identify all of the events associated with a particular eventseries which have a specific state. The request may be specified as a get request as follows:
Get {timeseriesV2}/eventseries/c7c157e4-603f-4b25-b182-ce7b0f8291d8/events?state=Hot
where "c7c157e4-603f-4b25-b182-ce7b0f8291d8" is the EventseriesID of a particular eventseries and "state=Hot" specifies that the search should return only events of the eventseries that have the state "Hot." In response to this request, event service 603 may search for all matching events (i.e., events of the specified eventseries that have the specified state) and may return a list of events that match the search parameters.

In some embodiments, event service 603 is configured to search for the events of an eventseries that have a start time or end time matching a given value. For example, event service 603 can receive a request to identify all of the events of a particular eventseries that have a start time or end time that matches a specified timestamp. The request may be specified as a get request as follows:
Get {timeseriesV2}/eventseries/c7c157e4-603f-4b25-b182-ce7b0f8291 d8/events?startTime=2017-04-01%2010:00:00-05:00& endTime=2017-04-01%2010:00:00-05:00
where "c7c157e4-603f-4b25-b182-ce7b0f8291d8" is the EventseriesID of a particular eventseries and the "startTime" and "endTime" parameters specify the start time and end time of the event. In response to this request, event service 603 may search for all matching events (i.e., (startTimestamp of event<startTime and endTimestamp of event>endTime) and may return a list of events that match the search parameters.

In some embodiments, event service 603 is configured to search for the events of an eventseries that have a time range overlapping (at least partially) with a specified time range. For example, event service 603 can receive a request to identify all of the events of a particular eventseries that have (1) an event start time before a specified start time and an event end time after the specified start time or (2) an event start time before a specified end time and an event end time after the specified end time. The request may be specified as a get request as follows:
Get {timeseriesV2}/eventseries/c7c157e4-603f-4b25-b182-ce7b0f8291d8/events?startTime=2017-04-01%2010:00:00-05:00& endTime=2017-04-01%2011:59:00-05:00
where "c7c157e4-603f-4b25-b182-ce7b0f8291d8" is the EventseriesID of a particular eventseries and the "startTime" and "endTime" parameters specify the start time and end time of the event. In response to this request, event service 603 may search for all events that match the following criteria:
[(startTimestamp of event<startTime of query) AND (endTimestamp of event>startTime of query)] OR [(startTimestamp of event<endTime of query) AND (endTimestamp of event>endTime of query)]
and may return a list of events that match these criteria.

In some embodiments, event service 603 is configured to search for events of an eventseries that have a specific state and a time range that overlaps (at least partially) with a given time range. For example, event service 603 can receive a request to identify all of the events of a particular eventseries that have a particular state and either (1) an event start time before a specified start time and an event end time after the specified start time or (2) an event start time before a specified end time and an event end time after the specified end time. The request may be specified as a get request as follows:
Get {timeseriesV2}/eventseries/c7c157e4-603f-4b25-b182-ce7b0f8291d8/events?state=Hot& startTime=2017-04-01%2010:00:00-05:00& endTime=2017-04-01%2011:59:00-05:00
where "c7c157e4-603f-4b25-b182-ce7b0f8291d8" is the EventseriesID of a particular eventseries, the "state" parameter specifies a particular state, and the "startTime" and "endTime" parameters specify the start time and end time of the event. In response to this request, event service 603 may search for all events that match the following criteria:
State=Hot AND
[(startTimestamp of event<startTime of query) AND (endTimestamp of event>startTime of query)] OR [(startTimestamp of event<endTime of query) AND (endTimestamp of event>endTime of query)]
and may return a list of events that match these criteria.

Directed Acyclic Graphs

Referring again to FIG. 6, timeseries processing engine 604 is shown to include a directed acyclic graph (DAG) generator 620. DAG generator 620 can be configured to generate one or more DAGs for each raw data timeseries. Each DAG may define a workflow or sequence of operations which can be performed by timeseries operators 606 on the raw data timeseries. When new samples of the raw data timeseries are received, workflow manager 622 can retrieve the corresponding DAG and use the DAG to determine how the raw data timeseries should be processed. In some embodiments, the DAGs are declarative views which represent the sequence of operations applied to each raw data timeseries. The DAGs may be designed for timeseries rather than structured query language (SQL).

In some embodiments, DAGs apply over windows of time. For example, the timeseries processing operations defined by a DAG may include a data aggregation operation that aggregates a plurality of raw data samples having timestamps within a given time window. The start time and end time of the time window may be defined by the DAG and the timeseries to which the DAG is applied. The DAG may define the duration of the time window over which the data aggregation operation will be performed. For example, the DAG may define the aggregation operation as an hourly aggregation (i.e., to produce an hourly data rollup timeseries), a daily aggregation (i.e., to produce a daily data rollup timeseries), a weekly aggregation (i.e., to produce a weekly data rollup timeseries), or any other aggregation duration. The position of the time window (e.g., a specific day, a specific week, etc.) over which the aggregation is performed may be defined by the timestamps of the data samples of timeseries provided as an input to the DAG.

In operation, sample aggregator 608 can use the DAG to identify the duration of the time window (e.g., an hour, a day, a week, etc.) over which the data aggregation operation will be performed. Sample aggregator 608 can use the timestamps of the data samples in the timeseries provided as an input to the DAG to identify the location of the time window (i.e., the start time and the end time). Sample aggregator 608 can set the start time and end time of the time window such that the time window has the identified duration and includes the timestamps of the data samples. In some embodiments, the time windows are fixed, having predefined start times and end times (e.g., the beginning and end of each hour, day, week, etc.). In other embodiments, the time windows may be sliding time windows, having start times and end times that depend on the timestamps of the data samples in the input timeseries.

Figures 10A, 10B:
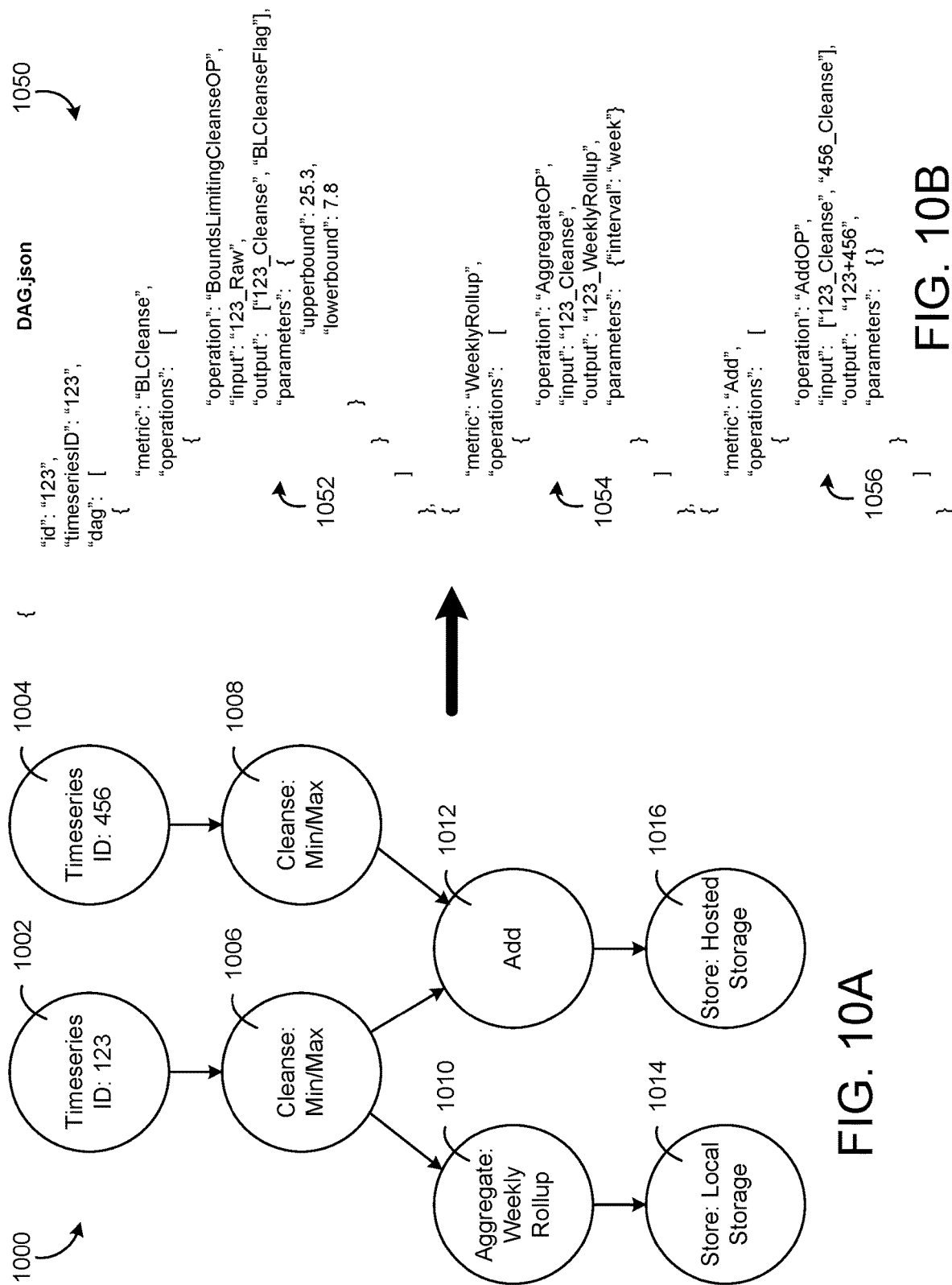
FIG. 10A is a directed acyclic graph (DAG) which can be generated by the DAG generator of FIG. 6, according to some embodiments.
FIG. 10B is a code snippet which can be automatically generated by the DAG generator of FIG. 6 based on the DAG, according to some embodiments.

Referring now to FIG. 10A, an example of a DAG 1000 which can be created by DAG generator 620 is shown, according to an exemplary embodiment. DAG 1000 is shown as a structured tree representing a graph of the dataflow rather than a formal scripting language. Blocks 1002 and 1004 represent the input timeseries which can be specified by timeseries ID (e.g., ID 123, ID 456, etc.). Blocks 1006 and 1008 are functional blocks representing data cleansing operations. Similarly, block 1010 is a functional block representing a weekly rollup aggregation and block 1012 is a functional block representing an addition operation. Blocks 1014 and 1016 represent storage operations indicating where the output of DAG 1000 should be stored (e.g., local storage, hosted storage, etc.).

In DAG 1000, the arrows connecting blocks 1002-1016 represent the flow of data and indicate the sequence in which the operations defined by the functional blocks should be performed. For example, the cleansing operation represented by block 1006 will be the first operation performed on the timeseries represented by block 1002. The output of the cleansing operation in block 1006 will then be provided as an input to both the aggregation operation represented by block 1010 and the addition operation represented by block 1012. Similarly, the cleansing operation represented by block 1008 will be the first operation performed on the timeseries represented by block 1004. The output of the cleansing operation in block 1008 will then be provided as an input to the addition operation represented by block 1012.

In some embodiments, DAG 1000 can reference other DAGs as inputs. Timeseries processing engine 604 can stitch the DAGs together into larger groups. DAG 1000 can support both scalar operators (e.g., run this function on this sample at this timestamp) and aggregate window operators (e.g., apply this function over all the values in the timeseries from this time window). The time windows can be arbitrary and are not limited to fixed aggregation windows. Logical operators can be used to express rules and implement fault detection algorithms. In some embodiments, DAG 1000 supports user-defined functions and user-defined aggregates.

In some embodiments, DAG 1000 is created based on user input. A user can drag-and-drop various input blocks 1002-1004, functional blocks 1006-1012, and output blocks 1014-1016 into DAG 1000 and connect them with arrows to define a sequence of operations. The user can edit the operations to define various parameters of the operations. For example, the user can define parameters such as upper and lower bounds for the data cleansing operations in blocks 1006-1008 and an aggregation interval for the aggregation operation in block 1010. DAG 1000 can be created and edited in a graphical drag-and-drop flow editor without requiring the user to write or edit any formal code. In some embodiments, DAG generator 620 is configured to automatically generate the formal code used by timeseries operators 606 based on DAG 1000.

Referring now to FIG. 10B, an example of code 1050 which can be generated by DAG generator 620 is shown, according to an exemplary embodiment. Code 1050 is shown as a collection of JSON objects 1052-1056 that represent the various operations defined by DAG 1000. Each JSON object corresponds to one of the functional blocks in DAG 1000 and specifies the inputs/sources, the computation, and the outputs of each block. For example, object 1052 corresponds to the cleansing operation represented by block 1006 and defines the input timeseries (i.e., "123_Raw"), the particular cleansing operation to be performed (i.e., "BoundsLimitingCleanseOP"), the parameters of the cleansing operation (i.e., "upperbound" and "lowerbound") and the outputs of the cleansing operation (i.e., "123_Cleanse" and "BLCleanseFlag").

Similarly, object 1054 corresponds to the aggregation operation represented by block 1010 and defines the input timeseries (i.e., "123_Cleanse"), the aggregation operation to be performed (i.e., "AggregateOP"), the parameter of the aggregation operation (i.e., "interval": "week") and the output of the aggregation operation (i.e., "123_WeeklyRollup"). Object 1056 corresponds to the addition operation represented by block 1012 and defines the input timeseries (i.e., "123_Cleanse" and "456_Cleanse"), the addition operation to be performed (i.e., "AddOP"), and the output of the addition operation (i.e., "123+456"). Although not specifically shown in FIG. 10B, code 1050 may include an object for each functional block in DAG 1000.

Advantageously, the declarative views defined by the DAGs provide a comprehensive view of the operations applied to various input timeseries. This provides flexibility to run the workflow defined by a DAG at query time (e.g., when a request for derived timeseries data is received) or prior to query time (e.g., when new raw data samples are received, in response to a defined event or trigger, etc.). This flexibility allows timeseries processing engine 604 to perform some or all of their operations ahead of time and/or in response to a request for specific derived data timeseries.

Referring again to FIG. 6, timeseries processing engine 604 is shown to include a DAG optimizer 618. DAG optimizer 618 can be configured to combine multiple DAGs or multiple steps of a DAG to improve the efficiency of the operations performed by timeseries operators 606. For example, suppose that a DAG has one functional block which adds "Timeseries A" and "Timeseries B" to create "Timeseries C" (i.e., A+B=C) and another functional block which adds "Timeseries C" and "Timeseries D" to create "Timeseries E" (i.e., C+D=E). DAG optimizer 618 can combine these two functional blocks into a single functional block which computes "Timeseries E" directly from "Timeseries A," "Timeseries B," and "Timeseries D" (i.e., E=A+B+D). Alternatively, both "Timeseries C" and "Timeseries E" can be computed in the same functional block to reduce the number of independent operations required to process the DAG.

In some embodiments, DAG optimizer 618 combines DAGs or steps of a DAG in response to a determination that multiple DAGs or steps of a DAG will use similar or shared inputs (e.g., one or more of the same input timeseries). This allows the inputs to be retrieved and loaded once rather than performing two separate operations that both load the same inputs. In some embodiments, DAG optimizer 618 schedules timeseries operators 606 to nodes where data is resident in memory in order to further reduce the amount of data required to be loaded from timeseries databases 628 and 636.

Entity Graph

Figure 11A:
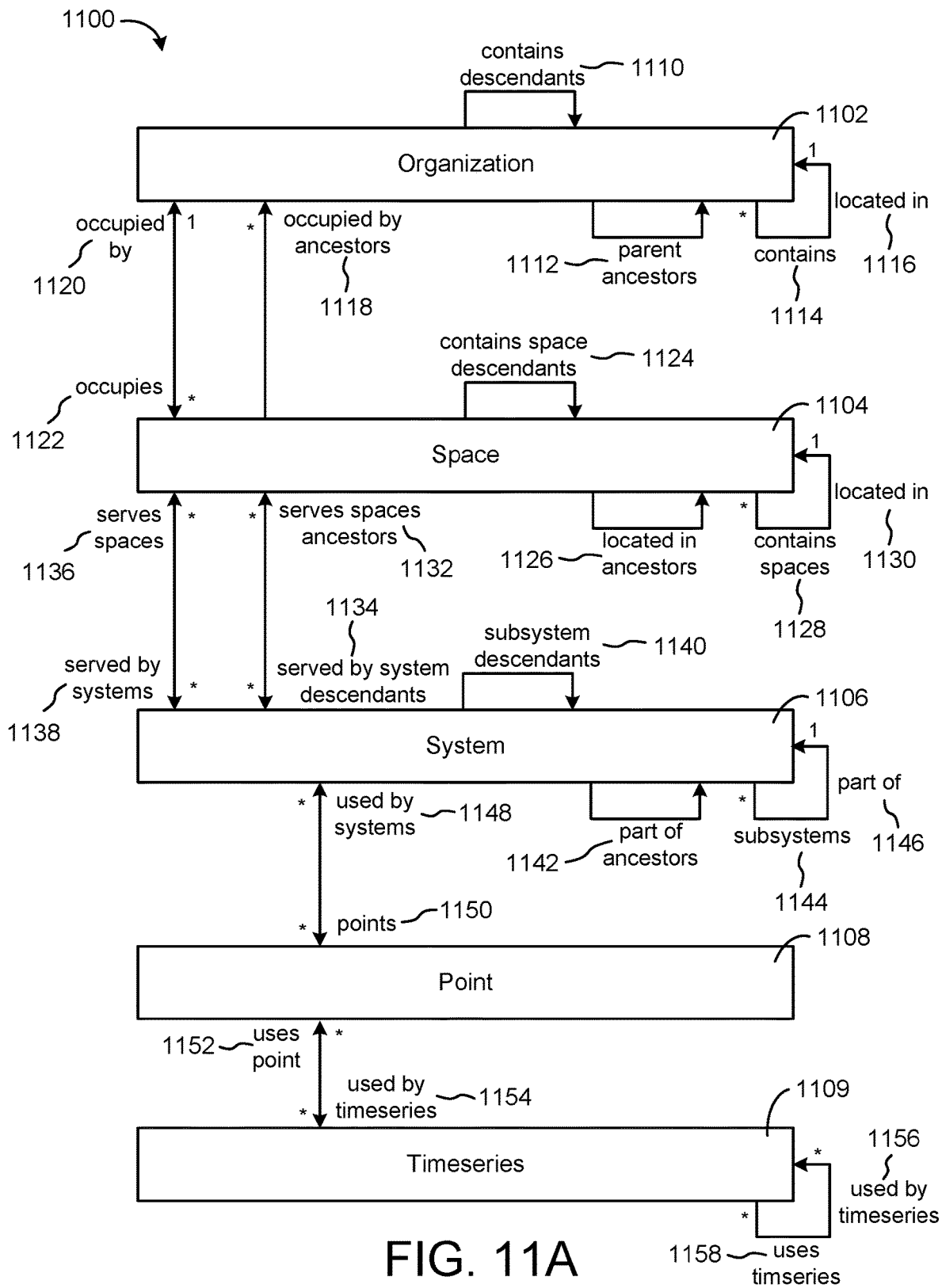
FIG. 11A is an entity graph illustrating relationships between an organization, a space, a system, a point, and a timeseries, which can be used by the data collector of FIG. 5, according to some embodiments.

Referring now to FIG. 11A, an entity graph 1100 is shown, according to some embodiments. In some embodiments, entity graph 1100 is generated or used by data collector 512, as described with reference to FIG. 5. Entity graph 1100 describes how a building is organized and how the different systems and spaces within the building relate to each other. For example, entity graph 1100 is shown to include an organization 1102, a space 1104, a system 1106, a point 1108, and a timeseries 1109. The arrows interconnecting organization 1102, space 1104, system 1106, point 1108, and timeseries 1109 identify the relationships between such entities. In some embodiments, the relationships are stored as attributes of the entity described by the attribute.

Organization 1102 is shown to include a contains descendants attribute 1110, a parent ancestors attribute 1112, a contains attribute 1114, a located in attribute 1116, an occupied by ancestors attribute 1118, and an occupies by attribute 1122. The contains descendants attribute 1110 identifies any descendant entities contained within organization 1102. The parent ancestors attribute 1112 identifies any parent entities to organization 1102. The contains attribute 1114 identifies any other organizations contained within organization 1102. The asterisk alongside the contains attribute 1114 indicates that organization 1102 can contain any number of other organizations. The located in attribute 1116 identifies another organization within which organization 1102 is located. The number 1 alongside the located in attribute 1116 indicates that organization 1102 can be located in exactly one other organization. The occupies attribute 1122 identifies any spaces occupied by organization 1102. The asterisk alongside the occupies attribute 1122 indicates that organization 1102 can occupy any number of spaces.

Space 1104 is shown to include an occupied by attribute 1120, an occupied by ancestors attribute 1118, a contains space descendants attribute 1124, a located in ancestors attribute 1126, a contains spaces attribute 1128, a located in attribute 1130, a served by systems attribute 1138, and a served by system descendants attribute 1134. The occupied by attribute 1120 identifies an organization occupied by space 1104. The number 1 alongside the occupied by attribute 1120 indicates that space 1104 can be occupied by exactly one organization. The occupied by ancestors attribute 1118 identifies one or more ancestors to organization 1102 that are occupied by space 1104. The asterisk alongside the occupied by ancestors attribute 1118 indicates that space 1104 can be occupied by any number of ancestors.

The contains space descendants attribute 1124 identifies any descendants to space 1104 that are contained within space 1104. The located in ancestors attribute 1126 identifies any ancestors to space 1104 within which space 1104 is located. The contains spaces attribute 1128 identifies any other spaces contained within space 1104. The asterisk alongside the contains spaces attribute 1128 indicates that space 1104 can contain any number of other spaces. The located in attribute 1130 identifies another space within which space 1104 is located. The number 1 alongside the located in attribute 1130 indicates that space 1104 can be located in exactly one other space. The served by systems attribute 1138 identifies any systems that serve space 1104. The asterisk alongside the served by systems attribute 1138 indicates that space 1104 can be served by any number of systems. The served by system descendants attribute 1134 identifies any descendent systems that serve space 1104. The asterisk alongside the served by descendant systems attribute 1134 indicates that space 1104 can be served by any number of descendant systems.

System 1106 is shown to include a serves spaces attribute 1136, a serves space ancestors attribute 1132, a subsystem descendants attribute 1140, a part of ancestors attribute 1142, a subsystems attribute 1144, a part of attribute 1146, and a points attribute 1150. The serves spaces attribute 1136 identifies any spaces that are served by system 1106. The asterisk alongside the serves spaces attribute 1136 indicates that system 1106 can serve any number of spaces. The serves space ancestors attribute 1132 identifies any ancestors to space 1104 that are served by system 1106. The asterisk alongside the serves ancestor spaces attribute 1132 indicates that system 1106 can serve any number of ancestor spaces.

The subsystem descendants attribute 1140 identifies any subsystem descendants of other systems contained within system 1106. The part of ancestors attribute 1142 identifies any ancestors to system 1106 that system 1106 is part of. The subsystems attribute 1144 identifies any subsystems contained within system 1106. The asterisk alongside the subsystems attribute 1144 indicates that system 1106 can contain any number of subsystems. The part of attribute 1146 identifies any other systems that system 1106 is part of. The number 1 alongside the part of attribute 1146 indicates that system 1106 can be part of exactly one other system. The points attribute 1150 identifies any data points that are associated with system 1106. The asterisk alongside the points attribute 1150 indicates that any number of data points can be associated with system 1106.

Point 1108 is shown to include a used by system attribute 1148. The asterisk alongside the used by system attribute 1148 indicates that point 1108 can be used by any number of systems. Point 1108 is also shown to include a used by timeseries attribute 1154. The asterisk alongside the used by timeseries attribute 1154 indicates that point 1108 can be used by any number of timeseries (e.g., raw data timeseries virtual point timeseries, data rollup timeseries, etc.). For example, multiple virtual point timeseries can be based on the same actual data point 1108. In some embodiments, the used by timeseries attribute 1154 is treated as a list of timeseries that subscribe to changes in value of data point 1108. When the value of point 1108 changes, the timeseries listed in the used by timeseries attribute 1154 can be identified and automatically updated to reflect the changed value of point 1108.

Timeseries 1109 is shown to include a uses point attribute 1152. The asterisk alongside the uses point attribute 1152 indicates that timeseries 1109 can use any number of actual data points. For example, a virtual point timeseries can be based on multiple actual data points. In some embodiments, the uses point attribute 1152 is treated as a list of points to monitor for changes in value. When any of the points identified by the uses point attribute 1152 are updated, timeseries 1109 can be automatically updated to reflect the changed value of the points used by timeseries 1109.

Timeseries 1109 is also shown to include a used by timeseries attribute 1156 and a uses timeseries attribute 1158. The asterisks alongside the used by timeseries attribute 1156 and the uses timeseries attribute 1158 indicate that timeseries 1109 can be used by any number of other timeseries and can use any number of other timeseries. For example, both a data rollup timeseries and a virtual point timeseries can be based on the same raw data timeseries. As another example, a single virtual point timeseries can be based on multiple other timeseries (e.g., multiple raw data timeseries). In some embodiments, the used by timeseries attribute 1156 is treated as a list of timeseries that subscribe to updates in timeseries 1109. When timeseries 1109 is updated, the timeseries listed in the used by timeseries attribute 1156 can be identified and automatically updated to reflect the change to timeseries 1109. Similarly, the uses timeseries attribute 1158 can be treated as a list of timeseries to monitor for updates. When any of the timeseries identified by the uses timeseries attribute 1158 are updated, timeseries 1109 can be automatically updated to reflect the updates to the other timeseries upon which timeseries 1109 is based.

Figure 11B:
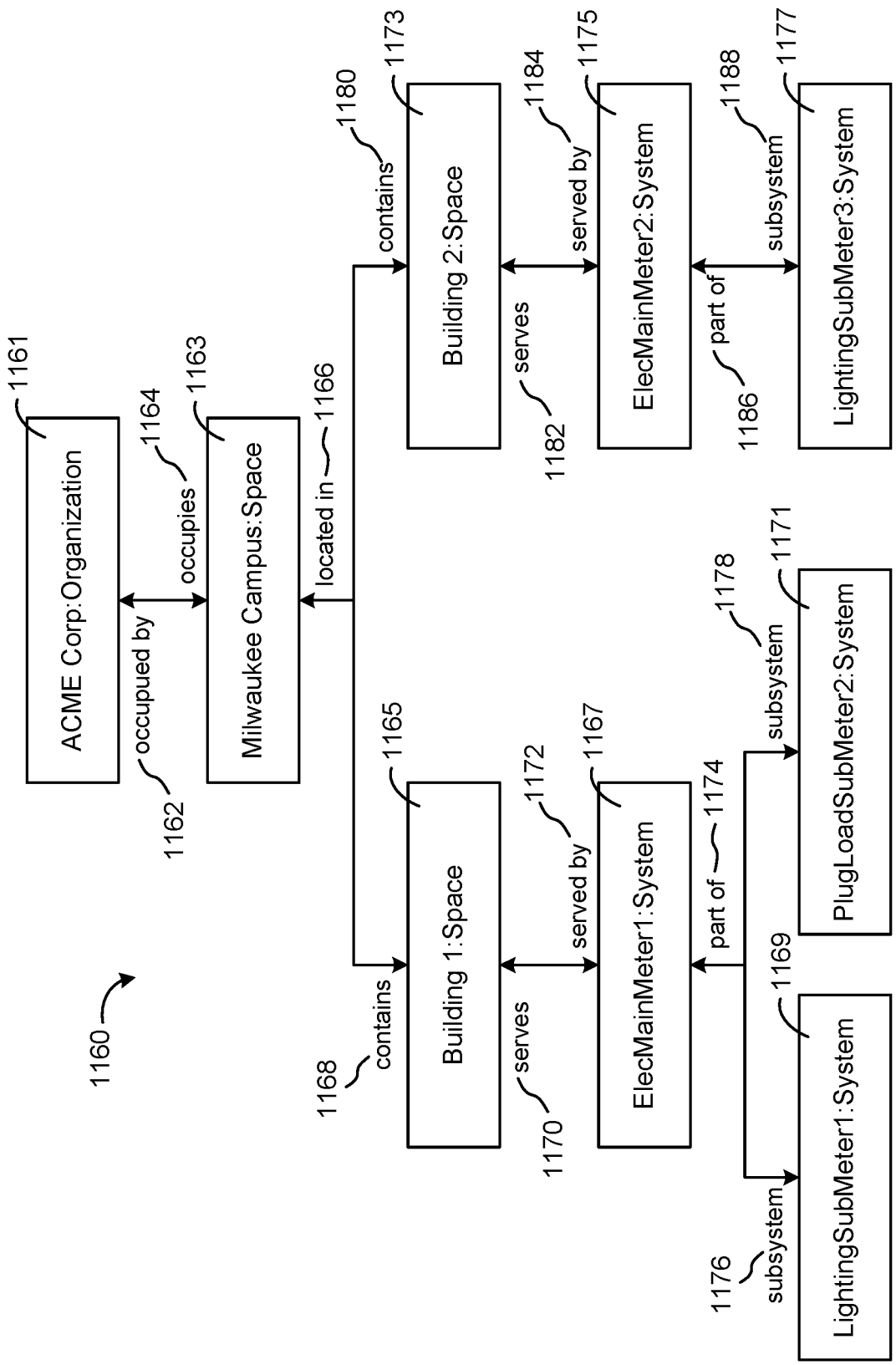
FIG. 11B is an example of an entity graph for a particular building management system according to some embodiments.

Referring now to FIG. 11B, an example of an entity graph 1160 for a particular building management system is shown, according to some embodiments. Entity graph 1160 is shown to include an organization 1161 ("ACME Corp"). Organization 1161 be a collection of people, a legal entity, a business, an agency, or other type of organization. Organization 1161 occupies space 1163 ("Milwaukee Campus"), as indicated by the occupies attribute 1164. Space 1163 is occupied by organization 1161, as indicated by the occupied by attribute 1162.

In some embodiments, space 1163 is a top level space in a hierarchy of spaces. For example, space 1163 can represent an entire campus (i.e., a collection of buildings). Space 1163 can contain various subspaces (e.g., individual buildings) such as space 1165 ("Building 1") and space 1173 ("Building 2"), as indicated by the contains attributes 1168 and 1180. Spaces 1165 and 1180 are located in space 1163, as indicated by the located in attribute 1166. Each of spaces 1165 and 1173 can contain lower level subspaces such as individual floors, zones, or rooms within each building. However, such subspaces are omitted from entity graph 1160 for simplicity.

Space 1165 is served by system 1167 ("ElecMainMeter1") as indicated by the served by attribute 1172. System 1167 can be any system that serves space 1165 (e.g., a HVAC system, a lighting system, an electrical system, a security system, etc.). The serves attribute 1170 indicates that system 1167 serves space 1165. In entity graph 1160, system 1167 is shown as an electrical system having a subsystem 1169 ("LightingSubMeter1") and a subsystem 1171 ("PlugLoadSubMeter2") as indicated by the subsystem attributes 1176 and 1178. Subsystems 1169 and 1171 are part of system 1167, as indicated by the part of attribute 1174.

Space 1173 is served by system 1175 ("ElecMainMeter2") as indicated by the served by attribute 1184. System 1175 can be any system that serves space 1173 (e.g., a HVAC system, a lighting system, an electrical system, a security system, etc.). The serves attribute 1182 indicates that system 1175 serves space 1173. In entity graph 1160, system 1175 is shown as an electrical system having a subsystem 1177 ("LightingSubMeter3") as indicated by the subsystem attribute 1188. Subsystem 1177 is part of system 1175, as indicated by the part of attribute 1186.

In addition to the attributes shown in FIG. 11B, entity graph 1160 can include "ancestors" and "descendants" attributes on each entity in the hierarchy. The ancestors attribute can identify (e.g., in a flat list) all of the entities that are ancestors to a given entity. For example, the ancestors attribute for space 1165 may identify both space 1163 and organization 1161 as ancestors. Similarly, the descendants attribute can identify all (e.g., in a flat list) of the entities that are descendants of a given entity. For example, the descendants attribute for space 1165 may identify system 1167, subsystem 1169, and subsystem 1171 as descendants. This provides each entity with a complete listing of its ancestors and descendants, regardless of how many levels are included in the hierarchical tree. This is a form of transitive closure.

In some embodiments, the transitive closure provided by the descendants and ancestors attributes allows entity graph 1160 to facilitate simple queries without having to search multiple levels of the hierarchical tree. For example, the following query can be used to find all meters under the Milwaukee Campus space 1163:

/Systems?$filter=(systemType eq Jci.Be.Data.SystemType'Meter') and ancestorSpaces/any(a:a/name eq 'Milwaukee Campus')

and can be answered using only the descendants attribute of the Milwaukee Campus space 1163. For example, the descendants attribute of space 1163 can identify all meters that are hierarchically below space 1163. The descendants attribute can be organized as a flat list and stored as an attribute of space 1163. This allows the query to be served by searching only the descendants attribute of space 1163 without requiring other levels or entities of the hierarchy to be searched.

Figure 12:
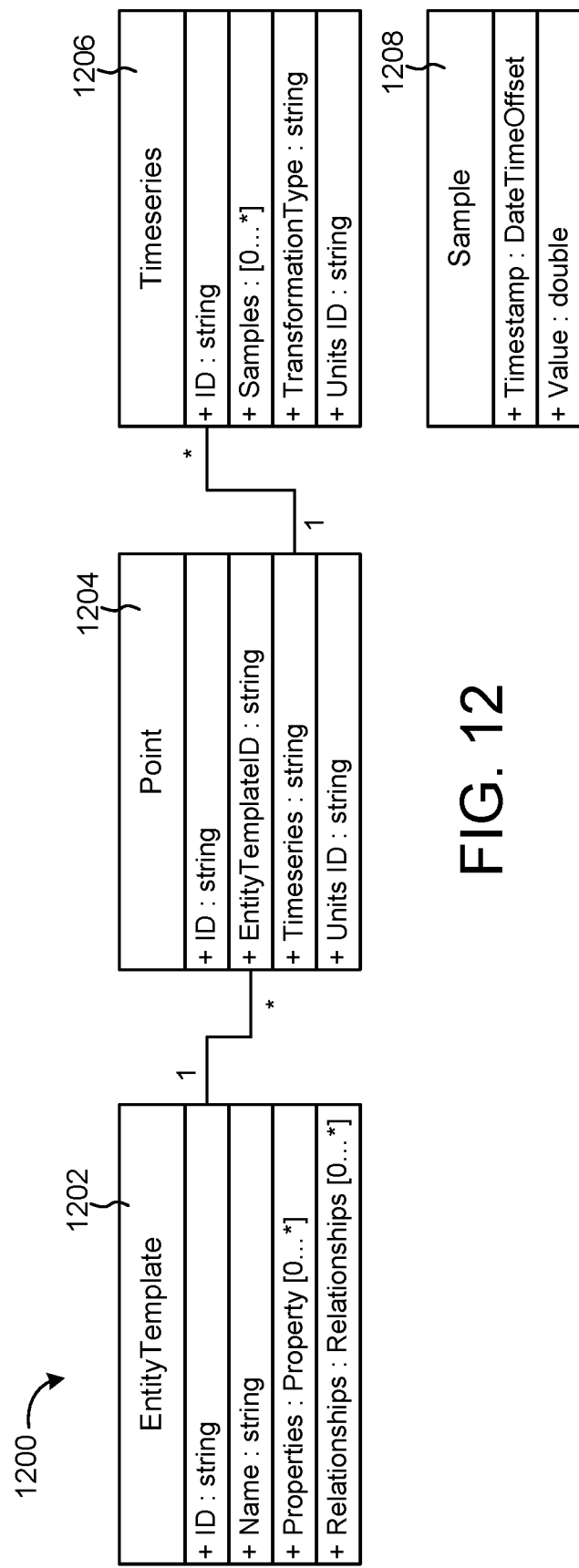
FIG. 12 is an object relationship diagram illustrating relationships between an entity template, a point, a timeseries, and a data sample, which can be used by the data collector of FIG. 5 and the timeseries service of FIG. 6, according to some embodiments.

Referring now to FIG. 12, an object relationship diagram 1200 is shown, according to some embodiments. Relationship diagram 1200 is shown to include an entity template 1202, a point 1204, a timeseries 1206, and a sample 1208. In some embodiments, entity template 1202, point 1204, timeseries 1206, and sample 1208 are stored as data objects within memory 510, local storage 514, and/or hosted storage 516. Relationship diagram 1200 illustrates the relationships between entity template 1202, point 1204, and timeseries 1206.

Entity template 1202 can include various attributes such as an ID attribute, a name attribute, a properties attribute, and a relationships attribute. The ID attribute can be provided as a text string and identifies a unique ID for entity template 1202. The name attribute can also be provided as a text string and identifies the name of entity template 1202. The properties attribute can be provided as a vector and identifies one or more properties of entity template 1202. The relationships attribute can also be provided as a vector and identifies one or more relationships of entity template 1202.

Point 1204 can include various attributes such as an ID attribute, an entity template ID attribute, a timeseries attribute, and a units ID attribute. The ID attribute can be provided as a text string and identifies a unique ID for point 1204. The entity template ID attribute can also be provided as a text string and identifies the entity template 1202 associated with point 1204 (e.g., by listing the ID attribute of entity template 1202). Any number of points 1204 can be associated with entity template 1202. However, in some embodiments, each point 1204 is associated with a single entity template 1202. The timeseries attribute can be provided as a text string and identifies any timeseries associated with point 1204 (e.g., by listing the ID string of any timeseries 1206 associated with point 1204). The units ID attribute can also be provided as a text string and identifies the units of the variable quantified by point 1204.

Timeseries 1206 can include various attributes such as an ID attribute, a samples attribute, a transformation type attribute, and a units ID attribute. The ID attribute can be provided as a text string and identifies a unique ID for timeseries 1206. The unique ID of timeseries 1206 can be listed in the timeseries attribute of point 1204 to associate timeseries 1206 with point 1204. Any number of timeseries 1206 can be associated with point 1204. Each timeseries 1206 is associated with a single point 1204. The samples attribute can be provided as a vector and identifies one or more samples associated with timeseries 1206. The transformation type attribute identifies the type of transformation used to generate timeseries 1206 (e.g., average hourly, average daily, average monthly, etc.). The units ID attribute can also be provided as a text string and identifies the units of the variable quantified by timeseries 1206.

Sample 1208 can include a timestamp attribute and a value attribute. The timestamp attribute can be provided in local time and can include an offset relative to universal time. The value attribute can include a data value of sample 1208. In some instances, the value attribute is a numerical value (e.g., for measured variables). In other instances, the value attribute can be a text string such as "Fault" if sample 1208 is part of a fault detection timeseries.

Timeseries Processing Workflow

Figure 13A:
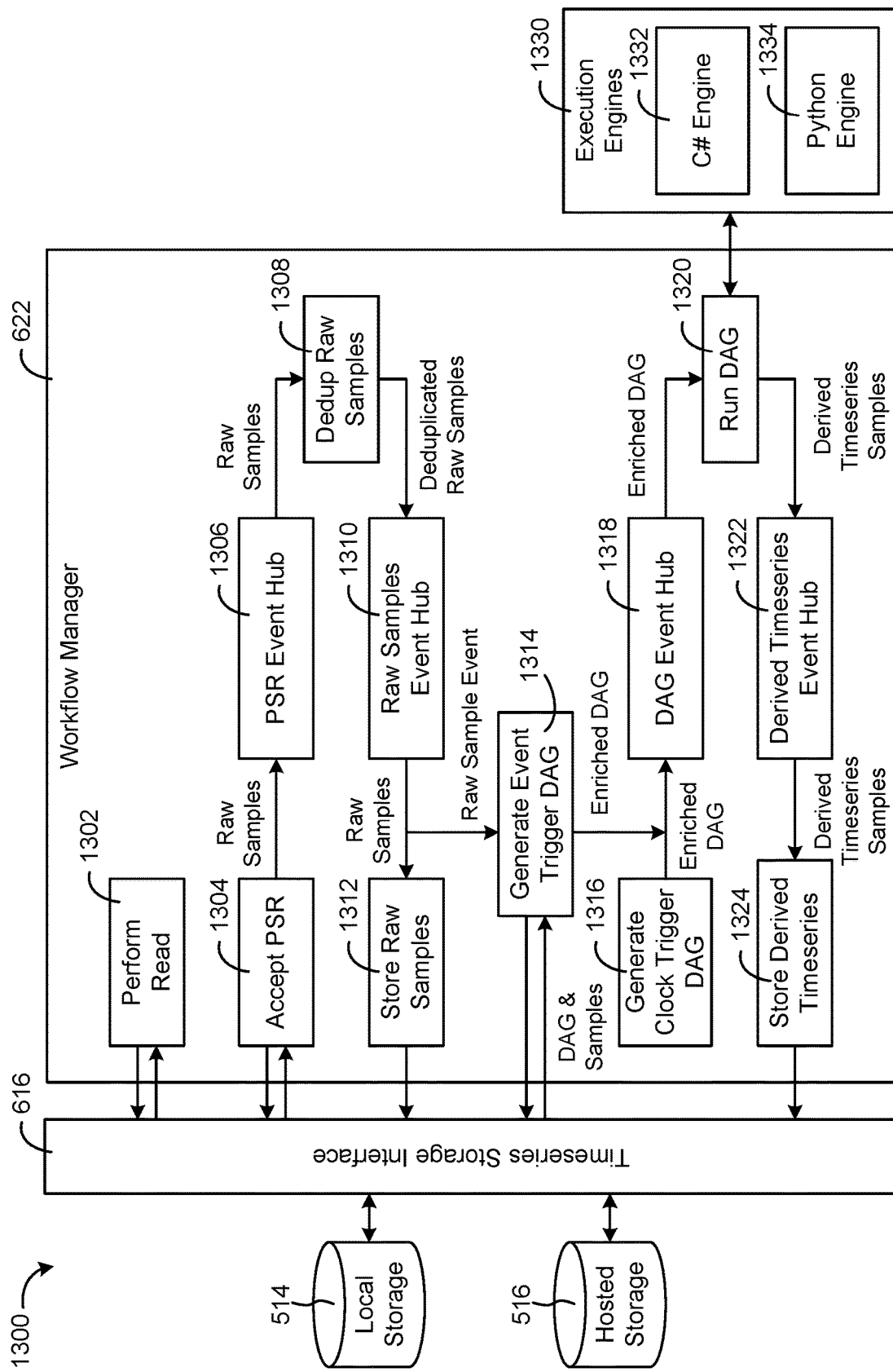
FIG. 13A is a block diagram illustrating a timeseries processing workflow which can be performed by the timeseries service of FIGS. 5-6, according to some embodiments.

Referring now to FIG. 13A, a block diagram illustrating a timeseries processing workflow 1300 is shown, according to an exemplary embodiment. Workflow 1300 may be performed by workflow manager 622 in combination with other components of timeseries service 528. Workflow 1300 is shown to include performing a read of the timeseries data (step 1302). Step 1302 may include reading raw data samples and/or the derived data samples provided by timeseries storage interface 616. The timeseries data may be stored in local storage 514 or hosted storage 516. In some embodiments, local storage 514 includes on-site data storage (e.g., Redis, PostgreSQL, etc.). Hosted storage 516 may include cloud data storage (e.g., Azure Redis, DocDB, HBase, etc.).

Timeseries storage interface 616 can be configured to read and write a timeseries collection, a samples collection, and a post sample request (PSR) collection. Each of these collections can be stored in local storage 514 and/or hosted storage 516. The timeseries collection may contain all the timeseries registered in workflow manager 622. The timeseries collection may also contain the DAG for each timeseries. The timeseries collection can be used by workflow manager 622 to accept only PSRs related to valid timeseries registered in workflow manager 622. The timeseries collection can also be used in steps 1314-1316 to lookup the DAG for a specific timeseries ID.

In some embodiments, the entire timeseries collection is loaded into local memory. The timeseries collection can be a regular collection or a partitioned collection (e.g., one partition for approximately every 100 timeseries). In some embodiments, the timeseries collection contains about 200,000 to 250,000 timeseries. The ID for each document in the timeseries collection may be the timeseries ID. The DAG for each timeseries may contain a set of operations and/or transformations that need to be performed to generate the derived timeseries data based on the timeseries. On registration of a new timeseries, the DAG for the timeseries can be selected from DAG templates. The DAG template may include a set of standard operations applicable to the timeseries. On definition of a new metric for a timeseries, the new metric and the list of operations to generate that metric can be added to the DAG.

The samples collection may contain all of the timeseries samples (e.g., raw samples, derived timeseries samples). The samples collection can be used for all GET requests for a specific timeseries ID. A portion of the samples collection can be stored in local memory (e.g., past 48 hours) whereas the remainder of the samples collection can be stored in local storage 514 or hosted storage 516. The samples collection may act as a partitioned collection instead of a regular collection to improve efficiency and performance. In some embodiments, the samples collection is stored in a JSON format and partitioned on timeseries ID. The ID field may be unique for each partition and may have the form "Metric: Timestamp."

The PSR collection may contain all of the PSRs and can be used to provide status updates to the user for a PSR related to a specific timeseries ID. A portion of the PSR collection can be stored in local memory (e.g., past 48 hours) whereas the remainder of the PSR collection can be stored in local storage 514 or hosted storage 516. The PSR collection can be partitioned on timeseries ID. In some embodiments, the ID for each document in the PSR collection has the form "TimeseriesID: Timestamp."

Still referring to FIG. 13A, workflow 1300 is shown to include accepting a PSR (step 1304). Step 1304 may be performed by executing a PSR process. In some embodiments, the PSR process receives a PSR and determines whether the PSR contains more than one timeseries ID. In response to a determination that the PSR contains more than one timeseries ID, the PSR process may break the PSR into multiple PSRs, each of which is limited to a single timeseries ID. The PSRs can be provided to PSR event hub 1306. PSR event hub 1306 can be configured to store PSR events. Each PSR event may include a PSR for one timeseries ID. In some embodiments, each PSR event is stored in the form "TimeseriesID: Timestamp."

Workflow 1300 is shown to include deduplicating raw samples (step 1308). Step 1308 may be performed by executing a deduplication process. In some embodiments, the deduplication process includes accepting PSR events from PSR event hub 1306 and splitting each PSR into a list of samples. Step 1308 may include tagging each sample as a new sample, an updated sample, or a duplicate sample. New samples and updated samples can be sent to raw samples event hub 1310, whereas duplicate samples may be discarded. In some embodiments, step 1308 is deployed on Azure using Azure Worker Roles. Step 1308 can include checking for duplicate samples in local storage 514 and hosted storage 516 as well as the samples that are currently in raw samples event hub 1310.

In some embodiments, the deduplication process in step 1308 removes all duplicate data samples such that only a single unique copy of each data sample remains. Removing all duplicate samples may ensure that aggregate operations produce accurate aggregate values. In other embodiments, the deduplication process in step 1308 is configured to remove most, but not all, duplicate samples. For example, the deduplication process can be implemented using a Bloom filter, which allows for the possibility of false positives but not false negatives. In step 1308, a false positive can be defined as a non-duplicate new or updated sample. Accordingly, some duplicates may be flagged as non-duplicate, which introduces the possibility that some duplicate samples may not be properly identified and removed. The deduplicated raw samples can be sent to raw samples event hub 1310.

Workflow 1300 is shown to include storing the raw samples (step 1312). Step 1312 can include accepting the raw samples from raw samples event hub 1310 and pushing the raw samples to persistent storage. In some embodiments, step 1312 is deployed on Azure using Azure Worker Roles. The worker role may generate requests at a rate based on X % of the capacity of the storage. For example, if the capacity of the storage is 10,000 RU and X % is 20% (e.g., 20% of the storage throughput is reserved for raw sample writes), and each write takes 5 RU, step 1312 may generate a total of 400 writes per second $$\left(\text{i.e.,} \frac{10{,}000 * 20\%}{5} = 400\right).$$

Workflow 1300 is shown to include generating an event trigger DAG (step 1314). Step 1314 can be performed by executing an event trigger DAG process. Step 1314 may include accepting events (samples) from raw samples event hub 1310. For each sample event, step 1314 may include identifying the timeseries ID of the sample and accessing the timeseries collection to obtain the DAG for the corresponding timeseries. Step 1314 may include identifying each derived data timeseries generated by the DAG and each operation included in the DAG. In some embodiments, step 1314 tags each operation to indicate whether the operation should be sent to the C# engine 1332 or the Python engine 1334 for execution. Step 1314 may include identifying and fetching any additional data (e.g., samples, timeseries, parameters, etc.) which may be necessary to perform the operations defined by the DAG. Step 1314 may generate an enriched DAG which includes the original DAG along with all the data necessary to perform the operations defined by the DAG. The enriched DAG can be sent to the DAG event hub 1318.

In some embodiments, workflow 1300 includes generating a clock trigger DAG (step 1316). Step 1316 can be performed by executing a clock trigger DAG process. Step 1316 may be similar to step 1314. However, step 1316 may be performed in response to a clock trigger rather than in response to receiving a raw sample event. The clock trigger can periodically trigger step 1316 to perform batch queries (e.g., every hour). Step 1316 may include identifying a timeseries ID specified in the clock trigger and accessing the timeseries collection to obtain the DAG for the corresponding timeseries. Step 1316 may include identifying each derived data timeseries generated by the DAG and each operation included in the DAG. In some embodiments, step 1316 tags each operation to indicate whether the operation should be sent to the C# engine 1332 or the Python engine 1334 for execution. Step 1316 may include identifying and fetching any additional data (e.g., samples, timeseries, parameters, etc.) which may be necessary to perform the operations defined by the DAG. Step 1316 may generate an enriched DAG which includes the original DAG along with all the data necessary to perform the operations defined by the DAG. The enriched DAG can be sent to the DAG event hub 1318.

DAG event hub 1318 can be configured to store enriched DAG events. Each enriched DAG event can include an enriched DAG. The enriched DAG may include a DAG for a particular timeseries along with all the data necessary to perform the operations defined by the DAG. DAG event hub 1318 can provide the enriched DAG events to step 1320.

Still referring to FIG. 13A, workflow 1300 is shown to include running the DAG (step 1320). Step 1320 can include accepting enriched DAG events from DAG event hub 1318 and running through the sequence of operations defined by the DAG. Workflow manager 622 can submit each operation in series to execution engines 1330 and wait for results before submitting the next operation. Execution engines 1330 may include a C# engine 1332, a Python engine 1334, or any other engine configured to perform the operations defined by the DAG. In some embodiments, execution engines 1330 include timeseries operators 606. When a given operation is complete, execution engines 1330 can provide the results of the operation to workflow manager 622. Workflow manager 622 can use the results of one or more operations as inputs for the next operation, along with any other inputs that are required to perform the operation. In some embodiments, the results of the operations are the derived timeseries samples. The derived timeseries samples can be provided to derived timeseries event hub 1322.

Derived timeseries event hub 1322 can be configured to store derived timeseries events. Each derived timeseries event may include a sample of an derived timeseries. The derived timeseries may include the results of the operations performed by execution engines 1330. Derived timeseries event hub 1322 can provide the derived timeseries samples to step 1324.

Workflow 1300 is shown to include storing the derived timeseries samples (step 1324). Step 1324 can include accepting derived timeseries samples from derived timeseries event hub 1322 and storing the derived timeseries samples in persistent storage (e.g., local storage 514, hosted storage 516). In some embodiments, step 1324 is deployed on Azure using Azure Worker Roles. The worker role may generate requests at a rate based on Y % of the capacity of the storage. For example, if the capacity of the storage is 10,000 RU and Y % is 50% (e.g., 50% of the storage throughput is reserved for raw sample writes), and each write takes 5 RU, step 1324 may generate a total of 1,000 writes per second $$\left(\text{i.e.,} \frac{10{,}000 * 50\%}{5} = 1{,}000\right).$$

Figure 13B:
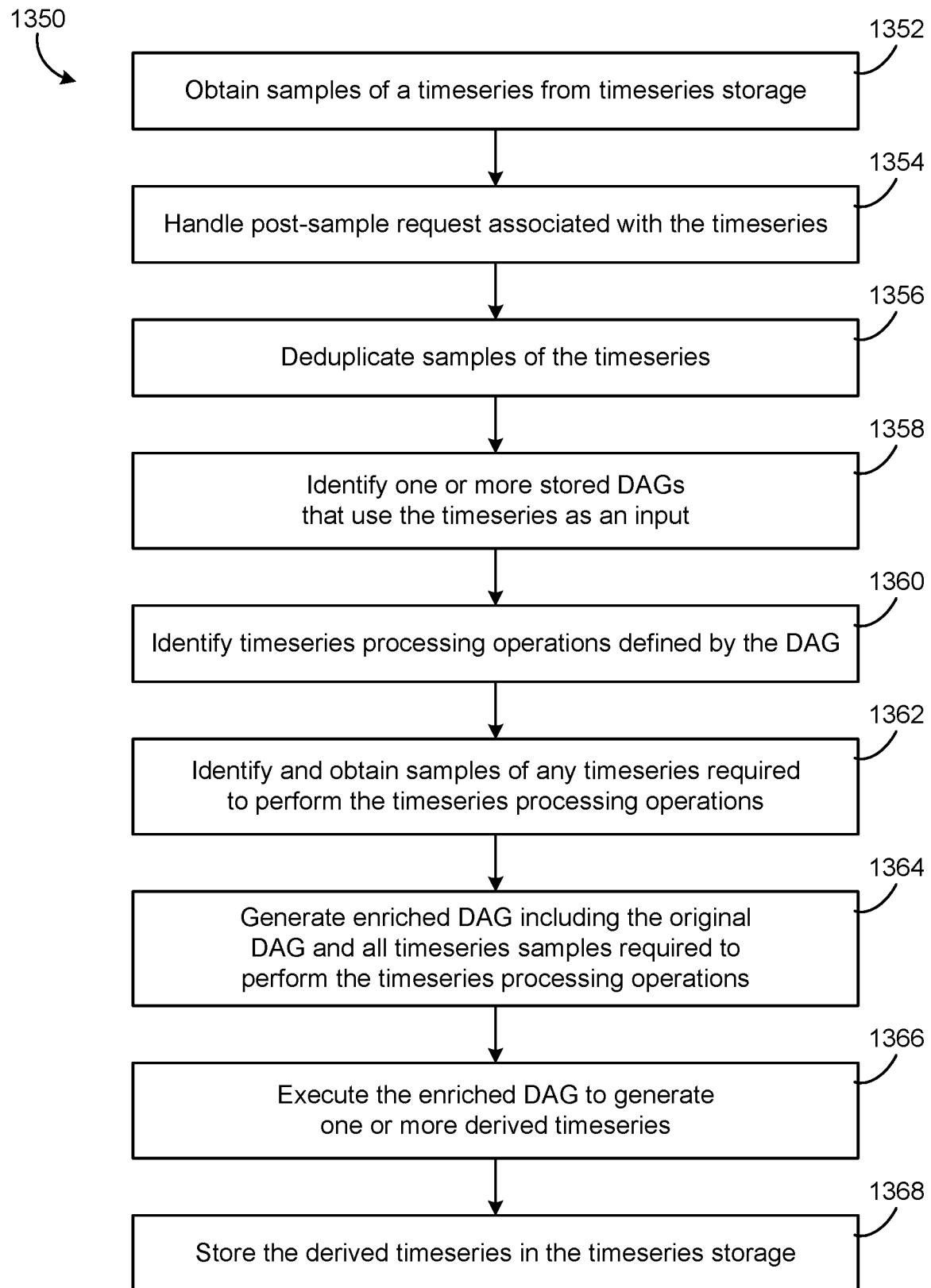
FIG. 13B is a flowchart of a process which can be performed by the workflow manager of FIG. 13A, according to some embodiments.

Referring now to FIG. 13B, a flowchart of a process 1350 for obtaining and processing timeseries data is shown, according to an exemplary embodiment. Process 1350 can be performed by workflow manager 622 in combination with other components of timeseries service 528. Process 1350 is shown to include obtaining samples of a timeseries from timeseries storage (step 1352). Step 1352 may include obtaining raw data samples and/or derived data samples via timeseries storage interface 616. The samples of the timeseries may be obtained from local storage 514, hosted storage 516, or received in real-time from a sensor or other device that generates the samples. Step 1352 can include loading the entire timeseries or a subset of the samples of the timeseries into local memory. For example, some of the samples of the timeseries may be stored in local memory (e.g., past 48 hours) whereas the remainder of the samples of the timeseries can be stored in local storage 514 or hosted storage 516.

Process 1350 is shown to include handling a post-sample request (PSR) associated with the timeseries (step 1354). The PSR may be obtained from a PSR collection via timeseries storage interface 616. The PSR can be used to provide status updates to the user for a specific timeseries ID. In some embodiments, step 1354 includes receiving a PSR and determining whether the PSR contains more than one timeseries ID. In response to a determination that the PSR contains more than one timeseries ID, step 1354 may include breaking the PSR into multiple PSRs, each of which is limited to a single timeseries ID. The PSRs can be provided to PSR event hub 1306 and stored as PSR events. Each PSR event may include a PSR for one timeseries ID. In some embodiments, each PSR event is stored in the form "TimeseriesID: Timestamp."

Process 1350 is shown to include deduplicating samples of the timeseries (step 1356). Step 1356 may be performed by executing a deduplication process. In some embodiments, the deduplication process includes accepting PSR events from PSR event hub 1306 and splitting each PSR into a list of samples. Step 1356 may include tagging each sample as a new sample, an updated sample, or a duplicate sample. New samples and updated samples can be sent to raw samples event hub 1310, whereas duplicate samples may be discarded. In some embodiments, step 1356 is deployed on Azure using Azure Worker Roles. Step 1356 can include checking for duplicate samples in local storage 514 and hosted storage 516 as well as the samples that are currently in raw samples event hub 1310.

In some embodiments, the deduplication process in step 1356 removes all duplicate data samples such that only a single unique copy of each data sample remains. Removing all duplicate samples may ensure that aggregate operations produce accurate aggregate values. In other embodiments, the deduplication process in step 1356 is configured to remove most, but not all, duplicate samples. For example, the deduplication process can be implemented using a Bloom filter, which allows for the possibility of false positives but not false negatives. In step 1356, a false positive can be defined as a non-duplicate new or updated sample. Accordingly, some duplicates may be flagged as non-duplicate, which introduces the possibility that some duplicate samples may not be properly identified and removed. The deduplicated samples can be sent to raw samples event hub 1310.

Still referring to FIG. 13B, process 1350 is shown to include identifying one or more stored DAGs that use the timeseries as an input (step 1358). Step 1358 can include obtaining the stored DAGs via timeseries via timeseries storage interface 616 and identifying the required timeseries inputs of each DAG. For each DAG that uses the timeseries as an input, process 1350 can identify the timeseries processing operations defined by the DAG (step 1360). The timeseries processing operations can include data cleansing operations, data aggregation operations, timeseries adding operations, virtual point calculation operations, or any other type of operation that can be applied to one or more input timeseries.

Process 1350 is shown to include identifying and obtaining samples of any timeseries required to perform the timeseries processing operations (step 1362). The timeseries can be identified by inspecting the inputs required by each of the timeseries processing operations identified in step 1360. For example, DAG 1000 in FIG. 10A is shown to include both "Timeseries ID: 123" and "Timeseries ID: 456" as required inputs. Assuming that samples of the timeseries ID 123 are obtained in step 1352, DAG 1000 can be identified in step 1358 as a DAG that uses the timeseries ID 123 as an input. The timeseries identified in step 1362 can include timeseries ID 123, timeseries ID 456, or any other timeseries used as an input to DAG 1000. Step 1362 may include identifying and fetching any additional data (e.g., samples, timeseries, parameters, etc.) which may be necessary to perform the operations defined by the DAG.

In some embodiments, the samples obtained in step 1362 are based on the timeseries processing operations defined by the DAG, as well as the timestamps of the original samples obtained in step 1352. For example, the DAG may include a data aggregation operation that aggregates a plurality of data samples having timestamps within a given time window. The start time and end time of the time window may be defined by the DAG and the timeseries to which the DAG is applied. The DAG may define the duration of the time window over which the data aggregation operation will be performed. For example, the DAG may define the aggregation operation as an hourly aggregation (i.e., to produce an hourly data rollup timeseries), a daily aggregation (i.e., to produce a daily data rollup timeseries), a weekly aggregation (i.e., to produce a weekly data rollup timeseries), or any other aggregation duration. The position of the time window (e.g., a specific day, a specific week, etc.) over which the aggregation is performed may be defined by the timestamps of the samples obtained in step 1352.

Step 1362 can include using the DAG to identify the duration of the time window (e.g., an hour, a day, a week, etc.) over which the data aggregation operation will be performed. Step 1362 can include using the timestamps of the data samples obtained in step 1352 identify the location of the time window (i.e., the start time and the end time). Step 1362 can include setting the start time and end time of the time window such that the time window has the identified duration and includes the timestamps of the data samples obtained in step 1352. In some embodiments, the time windows are fixed, having predefined start times and end times (e.g., the beginning and end of each hour, day, week, etc.). In other embodiments, the time windows may be sliding time windows, having start times and end times that depend on the timestamps of the data samples in the input timeseries. Once the appropriate time window has been set and the other input timeseries are identified, step 1362 can obtain samples of any input timeseries to the DAG that have timestamps within the appropriate time window. The input timeseries can include the original timeseries identified in step 1352 and any other timeseries used as input to the DAG.

Process 1350 is shown to include generating an enriched DAG including the original DAG and all timeseries samples required to perform the timeseries processing operations (step 1364). The original DAG may be the DAG identified in step 1358. The timeseries samples required to perform the timeseries processing operations may include any of the timeseries samples obtained in step 1362. In some embodiments, step 1364 includes identifying each derived data timeseries generated by the DAG and each operation included in the DAG. In some embodiments, step 1364 tags each operation to indicate a particular execution engine (e.g., C# engine 1332, Python engine 1334, etc.) to which the processing operation should be sent for execution.

Process 1350 is shown to include executing the enriched DAG to generate one or more derived timeseries (step 1366). Step 1366 can include submitting each timeseries processing operation in series to execution engines 1330 and waiting for results before submitting the next operation. When a given operation is complete, execution engines 1330 can provide the results of the operation to workflow manager 622. Process 1350 can use the results of one or more operations as inputs for the next operation, along with any other inputs that are required to perform the operation. In some embodiments, the results of the operations are the derived timeseries samples.

Process 1350 is shown to include storing the derived timeseries in the timeseries storage (step 1368). The derived timeseries may include the results of the operations performed in step 1366. Step 1368 can include accepting derived timeseries samples from derived timeseries event hub 1322 and storing the derived timeseries samples in persistent storage (e.g., local storage 514, hosted storage 516). In some embodiments, step 1368 is deployed on Azure using Azure Worker Roles. The worker role may generate requests at a rate based on Y % of the capacity of the storage. For example, if the capacity of the storage is 10,000 RU and Y % is 50% (e.g., 50% of the storage throughput is reserved for raw sample writes), and each write takes 5 RU, step 1368 may generate a total of 1,000 writes per second $$\left(\text{i.e., } \frac{10{,}000 * 50\%}{5} = 1{,}000\right).$$

Unified Management and Processing of Data in a Building Management Internet-of-Things (IoT) Environment Data produced and generated by the devices within a BMS can be provided in multiple formats. As technology has changed over time, much of the data produced and generated within the BMS system may be thought of as being essentially multi-media by nature, consisting primarily of telemetry data, meta-data, acoustic signals (e.g. ultrasound), images, video and audio data, as well as text and mathematical notations. In some examples, textual, audio, or video based annotations may be incorporated to allow for specific BMS data to be tagged to provide additional information related to the BMS data. In an IoT based system, as described below, analysis, classification and indexing of IoT data can depend significantly on the ability of the system to recognize the relevant information in multiple data streams, and fuse the recognized data. Fusing the recognized data may transform the collective semantics of the individual data received from multiple devices into semantics consistent with the perception of the real world. However, fusion of the recognized information is difficult between different media and data types. Accordingly, a multi-modal data management system is described below. The multi-modal data management system can provide flexible data processing approaches to maximize information sharing between devices, and to allow for better actionable decision using the fused information. In one specific example, the multi-modal data management system can be configured to apply to unifying event/time series data, such as those described above.

Figure 14:
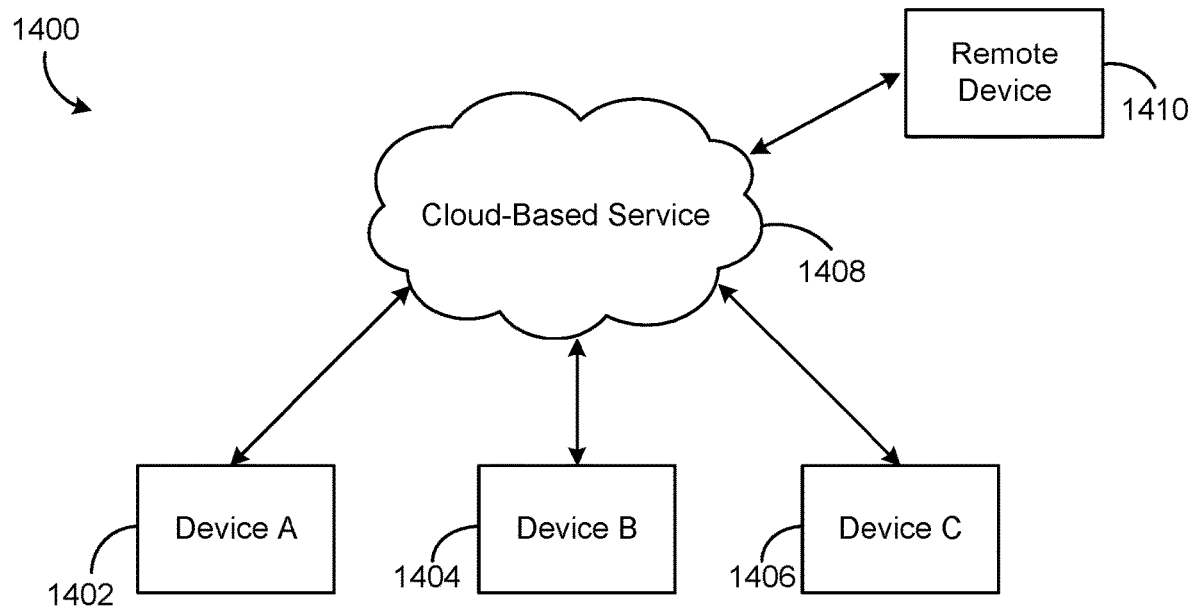
FIG. 14 is a block diagram illustrating a silo configured IoT environment 1400, according to some embodiments.

FIG. 14 is a block diagram illustrating a silo configured IoT environment 1400, according to some embodiments. The IoT environment may include a plurality of devices 1402, 1404, 1406, a cloud-based service 1408, and a remote device 1410. While only three devices 1402, 1404, 1406 are shown in FIG. 14, it is contemplated that the silo configured IoT environment 1400 may include more than three devices or fewer than three devices, as needed. The devices 1402, 1404, 1406 may be any type of BMS device, such as those described above. For example, the devices 1402, 1404, 1406 can be sensors, controllers, actuators, sub-systems, thermostats, or any other component within the BMS system capable of communicating to the cloud-based service 1408. In one embodiments, the devices 1402, 1404, 1406 may be connected directly to the cloud-based service 1408 via an internet-based connection. For example, the devices 1402, 1404, 1406 may be connected to the cloud-based service 1408 via a wireless connection such as Wi-Fi. In some embodiments, the devices 1402, 1404, 1406 are connected to the Internet via one or more gateways, routers, modems, or other internet connected devices, which provide communication to and from the internet. In some examples, the devices 1402, 1404, 1406 may be configured to communicate directly to the internet. The devices 1402, 1404, 1406 may include wireless transmitters, such as cellular transmitters (3G, 4G, LTE, CDMA, etc.), that allow the devices 1402, 1404, 1406 to connect to the internet directly via one or more service providers.

As shown in FIG. 14, the devices communicate directly to the cloud-based service 1408. The cloud-based service 1408 may be one or more services provided by a remote server (e.g. the cloud). In one embodiment, the cloud-based service can be a unified management and processing service, as will be described in more detail below. In other embodiments, the cloud-based service 1408 may be a timeseries service, as described above. The remote device 1410 may be one or more devices configured to access the cloud-based service 1408. In one of the embodiments, the remote device 1410 is a remote computer, such as a Personal Computer (PC). In other embodiments, the remote device 1410 is a mobile device such as a smartphone (Apple iPhone, Android Phone, Windows Phone, etc.), a tablet computer (Apple iPad, Microsoft Surface, Android tablet, etc.). In still further embodiments, the remote device 1410 may be a dedicated device, such as a commissioning tool. In one embodiment, the remote device 1410 is configured to communicate with the one or more cloud based services 1408. The remote device 1410 may be configured to allow a user to access the cloud-based services 1408. In some embodiments, a user may be able to request certain actions be performed from the cloud-based service 1408 via the remote device. For example, the remote device 1410 may be used to request certain reports and/or other data processed by the cloud-based services. In other embodiments, the remote device 1410 may be used to request information relating to one or more of the devices 1402, 1404, 1406 for analysis by the user. The remote device 1410 may be configured to access any functions of the cloud-based service 1408, for which the remote device 1410 has sufficient permissions.

Figure 15:
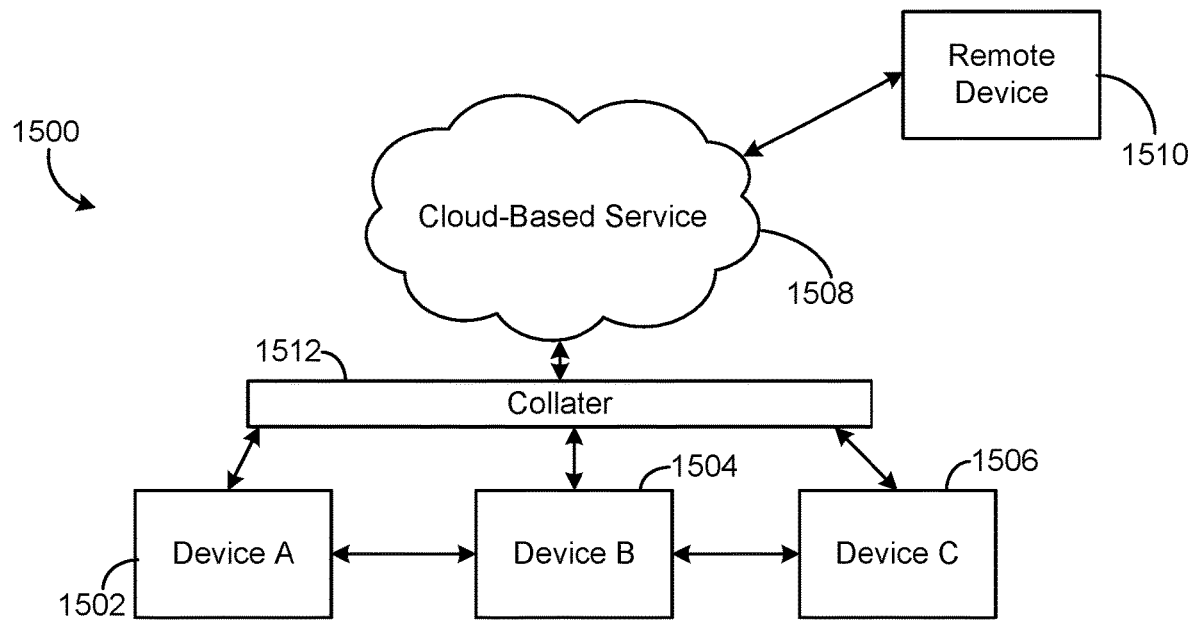
FIG. 15 is a block diagram illustrating a decentralized IoT environment, according to some embodiments.

FIG. 15 is a block diagram illustrating a de-centralized IoT environment 1500, according to some embodiments. Similar to environment 1400 described above, the environment 1500 includes a number of devices 1502, 1504, 1506. In one embodiment, the devices 1502, 1504, 1506 are similar to devices 1402, 1404, 1406, described above. The environment 1500 may further include a cloud-based service 1508 and a remote device 1510. The cloud-based service 1508 and the remote device 1510 may function as cloud-based service 1408 and remote device 1410 described above. The environment 1500 is further shown to include a collator 1512.

The devices 1502, 1504, 1506 may be configured to communicate between each other, or to the cloud-based service 1508 via the collator 1512. In one embodiment, the devices 1502, 1504, 1506 are configured to communicate with each other over a network, such as BACnet. However, other networks, such as local-area-networks (LAN), wide-area networks (WAN), TCP/IP or other networks are also included. In some embodiments, the devices 1502, 1504, 1506 may communicate with each other via a wireless protocol, such as Wi-Fi, LoRa, Cellular (3G, 4G, CDMA, LTE), Wi-Max, Bluetooth, Zigbee, etc. The devices 1502, 1504, 1506 may include one or more processors, such as a microprocessor capable of processing instructions. The devices 1502, 1504, 1506 may be configured to process data within each device 1502, 1504, 1506. The devices 1502, 1504, 1506 may further be configured to receive one or more instructions from the cloud-based service 1508. For example, the cloud-based service 1508 may instruct the devices 1502, 1504, 1506 to perform certain actions, or to provide specific data to the cloud-based service 1508. In some embodiments, the devices 1502, 1504, 1506 may receive the requests from the cloud-based service and communicate with each other to provide the requested service.

In some embodiments, the devices 1502, 1504, 1506 communicate with the cloud-based service 1508 via the collator 1512. The collator 1512 is configured to provide coordination between the devices 1502, 1504, 1506. In some embodiments, the collator 1512 may be a software element within a local device, such as an internet gateway (not shown). In other embodiments, the collator 1512 may be a service within the cloud-based services 1508. The collator 1512 may be configured to facilitate Edge computing between the devices 1502, 1504, 1506. For example, the collator 1512 may be configured to coordinate between the device 1502, 1504, 1506 to provide instructions to facilitate Edge computing (e.g. peer to peer or mesh computing). Further, the collator 1512 may serve to organize data received from multiple devices 1502, 1504, 1506. For example, the collator 15012 may be configured to provide the unified management and processing of IoT data described below.

Figure 16:
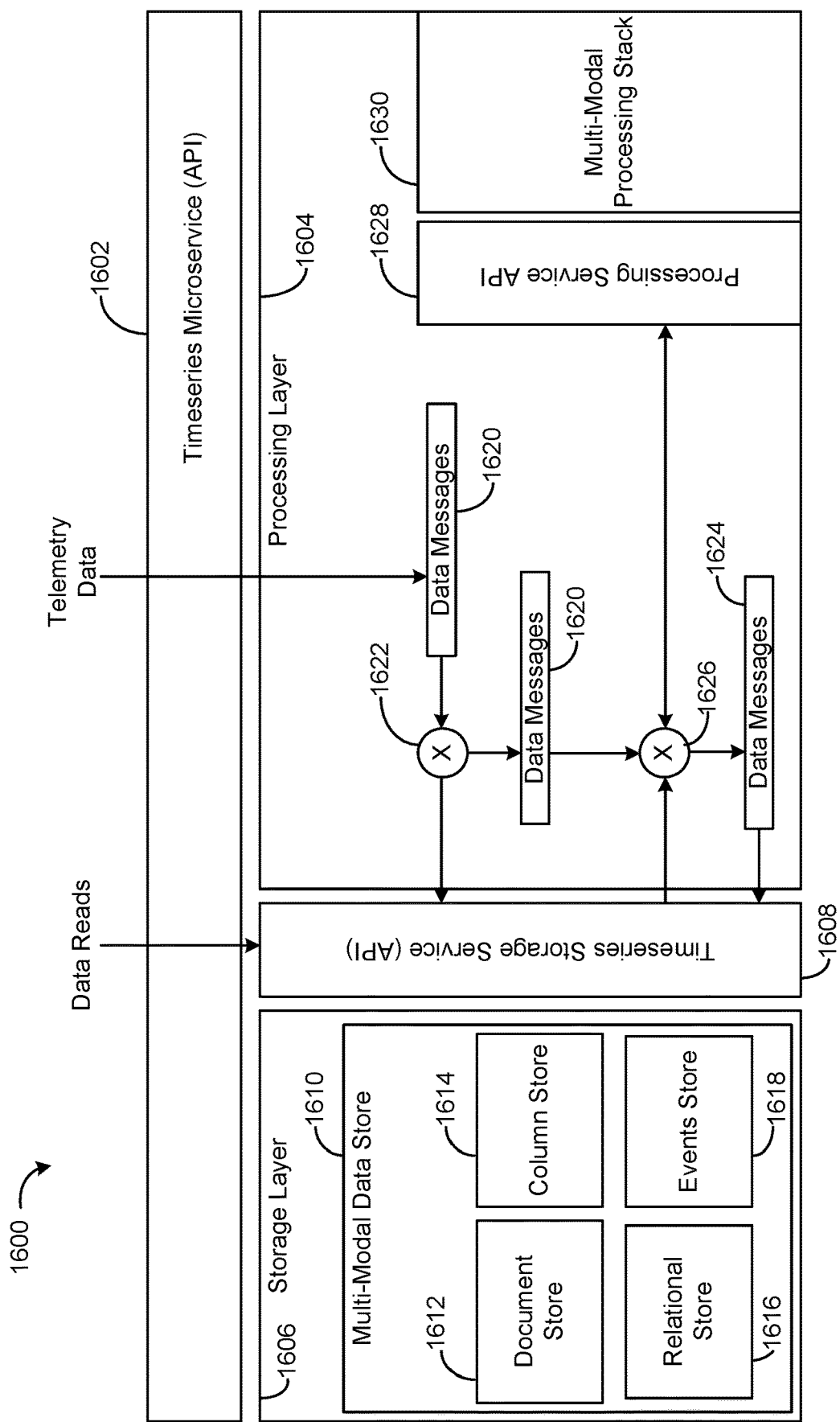
FIG. 16 is a block diagram illustrating a multi-modal data processing service, according to some embodiments.

Turning now to FIG. 16, a block diagram illustrating a multi-modal data processing service 1600 is shown, according to some embodiments. The multi-modal data processing service 1600 includes a timeseries microservice API 1602, a processing layer 1604 and a storage layer 1606. The timeseries microservice API 1602 may provide an interface between one or more devices, databases, controllers, or other source of data via the API. The timeseries microservice API 1602 may handle queries provided to the multi-modal data processing service 1600, which are then served directly from the storage layer 1606, ensuring low round-trip time (RTT). In some embodiments, the timeseries microservice API 1602 may route data to the proper layer within the multi-modal data processing service 1600 based on the type of data received. For example, telemetry data, or other data received from sensors or other devices may be routed to the processing layer 1604. In other examples, previously stored data, such as data received from databases or other data storage types may be provided to the storage layer 1606. In one embodiment, the previously stored data, or data reads, may be provided to the timeseries storage service API 1608 for processing into the storage layer 1606. In one embodiment, the timeseries storage service API 1608 is configured to parse the data reads to determine how the data reads should be stored within the storage layer 1606.

The storage layer 1606 may be configured to store multiple data types. In one embodiment, the storage layer 1606 includes a multi-modal data store 1610. The multi-modal data store 1610 may store the different multi-modal data types. For example, the multi-modal data store 1610 may include a document store 1612, a column store 1614, a relational store 1616 and an events store 1618. In some examples, the multi-modal data store 1610 may also include in-memory cache for quickly accessing recent items stored in a memory associated with the storage layer 1606 and/or the multi-modal data processing service 1600. The data associated with the document store 1612, the column store 1614, the relational store 1616 and the events store 1618 will be described in more detail below.

The processing layer 1604 may be configured to process one or more data messages 1620 received by the multi-modal data processing service 1600. data messages 1620 can include telemetry data from one or more sources, such as sensors, controllers, or other devices. The processing layer 1604 may receive one or more data messages 1620. The data messages 1620 may be unpacked at process element 1622. In one embodiment, the unpacked data is pushed to the storage layer 1606. The storage layer 1606 may analyze the unpacked data to determine if additional information may be required to process the data message 1620. The additional information may include metadata (e.g. device type, age, etc.), historical content tags (prior incidents of faults, service history, etc.) as well as the definitions of data aggregation and transformation operations that need to be performed on the data message 1620 for generating analytics. The definitions of data aggregation and transformation operations may include cleansing, filling, aggregations, windowing operations, etc.). The additional data may be accessed from the multi-modal data store 1610. In one example, the additional data may be accessed from the multi-modal data store 1610 via the in-memory cache.

The data message 1620 is then combined with the additional information provided via the multi-modal data store 1610 to form enriched data message 1624. In one embodiment, the additional information is combined with the data message 1620 at processing element 1626. The processing layer 1604 may further include a processing service API 1628 and a multi-modal processing stack 1630. The processing service API 1628 is configured to access one or more processing engines within the multi-modal processing stack 1630 to allow for the enriched data message 1624 to be processes. Example processing engines may include DotNet/C# engines, Python engines, SparkSQL engines, GraphX Engines, MLlib Engines, MATLAB engines, etc. The multi-modal processing stack 1630 is configured to perform the required operations to process the enriched data message 1624. The multi-modal processing stack 1630 may further be able to generate metrics, such as transformed timeseries data, and other analytics. For example, the analytics may determine that a piece of equipment may be at a high risk of a safety shutdown within the next 24 hours. The metrics and analytics may then be stored in the storage layer 1606.

Figure 17:
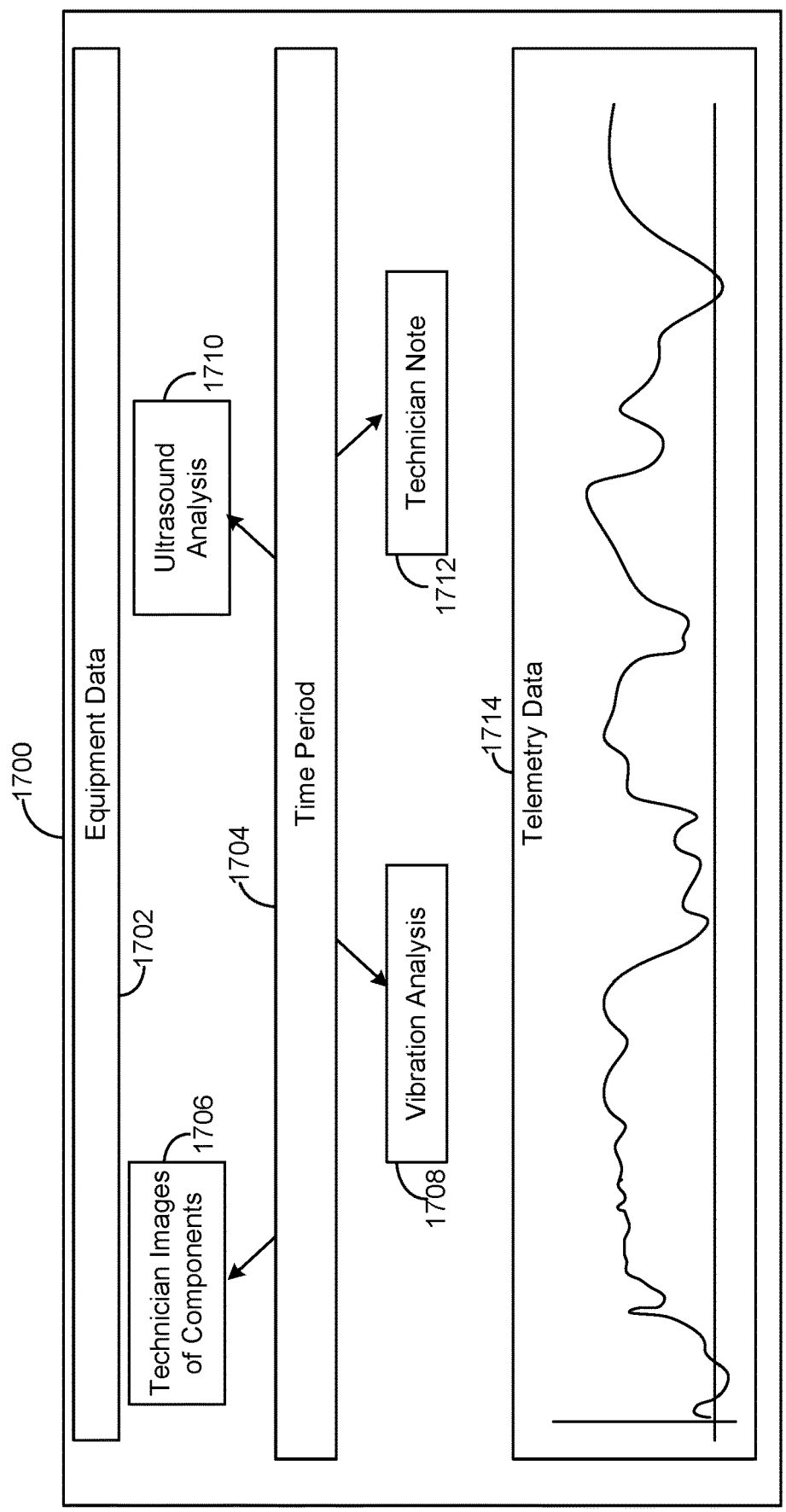
FIG. 17 is an example user interface providing a view of multi-modal data, according to some embodiments.

The multi-modal data processing service 1600 is configured to manage and process heterogeneous data types and data models associated with an IoT environment. Example data types and data models may include timeseries data, 3D design data, graphical data, structure, unstructured, and/or semi-structured data, video data, audio data, and the like. FIG. 17 illustrates an example of multi-modal information related to a building chiller system, and specifically to a predictive maintenance application related thereto. While the following examples, are described in relation to a chilling system and a predictive maintenance application, it is contemplated that the multi-modal data processing service 1600 is compatible with other equipment within a BMS, as well as non-BMS related equipment. The multi-modal data processing service 1600 is further compatible with other applications. Accordingly, the following examples are not intended to be limiting to a specific implementation. As stated above FIG. 17 is an example user-interface 1700 providing a view of multi-modal data. The user-interface 1700 can be a highly efficient tool for providing information to users, allowing then to better understand causalities of events collected from various sensors or other data inputs within the BMS. For example, as it relates to a chilling system, the user-interface 1700 may include events collected from various sensors related to the chilling system, applications including service logs (e.g., technician notes), vibration analysis, oil analysis, cameras, ultrasound sensors, thermometers, weather stations, or other data inputs related to the chilling system. In one embodiment, the user-interface 1700 is generated by the multi-modal data processing service 1600. In other embodiments, the user-interface 1700 may be generated by a cloud service, such as those described above, and viewed using a remote device.

The user-interface 1700 can include an equipment data portion 1702. The equipment data portion 1702 can provide information related to the piece of equipment being evaluated. Equipment data may include equipment name, location, operating status, network address, and the like. The user-interface 1700 can further include a time period portion 1704. The time period portion 1704 may be a user selectable time frame from which to view various data types and values related to the equipment. In one embodiment, the time period portion 1704 may reflect a set time length (e.g. ten minutes, one hour, one day, etc.). In other embodiments, the time period portion 1704 may be configured to display a certain time period. For example, a time period between one time (e.g. 12:00 AM) and a second time (e.g. 12:00 PM). In some examples, the time period portion 1704 can be configured to reflect any time frame requested by the user. In one embodiment, the time period portion 1704 is associated with a failure, repair, or other event associated with the associated equipment or system.

The user-interface 1700 may further be configured to display one or more multi-modal data points with respect to the time period portion 1704. For example, the user-interface 1700 is shown to display technician images of components 1706, a vibration analysis 1708, an ultrasound analysis 1710, a technician note 1712 and telemetry data 1714. The technician images of components 1706 may be images of components that have experienced a failure, either recently or in the past. The technician images of components 1706 may include image files such as .jpeg, .gif, .raw, .bmp, or other applicable image files. In other examples, the technician images of components 1706 may be video files. The vibration analysis 1708 may be an audio file, such as .mp3, .wav, .aiff, .wma, or the like. The vibration analysis 1708 may also include a visual representation of the audio file, such as a spectrum analysis for illustrating specific frequencies detected during the vibration analysis. The ultrasound analysis 1710 may include an audio file or an image file to illustrate the results of the ultrasound analysis 1710. In some embodiments, the ultrasound analysis 1710 may include data in a tabular format, such as in a .csv, or .xls file for export and manipulation by a user. The technician note 1712 may be a textual note, or an audio note. In some embodiments, the technician note 1712 may be an annotated image or other file type. The telemetry data 1714 may be present for one or more sensors associated with the equipment. In some embodiments, the telemetry data is presented in a visual form, such as the graph shown in FIG. 16. However, in other embodiments, the telemetry data may be provided in other forms, such as via a spreadsheet (e.g. .csv, .xls). The above examples are exemplary only, and it is contemplated that the user-interface 1700 can display multiple different types of multi-modal data, as relevant for a particular piece of equipment.

Each of the images of components 1706, the vibration analysis 1708, the ultrasound analysis 1710, the technician note 1712 and the telemetry data 1714 have one or more reference points on the time period portion 1704. For example, the telemetry data 1714 shows telemetry data associated with the entire time period displayed on the time period portion 1704, while the other multi-modal data items have discrete points on the time period portion 1704. For example, the technician images of components 1706 are associated with a discrete time, while the ultrasound analysis 1710 is associated with a second time. Thus, the user-interface 1700 provides a unified timeline visualization of failure, repair and operation, failure and other related events, and a telemetry data stream to a user, in this example. By unifying multiple data points and types associated with a piece of equipment of a system, an accurate and detailed history of one or more attributes of the equipment or system can easily be presented to a user for analysis.

This multitude of varied data types and data models can introduce a set of challenges as it relates to storing and indexing the varied data types and data models to provide a comprehensive view as shown in user-interface 1700. In one embodiment, multi-modal data processing service 1600 may be configured to use a polyglot persistence approach to processing the data, which allows for the storage of heterogeneous data types and other data models using multiple data storage technologies. The multiple storage technologies chosen based upon the way data is being used by individual applications or components of a single application. Using polyglot persistence, the multi-modal data processing service 1600 is responsible for providing Atomicity, Consistency, Isolation, and Durability (ACID) among different data models and storages.

Figure 18:
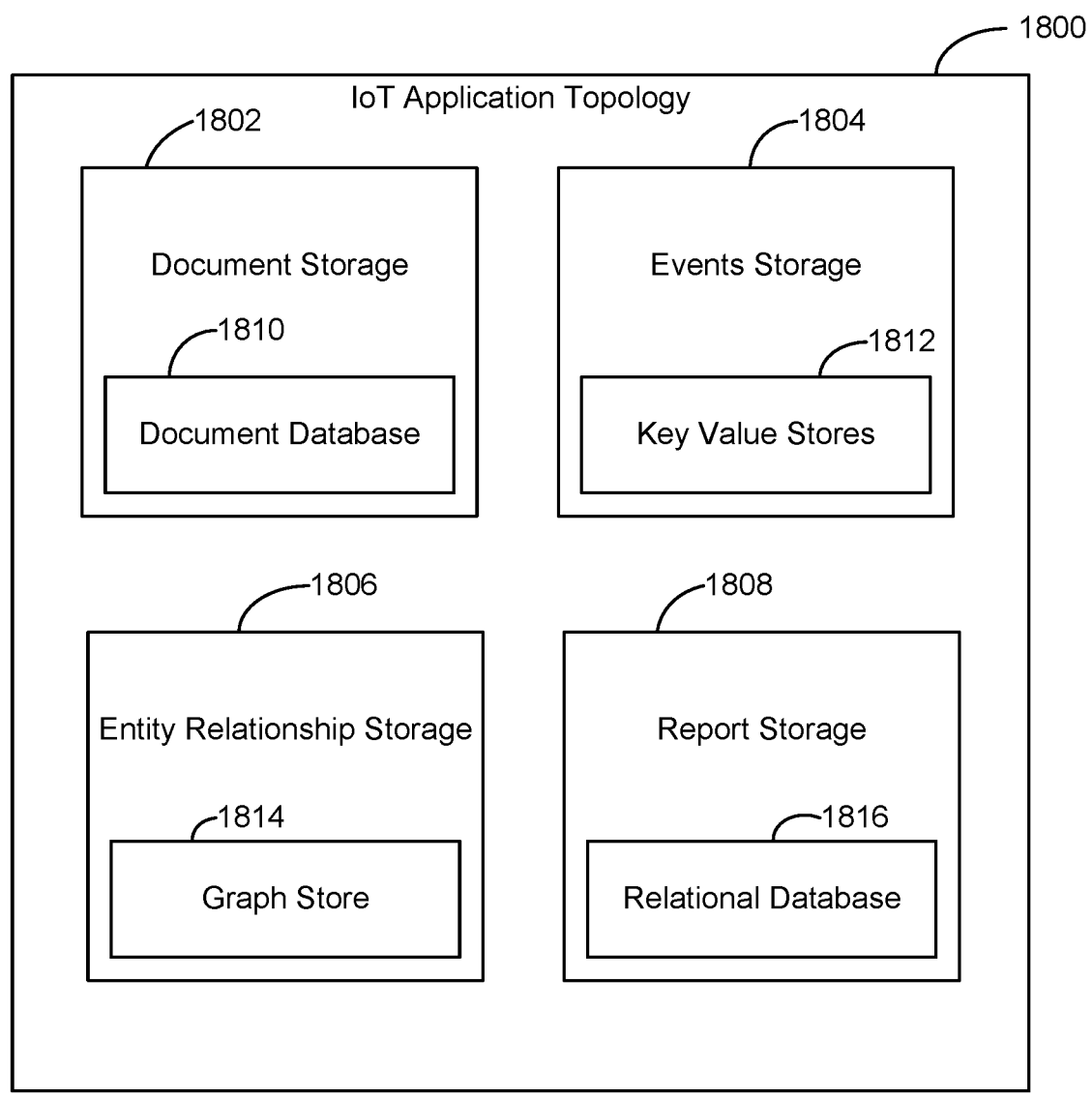
FIG. 18 is a block diagram illustrating an IoT application storage topology, according to some embodiments.

Turning now to FIG. 18, a block diagram illustrating an IoT application storage topology 1800 is shown, according to some embodiments. The IoT application storage topology 1800 may include multiple storage technologies for use with polyglot persistence methods, described above. The iot application storage topology 1800 may include document storage 1802, events storage 1804, entity relationship storage 1806, and report storage 1808. The document storage 1802 may include a document database 1810. The document database 1810 can be used to store completed service histories, and maintenance records, as well as static and dynamic relationships among entities including owner information, locations, asset details, and other maintenance recommendations.

The events storage 1804 can include a key value store 1812. The key value store 1812 can be used to store maintenance and repair events, as well as service recommendations (e.g. result of predictive analytics). The entity relationship storage 1806 may include a graph store 1814. The graph store 1814 may include results of predictive analytics performed by the multi-modal data processing service 1600. For example, the graph store 1814 may include model results of the predictive analytic data. The reports storage 1808 may include a relational database 1816. Within an application, such as the exemplary predictive maintenance application described above, application data can be modeled with JavaScript Object Notation (JSON) like semi-structured objects or structured entities that can be efficiently stored and queried within one or more relational databases 1816. Example, data stored within the relational databases 1816 may include descriptions of installed locations of an asset, owner information details, product specifications, firmware versions, telemetry data points, etc. In one embodiment, the document database 1810, the key value stores 1812, the graph store 1814 and the relational database 1816 are stored in the multi-modal data store 1610 of the multi-modal data processing service 1600. In other embodiments, one or more of the document database 1810, the key value stores 1812, the graph store 1814 and the relational database 1816 are located in a cloud, such as cloud-based services 1408, 1508.

As the multi-modal data processing service 1600 learns and discovers more about relationships between events and entities, the multi-modal data processing service 1600 is configured to consistently introduce new relationships, and update or delete existing relationships through analytics services, (i.e., enriching semantic relationships). For example, a newly added maintenance event may lower a future failure mode of an asset by updating a causal relationship between the asset and a failure type. A set of recommended maintenance services (e.g. a set of entities) can be introduced to an asset by creating or updating a relationship between an asset and a service.

Data Models for a Predictive Maintenance Application

Returning now to the predictive maintenance example, the multi-modal data processing service 1600 may model the chiller with a digital twin that is a virtual representation of a physical device, there the digital twin is a computerized companion of the physical device (e.g. the chiller system for purposes of this example). The digital twin may be a 3D cad model with product specifications, or a set of telemetry data points associated to the physical device. In one embodiment, the data model representing the digital twin is a document (e.g., a JSON-based document), that can be managed via document database 1810. In one embodiment, the document database 1810 may manage the documents using document stores such as MongoDB or DocumentDB. In some embodiments, the multi-modal data processing service 1600 may include a back-end service to ensure state consistency between a physical device and a device twin. The entity relationship storage 1806 may include a set of application specific or business data, including a location of an asset, a product operating specification, an owner information of assets, an organizational hierarchy of assets, service provider details, and/or other information required to perform predictive field services. In some examples, entity relationship modeling is useful where entities can be stored in a relational database (e.g. relational database 1816) or a document database (e.g. document database 1810) where semantics between entities must be handled by an application. Graph databases, such as graph store 1814 may also be used to model dynamic relationships between entities.

Data Management in a Predictive Maintenance Application

A connected device, such as a chiller, generates many different types of streaming data, including sensor readings, click streams, etc. Thus, data management and processing are an essential part of an IoT system. As described above, a variety of data types may be presented to the multi-modal data processing service 1600 in a predictive maintenance application (or other relevant application). For example, every service event can generate relevant data for future operational optimizations. For example, maintenance service events can include various multimedia data points, including textual reports on oil analysis (e.g. .pdf, .doc, or other document type), raw vibrational data, images of failed components, 3D models of the device and repair parts, technician service notes, ultrasound data, and the like. In one example, a picture of a degraded component can be uploaded to one or more cloud services for a condition assessment. For example, the cloud service may be an advanced image analysis service. If a replacement part is determined to be required, the cloud service will place a replacement part order and a work order. In one embodiment, the cloud service is one or more service accessed by the multi-modal processing stack 1630. In other embodiments, the multi-modal data processing service 1600 is the cloud service responsible for coordinating the analysis.

Figure 19:
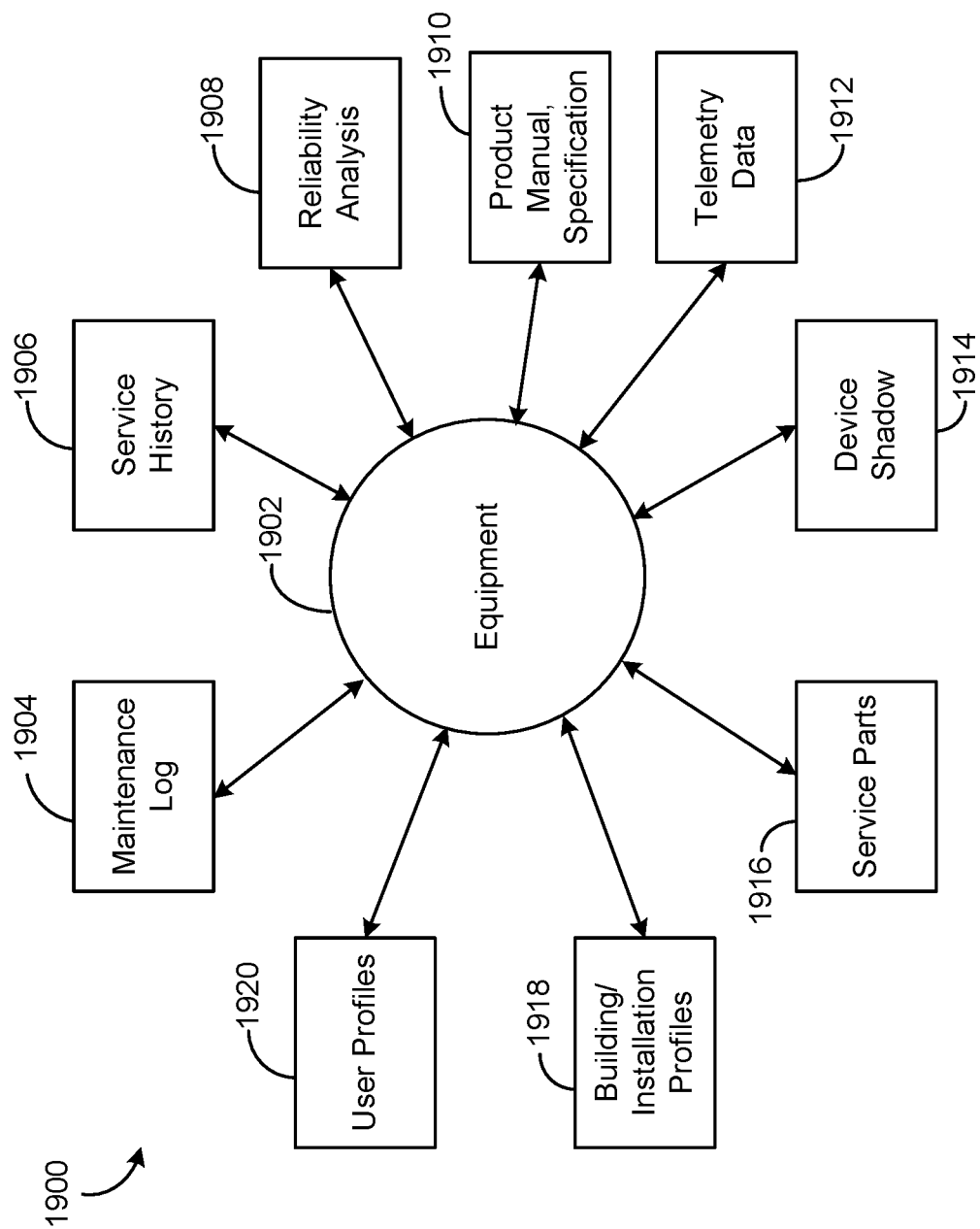
FIG. 19 is a block diagram illustrating a data scheme associated with a piece of equipment in a BMS, according to some embodiments.

Turning now to FIG. 19, a block diagram illustrating of a data scheme 1900 associated with a piece of equipment 1902, such as chiller is shown, according to some embodiments. The equipment 1902 may have a number of associated data points associated with the equipment 1902. For example, the equipment 1902 may be associated with maintenance logs 1904, service histories 1906, reliability analysis 1908, product manuals/specifications 1910, telemetry data 1912, device shadows 1914, service parts 1916, building/installation profiles 1918, user profiles 1920, or other data points. The data points may include multiple data types, as described below in Table 1.

TABLE 1

Multimedia Data Types and Associated Usage Examples

| Data Type | Usage Example |
| --- | --- |
| Image | Picture of faulty parts, asset image, condition audit |
| PDF/Scanned Document | Product specifications, manual, service history |
| Unstructured Text | service note, customer's problem description |
| Structured/Semi-structured | Application metadata, user profile, business transaction data, etc. |
| Time series, events | Vibration analysis, faults, sensor readings, safety alerts, etc. |
| Video | Repair sequence instructions, operating instructions, etc. |
| Audio | Mechanical rotating device operating samples, operating environment noise, etc. |

The data points shown in FIG. 19 may also provide various metadata points to the multi-modal data processing service 1600. Example metadata may include data capture locations, author, time of capture, target asset, etc. The metadata points provide contextual content for analysis and data processing of the multi-modal data. The above data points and associated metadata may be stored in storage layer 1606 of the multi-modal data processing service 1600, or other databases accessible by the multi-modal data processing service 1600. For example, the data points and metadata may be stored using blob storage, files systems, databases, etc.

The multi-modal data processing service 1600 may be configured to store, index and query various data models described above, including documents, graphs, and events. In one embodiment, the multi-modal data processing service 1600 accesses a predictive maintenance analytic service to provide a predictive maintenance analysis. The predictive maintenance analytic service may be accessed via the processing service API 1628. In one embodiment, the predictive maintenance analytic service access one or more multi-modal data stores within the multi-modal data store 1610. The predictive maintenance analytic service may access the stores to find all relevant measurement identifiers to a target asset, timeseries data, and events to create a data frame for analysis. In some examples, the telemetry data is stored in a timeseries store, which may utilize different storage technology.

The predictive maintenance analytic service may apply predictive failure analytics (e.g., matched potential failures and service recommendations. The predictive maintenance analytic service may further examine one or more data frames to determine when an asset may failed. The predictive maintenance analytic service may generate tagged events and update asset condition attributes illustrating high risks of failure of assets. The predictive maintenance analytic service may provide persisting analytic outcomes into a separate timeseries stream and add or update a tag in an entity to allow for more efficient future causality analysis.

Unified Data Management and Processing

Figure 20:
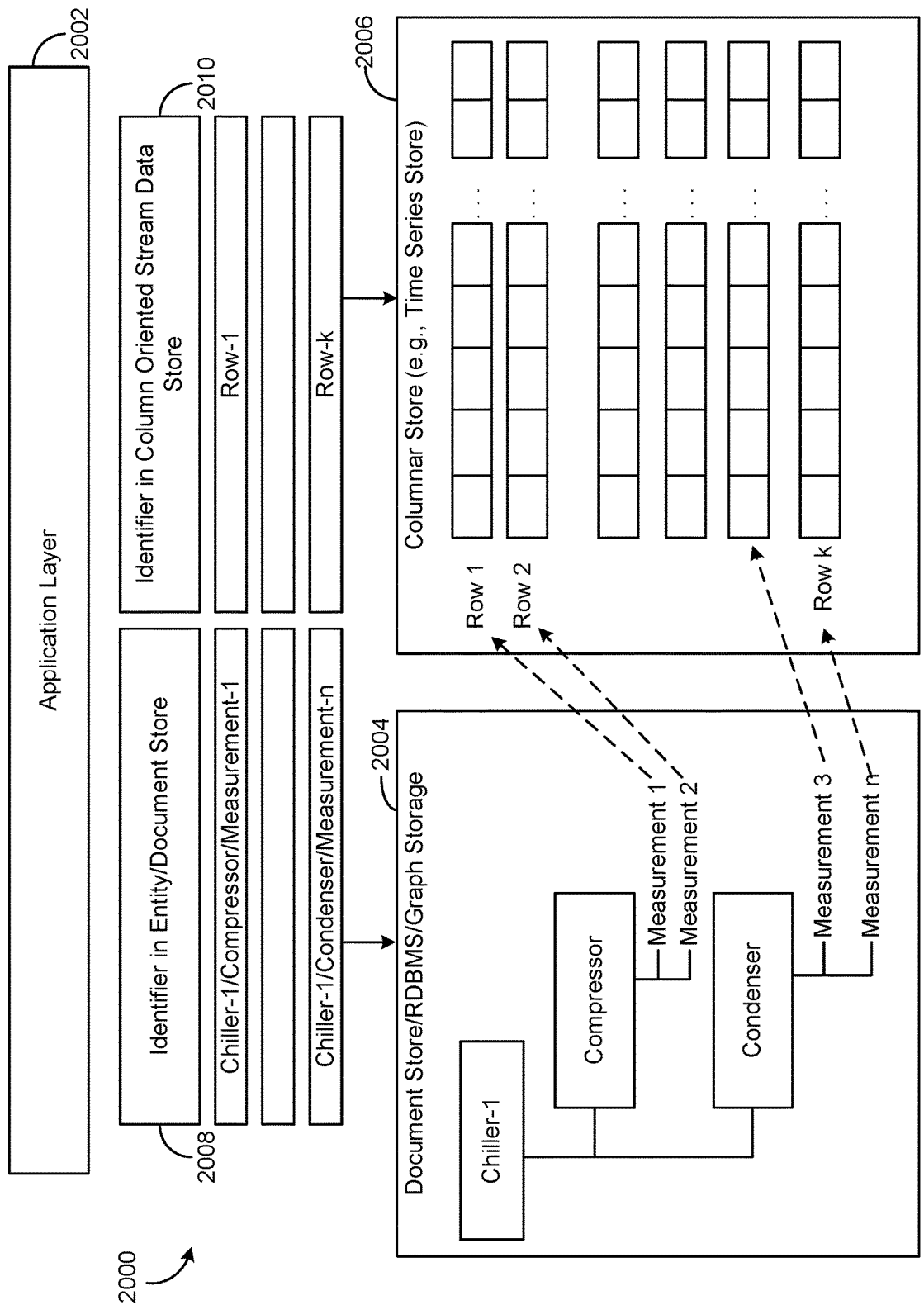
FIG. 20 is a data map illustrating data mapping between entity/document stores and streamed data (e.g. telemetry data) stores, according to some embodiments.

As described above, the multi-modal data processing service 1600 may utilize polyglot persistence topologies to generate mapping between data points and types to provide strong consistency of data stored in two different data store. Specifically, polyglot persistence topology is used to map data between entity stores and telemetry data stores. Turning now to FIG. 20, a data map 2000 illustrating data mapping between entity/document stores and streamed data (e.g. telemetry data) stores, according to some embodiments. FIG. 20 has an application layer 2002. The application layer 2002 may be configured to map data between a document store/event store/graph store 2004 and a columnar store 2006 (e.g., time series store). The application layer 2002 may utilize one or more identifiers 2008 associated with data points within the document store/event store/graph store 2004, and one or more identifiers 2010 associated with data points within the columnar store 2006, to map data points in the document store/event store/graph store 2004 to the columnar store 2006. The application layer 2002 is further responsible for maintaining ACID properties between the different storage technologies (e.g. the document store/event store/graph store 2004 and the columnar store 2006).

Figure 21:
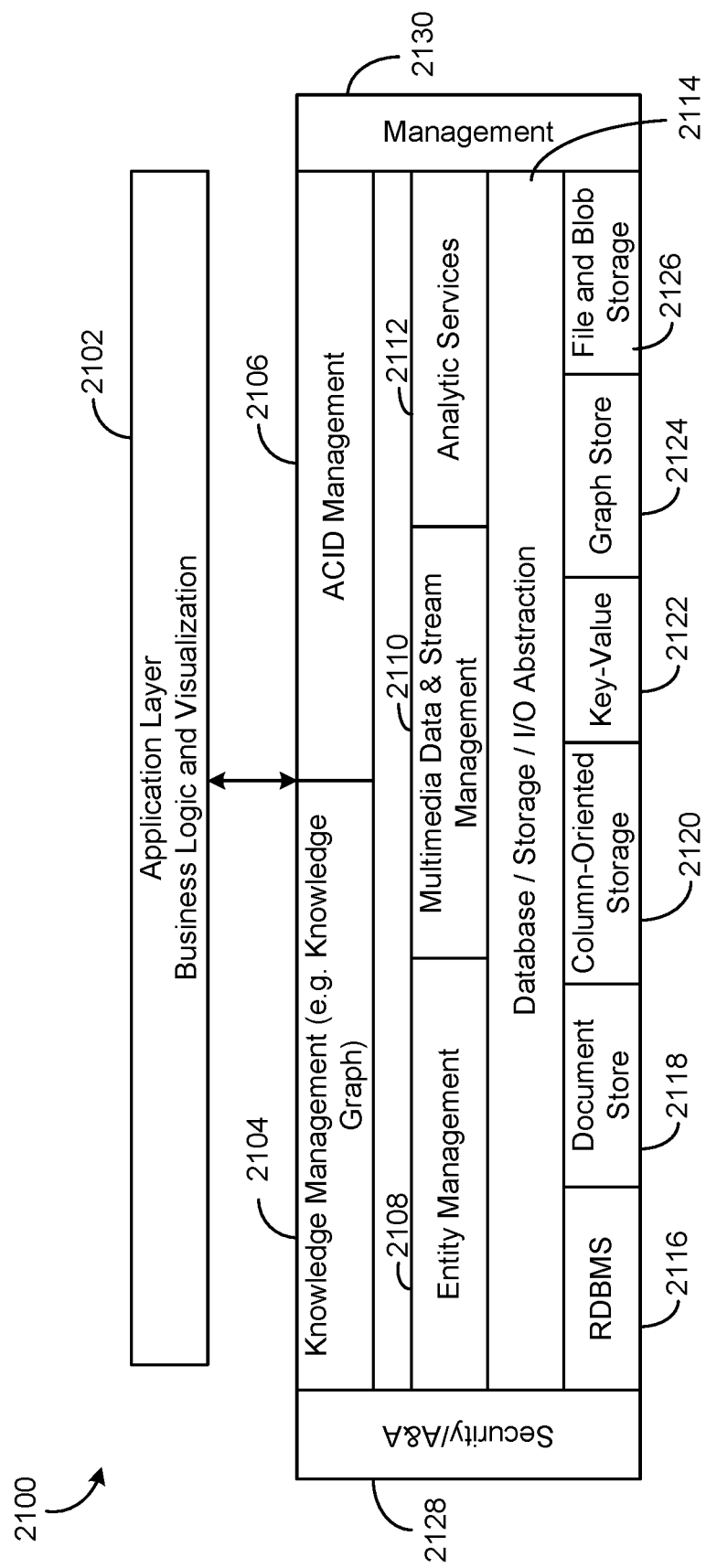
FIG. 21 is a block diagram illustrating a reference abstraction architecture, according to some embodiments.

The mapping used in FIG. 20 can require maintaining mappings and building custom ACID services for each application, which can be expensive and tedious to maintain. These issues can be resolved by building a set of abstractions that provide APIs for application developers and data management applications. For example, a reference architecture 2100 is shown in FIG. 21. The architecture 2100 may allow various data storage technologies to be abstracted using storage I/O abstraction that provides consistent Create, Read, Update and Delete (CRUD) operations across multiple storage technologies. The architecture 2100 may include an application layer 2102. The application layer 2102 can provide an API for accessing the architecture 2100. The architecture may further include a knowledge management module 2104, an ACID management module 2106, an entity management module 2108, a multimedia data and stream management module 2110, an analytic services module 2112, a database/storage/IO Abstraction module 2114, a relational database management systems (RDBMS) module 2116, a document store 2118, a column-oriented storage 2120, a key-value module 2122, a graph store 2124 and a file and blob storage 2126. The architecture 2100 may further include a security module 2128 for providing various security functions to the architecture 2100. Finally, the architecture may include a management module for managing the various elements of the architecture, described above.

The knowledge management module 2104 is configured to store and maintain various knowledge based elements associated with a system or a device. The ACID management module 2106 is configured to maintain consistency among entities, attributes of entities, events, and/or telemetry data. The ACID management module 2106 is further configured to trigger consistency check services when certain data changes are determined, and to make updates to other storages (e.g., foreign key relationships among different data store), such as document store 2118, column-oriented storage 2120, key-value store 2122, graph store 2124, and file and blob storage 2126. The entity management module 2108 provides master data service on stored entities and unified CRUD operations via storage abstraction APIs. The multimedia data & stream management 2110 provides similar functionality of the entity management module 2108 and also processes various media types, blobs and files. The analytic services module 2112 is configured to provide timeseries analysis, image analysis, and other IoT data processing services. The database/storage/io abstraction module 2114 can manage the data stored within the various storage modules, as well as the underlying I/O abstractions relating to what data received from a device or system is associated with which storage module. The architecture 2100 removes the need to maintain mappings, and the requirements to interact with various low-level storage interfaces.

Figure 22:
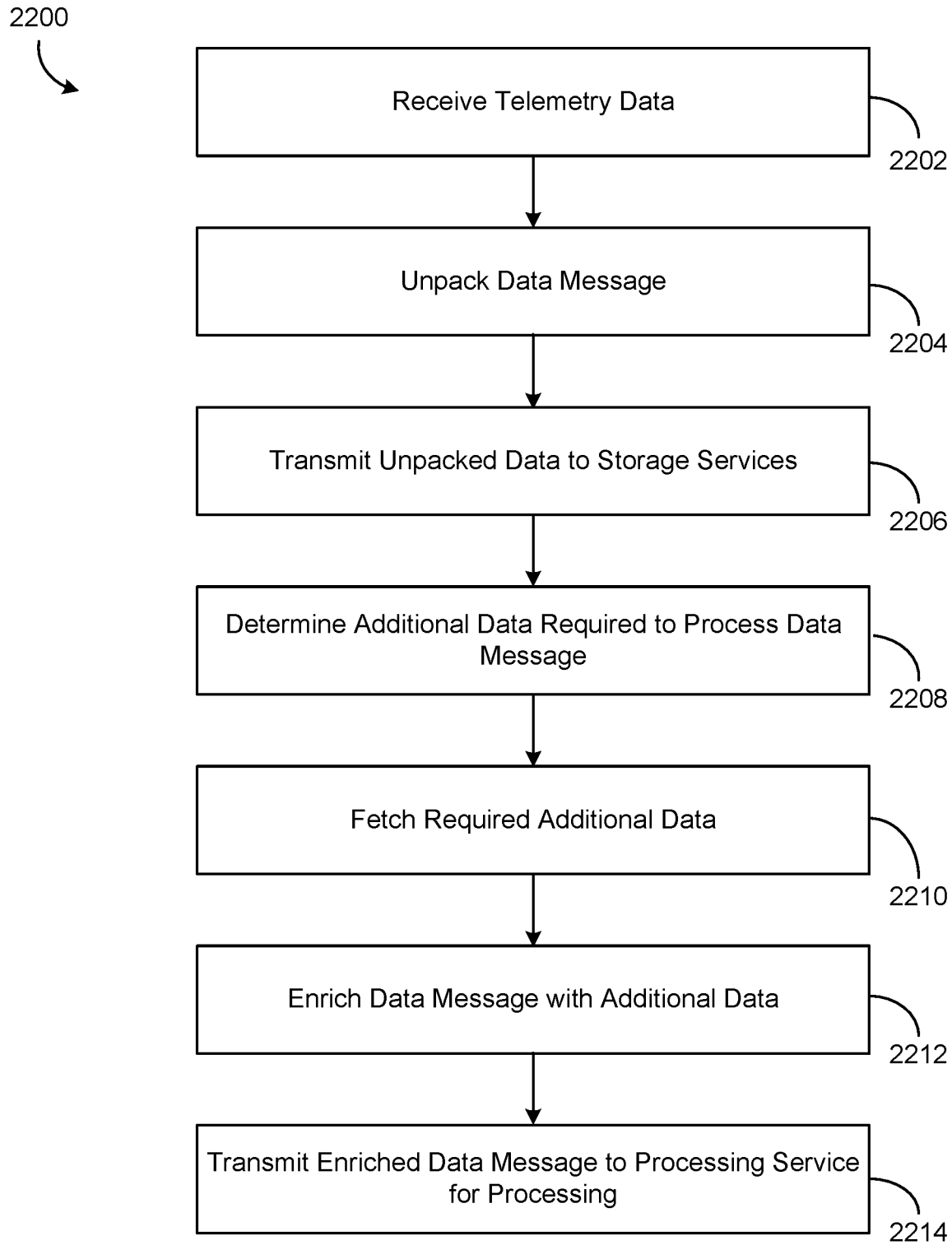
FIG. 22 is a flow chart illustrating a process for performing unified stream processing, according to some embodiments.

Turning now to FIG. 22, a flow chart illustrating a process 2200 for performing unified stream processing is shown, according to some embodiments. In one embodiment, the process 2200 is performed using the multi-modal data processing service 1600. However, other cloud-based services may also perform process 2200. At process block 2202, telemetry data is received by a service, such as the multi-modal data processing service 1600. In one embodiment, the telemetry data is provided by one or more sensors associated with a system or individual equipment. In some embodiments, the service receives all telemetry data in real time. In other embodiments, the service receives the telemetry data periodically. In one embodiment, the telemetry data is received by the service via one or more APIs.

At process block 2204, the data message is unpacked. Unpacking the data message may include extracting all data types from the data message. For example, the telemetry data may be extracted, along with any metadata associated with the telemetry data. Once the data is unpacked, the unpacked data is transmitted to the storage services at process block 2208. Storage services may include the multi-modal data stores 1610, described above. The storage services then examine the unpacked to data to determine what, if any, additional data is required to process the message at process block 2208. Additional data may include metadata (e.g. equipment type, age, etc.), historical content tags (e.g. prior incidents of faults, service history, etc.) as well as the definitions of data aggregation and transformation operations that need to be performed on the data to generate analytics (e.g. cleansing, filling, aggregations, windowing operations, etc.).

Once the additional data has been determined, the additional required data is fetched from one or more data stores (e.g. multi-modal data store 1610) at process block 2210, and the data message is enriched with the additional data at process block 2212. At process block 2214 the enriched data message is sent to one or more processing services to be processed. The processing services can perform the required operations and generate metrics (e.g. transformed time series data) and analytics (e.g. tags indicating certain determined attributes of the equipment or system. In one embodiment, the processing services may be DotNet C# processing engines, python engines, SparkSQL engines, GraphX engines, MLlib engines, or he like.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A timeseries management system comprising:
one or more computer-readable storage media having instructions stored thereon that, when executed by one or more processors, cause the one or more processors to:
receive a raw data timeseries and a plurality of other raw data timeseries, wherein each of the raw data timeseries and the plurality of other raw data timeseries are uniquely linked to one timeseries processing workflow of a plurality of timeseries processing workflows;
identify an initial timeseries processing workflow of the plurality of timeseries processing workflows that is uniquely linked to the raw data timeseries, the initial timeseries processing workflow comprising a predefined sequence of timeseries processing operations;
identify one or more other data timeseries for inputs to the initial timeseries processing workflow;
generate an enriched timeseries processing workflow comprising the initial timeseries processing workflow, the raw data timeseries, and the one or more other data timeseries; and
execute the enriched timeseries processing workflow to generate one or more derived data timeseries from the raw data timeseries and the one or more other data timeseries.

2. The timeseries management system of claim 1, wherein the instructions cause the one or more processors to:
identify and obtain samples of the raw data timeseries and the one or more other data timeseries required to perform the predefined sequence of timeseries processing operations; and
generate the enriched timeseries processing workflow comprising the samples of the raw data timeseries and the one or more other data timeseries.

3. The timeseries management system of claim 1, wherein the instructions cause the one or more processors to execute each of the predefined sequence of timeseries processing operations using an execution engine.

4. The timeseries management system of claim 1, wherein the instructions cause the one or more processors to:
tag each of the predefined timeseries processing operations in the enriched timeseries processing workflow with an indication of an execution engine; and
execute each of the predefined sequence of timeseries processing operations using the execution engine.

5. The timeseries management system of claim 1, wherein the instructions cause the one or more processors to:
accept a post-sample request associated with the raw data timeseries; and
execute the post-sample request in response to obtaining one or more new samples of the raw data timeseries.

6. The timeseries management system of claim 1, wherein the instructions cause the one or more processors to:
determine a time window based on an aggregation period specified by the predefined sequence of timeseries processing operations; and
obtain samples of the raw data timeseries and the one or more other data timeseries that have timestamps within the time window.

7. The timeseries management system of claim 6, wherein the instructions cause the one or more processors to determine the time window based on the timestamp of the raw data samples and a duration of the aggregation period specified by the predefined sequence of timeseries processing operations.

8. The timeseries management system of claim 1, wherein the initial timeseries processing workflow comprises a directed acyclic graph representing the predefined sequence of timeseries processing operations in the initial timeseries processing workflow.

9. The timeseries management system of claim 8, wherein the directed acyclic graph comprises:
one or more input blocks representing one or more input timeseries to which the initial timeseries processing workflow applies;
one or more functional blocks representing the predefined sequence of timeseries processing operations in the initial timeseries processing workflow; and
one or more output blocks representing one or more derived data timeseries generated by applying the predefined sequence of timeseries processing operations to the one or more input timeseries.

10. The timeseries management system of claim 1, wherein the initial timeseries processing workflow comprises:
an indication of one or more input timeseries to which the initial timeseries processing workflow applies;
the predefined sequence of timeseries processing operations; and an indication of one or more derived data timeseries generated by applying the predefined sequence of timeseries processing operations to the one or more input timeseries.

11. The timeseries management system of claim 10, wherein the predefined sequence of timeseries processing operations is at least one of a dynamically defined sequence of timeseries processing operations or a static predefined sequence of timeseries processing operations.

12. The timeseries management system of claim 10, wherein the one or more input timeseries comprise at least one of:
the raw data timeseries; or
the one or more derived data timeseries.

13. A method for managing timeseries data, the method comprising:
receiving, by a processing circuit, a raw data timeseries and a plurality of other raw data timeseries, wherein each of the raw data timeseries and the plurality of other raw data timeseries are uniquely linked to one timeseries processing workflow of a plurality of timeseries processing workflows;
identifying, by the processing circuit, an initial timeseries processing workflow of the plurality of timeseries processing workflows that is uniquely linked to the raw data timeseries, the initial timeseries processing workflow comprising a predefined sequence of timeseries processing operations;
identifying, by the processing circuit, one or more other data timeseries for inputs to the initial timeseries processing workflow;
generating, by the processing circuit, an enriched timeseries processing workflow comprising the initial timeseries processing workflow, the raw data timeseries, and the one or more other data timeseries; and
executing, by the processing circuit, the enriched timeseries processing workflow to generate one or more derived data timeseries from the raw data timeseries and the one or more other data timeseries.

14. The method of claim 13, comprising:
identifying and obtaining, by the processing circuit, samples of the raw data timeseries and the one or more other data timeseries required to perform the predefined sequence timeseries processing operations; and
generating, by the processing circuit, the enriched timeseries processing workflow comprising the samples of the raw data timeseries and the one or more other data timeseries.

15. The method of claim 13, comprising:
tagging, by the processing circuit, each of the predefined sequence of timeseries processing operations in the enriched timeseries processing workflow with an indication of an execution engine; and
executing, by the processing circuit, each timeseries processing operation using the execution engine.

16. The method of claim 13, comprising:
accepting, by the processing circuit, a post-sample request associated with the raw data timeseries; and
executing, by the processing circuit, the post-sample request in response to obtaining one or more new samples of the raw data timeseries.

17. The method of claim 13, wherein the initial timeseries processing workflow comprises a directed acyclic graph visually representing a predefined sequence of timeseries operations in the initial timeseries processing workflow.

18. The method of claim 13, wherein the initial timeseries processing workflow comprises:
an indication of one or more input timeseries to which the initial timeseries processing workflow applies;
the predefined sequence of timeseries processing operations; and
an indication of one or more derived data timeseries generated by applying the predefined sequence of timeseries processing operations to the one or more input timeseries.

19. The method of claim 13, further comprising:
determining, by the processing circuit, a time window based on an aggregation period specified by the predefined sequence of timeseries processing operations; and
obtaining, by the processing circuit, samples of the raw data timeseries and the one or more other data timeseries that have timestamps within the time window.

20. A smart environment management system comprising:
one or more processors and a memory to store instructions, the instructions is executed by the one or more processor to:
receive a raw data timeseries, wherein the raw data timeseries is uniquely linked to one timeseries processing workflow of a plurality of timeseries processing workflows;
identify the one timeseries processing workflow of the plurality of timeseries processing workflows that is linked to the raw data timeseries, the one timeseries processing workflow comprising a predefined sequence of timeseries processing operations;
identify one or more other data timeseries required as inputs to the one timeseries processing workflow;
generate an enriched timeseries processing workflow comprising the one timeseries processing workflow, the raw data timeseries, and the one or more other data timeseries; and
execute the enriched timeseries processing workflow to generate one or more derived data timeseries from the raw data timeseries and the one or more other data timeseries.

* * * * *